US007451076B2

(12) United States Patent
Nakamura et al.

(10) Patent No.: US 7,451,076 B2
(45) Date of Patent: Nov. 11, 2008

(54) INFORMATION DISPLAY CONTROL APPARATUS, SERVER, AND PROGRAM WHICH DISPLAY EXAMPLE SENTENCES WITH RESPECT TO INPUT OR SELECTED WORDS AND ADDITION WORDS

(75) Inventors: Toshiki Nakamura, Tachikawa (JP); Yuichi Sagou, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 896 days.

(21) Appl. No.: 10/874,439

(22) Filed: Jun. 23, 2004

(65) Prior Publication Data

US 2004/0267537 A1 Dec. 30, 2004

(30) Foreign Application Priority Data

Jun. 30, 2003 (JP) ............................. 2003-187361
Mar. 31, 2004 (JP) ............................. 2004-107290

(51) Int. Cl.
*G06F 17/28* (2006.01)
*G06F 17/30* (2006.01)

(52) U.S. Cl. ........................ 704/7; 704/4; 704/5; 707/1

(58) Field of Classification Search ....................... None
See application file for complete search history.

(56) References Cited

U.S. PATENT DOCUMENTS 5,854,997 A * 12/1998 Sukeda et al. .................. 704/3
5,885,081 A * 3/1999 Tamura et al. .............. 434/169
6,735,559 B1 * 5/2004 Takazawa ....................... 704/7
2003/0011642 A1 * 1/2003 Sheng ......................... 345/810
2003/0236658 A1 * 12/2003 Yam ............................. 704/2
2004/0030542 A1 * 2/2004 Fuji .............................. 704/2
2005/0228639 A1 * 10/2005 Abe et al. ...................... 704/7

FOREIGN PATENT DOCUMENTS

JP 07-085058 A 3/1995
JP 2001-134567 A 5/2001
JP 2003-085182 A 3/2003

* cited by examiner

*Primary Examiner*—David R. Hudspeth
*Assistant Examiner*—Matthew J Sked
(74) *Attorney, Agent, or Firm*—Frishauf, Holtz, Goodman & Chick, P.C.

(57) ABSTRACT

An information display control apparatus includes: an example sentence storing unit for storing example sentences each including words; a word inputting unit for inputting a word; a list display control unit for controlling a search for example sentences each including the inputted word among the stored example sentences, and a display of a list of the searched example sentences; an addition word selecting unit for selecting an addition word among the words in the example sentences of which the list is displayed by the list display control unit, while the list of the example sentences each including the inputted word is displayed under control of the list display control unit; and a list display update control unit for controlling a search for example sentences each including the selected addition word and the inputted word, among the stored example sentences, and an update of the display of the list.

18 Claims, 47 Drawing Sheets

| EXAMPLE SENTENCE NUMBER | EXAMPLE SENTENCE INFORMATION |
|---|---|
| ⋮ | ⋮ |
| 80 | a look forward<br>先見 |
| ⋮ | ⋮ |
| 84 | look forward<br>前方を見る (cf. 2) |
| ⋮ | ⋮ |
| 153 | I'm looking forward to seeing you.<br>君に会うのを楽しみにしている。(◆toは前置詞のため… |
| ⋮ | ⋮ |
| 156 | The test was much easier than had been looked for.<br>テストは予想していたよりずっとやさしかった。 |
| ⋮ | ⋮ |

| EXAMPLE SENTENCE NUMBER | EXAMPLE SENTENCE INFORMATION |
|---|---|
| ⋮ | ⋮ |
| 80 | a look forward<br>先見 |
| ⋮ | ⋮ |
| 84 | look forward<br>前方を見る（cf. 2） |
| ⋮ | ⋮ |
| 153 | I'm looking forward to seeing you.<br>君に会うのを楽しみにしている。（◆toは前置詞のため… |
| ⋮ | ⋮ |
| 156 | The test was much easier than had been looked for.<br>テストは予想していたよりずっとやさしかった。 |
| ⋮ | ⋮ |

FIG.6

| EXAMPLE SENTENCE WORD | EXAMPLE SENTENCE NUMBER |
|---|---|
| ⋮ | ⋮ |
| forward | ···, 24, ···, 48, ···, 80, ···, 84, ···, 153, ···, 214, ···, 315, ··· |
| ⋮ | ⋮ |
| look | ···, 30, ···, 80, ···, 84, ···, 126, ···, 153, ···, 156, ···, 182, ··· |
| ⋮ | ⋮ |
| to | ···, 6, ···, 24, ···, 56, ···, 126, ···, 153, ···, 182, ···, 315, ··· |
| ⋮ | ⋮ |

FIG.7

| | |
|---|---|
| ENGLISH-JAPANESE DICTIONARY | ···, 80, 84, 153 ··· |
| ENGLISH-ENGLISH DICTIONARY | ···, 42, 56, 84 ··· |

FIG.8

| | |
|---|---|
| INPUTTED WORD GROUP | look & forward |

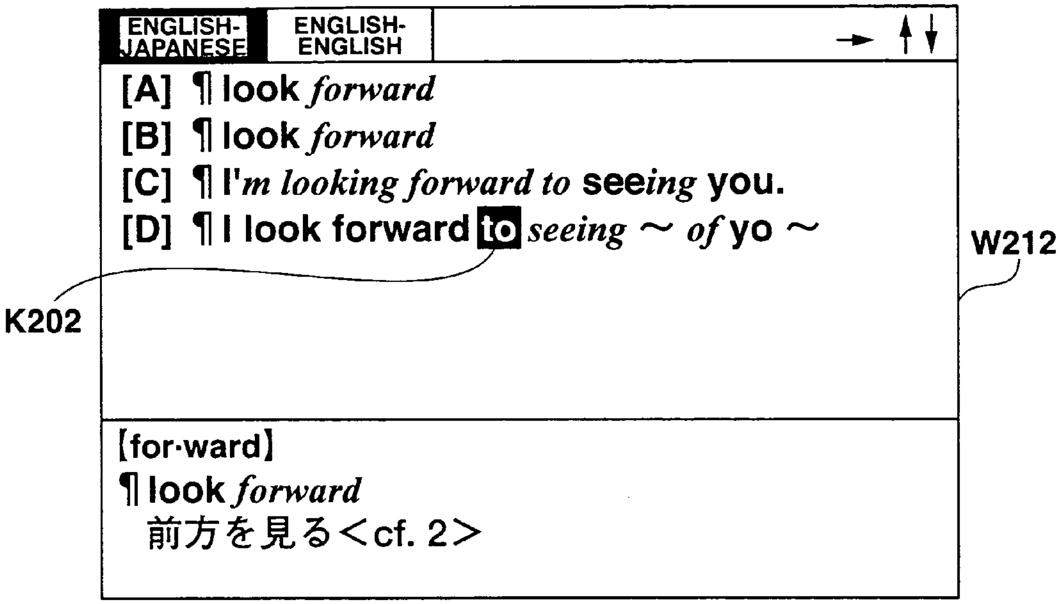

FIG.20C

```
┌─────────┬─────────┬──────────────────────────────┐
│ENGLISH- │ENGLISH- │                        → ↑↓ │
│JAPANESE │ENGLISH  │                              │
├─────────┴─────────┴──────────────────────────────┤
│ [A] ¶ look forward                               │
│ [B] ¶ look forward                               │
│ [C] ¶ I'm looking forward to seeing you.         │
│ [D] ¶ I look forward [to] seeing ~ of yo ~       │
│                                                  │
├──────────────────────────────────────────────────┤
│ [for·ward]                                       │
│ ¶ look forward                                   │
│    前方を見る＜cf. 2＞                           │
└──────────────────────────────────────────────────┘
```

K202 (pointing to [D] line), W212 (right bracket)

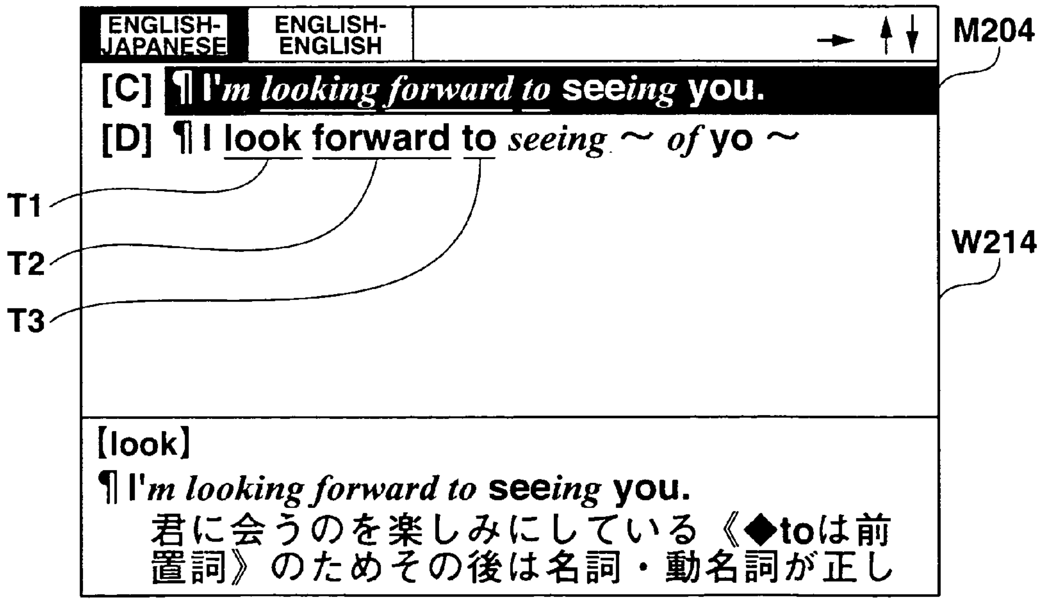

FIG.20D

```
┌─────────┬─────────┬──────────────────────────────┐
│ENGLISH- │ENGLISH- │                        → ↑↓ │ M204
│JAPANESE │ENGLISH  │                              │
├─────────┴─────────┴──────────────────────────────┤
│ [C] ¶ I'm looking forward to seeing you.         │
│ [D] ¶ I look forward to seeing ~ of yo ~         │
│                                                  │
├──────────────────────────────────────────────────┤
│ [look]                                           │
│ ¶ I'm looking forward to seeing you.             │
│    君に会うのを楽しみにしている《◆toは前        │
│    置詞》のためその後は名詞・動名詞が正し        │
└──────────────────────────────────────────────────┘
```

T1, T2, T3 (pointing to look, forward, to in [D]), W214

| JAPANESE-ENGLISH DICTIONARY DB | |
|---|---|
| ENTRY WORD | EXPLANATION INFORMATION |
| ⋮ | ⋮ |
| せわする | →せわ take care of 0 …の世話をする, 面… |
| ⋮ | ⋮ |
| がっしゅうこく | →アメリカ United states (of America) [t… |
| ⋮ | ⋮ |

| ENGLISH-JAPANESE DICTIONARY DB | |
|---|---|
| ENTRY WORD | EXPLANATION INFORMATION |
| ⋮ | ⋮ |
| take | I [取る] 1 [SVO (M)]<人が><人・物>を… |
| ⋮ | ⋮ |
| United states (of America) | アメリカ合衆国 [合衆国], 米国 《50の州と 1 つの |
| ⋮ | ⋮ |

| ENGLISH-JAPANESE COMPREHENSIVE DICTIONARY DB | |
|---|---|
| ENTRY WORD | EXPLANATION INFORMATION |
| ⋮ | ⋮ |
| take | 1 a 手に取る, 持つ, つかむ, 握る… |
| ⋮ | ⋮ |
| United states | アメリカ合衆国, 米国 (= the United State of ～ |
| ⋮ | ⋮ |

| ENGLISH-ENGLISH DICTIONARY DB | |
|---|---|
| ENTRY WORD | EXPLANATION INFORMATION |
| ⋮ | ⋮ |
| take | 1 [T] to move something from one ··· |
| ⋮ | ⋮ |
| United states of America | a country in North America, made up 50 ··· |
| ⋮ | ⋮ |

| ENGLISH-JAPANESE DICTIONARY EXAMPLE SENTENCE DB | | |
|---|---|---|
| EXAMPLE SENTENCE NUMBER | EXAMPLE SENTENCE | SOURCE ENTRY WORD |
| ⋮ | ⋮ | ⋮ |
| X128 | Take care \| when you cross the street.<br>道路を横断するときは気をつけなさい。 | care |
| ⋮ | ⋮ | ⋮ |

| ENGLISH-JAPANESE COMPREHENSIVE DICTIONARY EXAMPLE SENTENCE DB | | |
|---|---|---|
| EXAMPLE SENTENCE NUMBER | EXAMPLE SENTENCE | SOURCE ENTRY WORD |
| ⋮ | ⋮ | ⋮ |
| Y125 | Take care!<br>きをつけて《別れの挨拶》 | care |
| Y126 | Take care that you don't catch cold.<br>かぜをひかないように気をつけてください。 | care |
| ⋮ | ⋮ | ⋮ |

| ENGLISH-ENGLISH DICTIONARY EXAMPLE SENTENCE DB | | |
|---|---|---|
| EXAMPLE SENTENCE NUMBER | EXAMPLE SENTENCE | SOURCE ENTRY WORD |
| ⋮ | ⋮ | ⋮ |
| Z127 | "All right, take care, thanks, Daphne."<br>"You bet." | care |
| ⋮ | ⋮ | ⋮ |

| ENGLISH-JAPANESE DICTIONARY WORD EXAMPLE SENTENCE TABLE | |
|---|---|
| EXAMPLE SENTENCE WORD | EXAMPLE SENTENCE NUMBER |
| ⋮ | ⋮ |
| care | ⋯, X54, X76, X128, X203, ⋯ |
| ⋮ | ⋮ |
| take | ⋯, X48, X65, X128, X153, ⋯ |
| ⋮ | ⋮ |

| ENGLISH-JAPANESE COMPREHENSIVE DICTIONARY WORD EXAMPLE SENTENCE TABLE | |
|---|---|
| EXAMPLE SENTENCE WORD | EXAMPLE SENTENCE NUMBER |
| ⋮ | ⋮ |
| care | ⋯, Y10, Y125, Y126, Y232, ⋯ |
| ⋮ | ⋮ |
| take | ⋯, Y12, Y125, Y126, Y152, ⋯ |
| ⋮ | ⋮ |

| ENGLISH-ENGLISH DICTIONARY WORD EXAMPLE SENTENCE TABLE | |
|---|---|
| EXAMPLE SENTENCE WORD | EXAMPLE SENTENCE NUMBER |
| ⋮ | ⋮ |
| care | ⋯, Z24, Z83, Z127, Z252, ⋯ |
| ⋮ | ⋮ |
| take | ⋯, Z46, Z127, Z132, ⋯ |
| ⋮ | ⋮ |

| ENGLISH-JAPANESE DICTIONARY PHRASE DB | |
|---|---|
| ENTRY WORD | EXPLANATION INFORMATION |
| ⋮ | ⋮ |
| take care | [自]〔…に〕気をつける, 注意する… |
| take care of | (1) …の世話をする, 面倒を見る, …を介… |
| ⋮ | ⋮ |

| ENGLISH-JAPANESE COMPREHENSIVE DICTIONARY PHRASE DB | |
|---|---|
| ENTRY WORD | EXPLANATION INFORMATION |
| ⋮ | ⋮ |
| take care | 用心する, 気を付ける；取り計らう… |
| take care of | (1) …を世話する, 大事にする… |
| take care of business | 《俗》事態にうまく対処する, やる… |
| ⋮ | ⋮ |

| ENGLISH-ENGLISH DICTIONARY PHRASE DB | |
|---|---|
| ENTRY WORD | EXPLANATION INFORMATION |
| ⋮ | ⋮ |
| take care | to be careful |
| take care of | to watch and help someone and be … |
| ⋮ | ⋮ |

| ENTRY WORD CORRESPONDENCE TABLE | | | |
|---|---|---|---|
| COMMON ENTRY WORD | ENTRY WORD FOR EACH DICTIONARY DB | | |
| | ENGLISH-JAPANESE DICTIONARY DB | ENGLISH-JAPANESE COMPREHENSIVE DICTIONARY DB | ENGLISH-ENGLISH DICTIONARY DB |
| ⋮ | ⋮ | ⋮ | ⋮ |
| take | take | take | take |
| ⋮ | ⋮ | ⋮ | ⋮ |
| united states | United States (of America) | United States | United States of America |
| ⋮ | ⋮ | ⋮ | ⋮ |

| PHRASE ENTRY WORD CORRESPONDENCE TABLE | | | |
|---|---|---|---|
| COMMON PHRASE ENTRY WORD | PHRASE DB FOR EACH ENTRY WORD | | |
| | ENGLISH-JAPANESE DICTIONARY PHRASE DB | ENGLISH-JAPANESE COMPREHENSIVE DICTIONARY PHRASE DB | ENGLISH-ENGLISH DICTIONARY PHRASE DB |
| ⋮ | ⋮ | ⋮ | ⋮ |
| take care | take care | take care | take care |
| take care of | take care of 0 | take care of | take care of |
| take care of business | — | take care of business | — |
| ⋮ | ⋮ | ⋮ | ⋮ |

1304

| JUMP WORD STORING AREA | | | |
|---|---|---|---|
| FIRST WORD | SECOND WORD | THIRD WORD | ••• |
| take | care | — | ••• |

INFORMATION DISPLAY CONTROL APPARATUS, SERVER, AND PROGRAM WHICH DISPLAY EXAMPLE SENTENCES WITH RESPECT TO INPUT OR SELECTED WORDS AND ADDITION WORDS

BACKGROUND OF THE INVENTION

1. Field of the Invention

This invention relates to an information display control apparatus, a server, a recording medium which records a program and a program each having a function to search for an example sentence.

2. Description of the Related Art

Conventionally, what is known is an information display control apparatus such as an electronic dictionary, an electronic book and the like incorporating therein several kinds of dictionary databases (hereafter, database will be referred to as "DB") such as a Japanese dictionary, an English-Japanese dictionary, a Japanese-English dictionary, an English-English dictionary and the like. Such electronic dictionary and the like comprises various types of functions such as a function for searching for an entry word and the like. As one function among these functions, there is an example sentence searching function.

For example, an English-Japanese dictionary stores an entry word "look" and explanation information of the entry word "look" so as to relate each other, and further stores a large number of example sentences in which "look" is used. The example sentence searching function is a function for searching for an example sentence included in this dictionary DB and for displaying it.

Further, in order to make it possible to efficiently search for information which a user desires, some types of the electronic dictionaries comprises the so-called jump function. This jump function is a function as described below. That is, after explanation information corresponding to an entry word conforming to letters inputted by a user is displayed, when the user assigns a word in the explanation information (hereafter, it is accordingly referred to as "jump origin"), an entry word conforming to the assigned word is re-searched for, and explanation information corresponding to the entry word (hereafter, it is accordingly referred to as "jump destination") is displayed.

These days, an electronic dictionary of, what we call, a full contents type in which whole contents of paper dictionary are computerized and stored, stores a large number of example sentences. Therefore, when a user searches for an example sentence, a lot of example sentences are displayed on a display screen at once. Accordingly, it is very complicated because the user needs to move (to scroll or the like) several pages to search for the desired example sentence. In particular, these days, an electronic dictionary comprises a function called a plural dictionary searching function, for searching cross-sectionally a plurality of dictionaries and for displaying an example sentence based on the search result. In the case of the plural dictionary searching function, since an example sentence is extracted from various types of dictionary DBs to be displayed, there are even more example sentences to be displayed compared to the case of extracting from one dictionary DB, and thereby searching for a desired example sentence becomes more and more difficult.

Further, when an example sentence, a phrase or a compound word is to be searched for, there is a case where after a list of example sentences is displayed by inputting a letter string to be searched for, it is necessary to return to an inputting screen to re-search for an example sentence, a phrase or a compound word with an additional word inputted to the word that has been already inputted. Thereby, it is complicated and inconvenient.

Further, in the conventional jump function, what can be assigned as a jump origin is limited to only one word, and therefore a plurality of words cannot be selected. Accordingly, even though a user wants to assign a plurality of words such as a phrase or the like for searching for an example sentence, he/she can only assign one word, and thereby it is extremely inconvenient.

SUMMARY OF THE INVENTION

The present invention was made in view of the foregoing circumstances, and an object of the present invention is to provide an information display control apparatus capable of easily and appropriately displaying example sentences including desired words, among a large number of example sentences.

In accordance with a first aspect of the present invention, an information display control apparatus comprises: an example sentence storing unit for storing a plurality of example sentences each of which includes a plurality of words; a word inputting unit for inputting a word; a list display control unit for controlling a search for at least one example sentence each of which includes the word inputted by the word inputting unit among the plurality of example sentences stored in the example sentence storing unit, and for controlling a display of a list of the searched at least one example sentence; an addition word selecting unit for selecting an addition word among the plurality of words in the at least one example sentence of which the list is displayed by the list display control unit, in a state where the list of the at least one example sentence each of which includes the inputted word is displayed under control of the list display control unit; and a list display update control unit for controlling a search for at least one example sentence each of which includes the addition word selected by the addition word selecting unit and the inputted word, among the plurality of example sentences stored in the example sentence storing unit, and for controlling an update of the display of the list.

According to the apparatus of the first aspect of the present invention, while an example sentence storing unit storing a plurality of example sentences each of which includes a plurality of words is provided and at least one example sentence including the word inputted by the word inputting unit is searched for among the example sentences stored in the example sentence storing unit to be displayed as a list, when an addition word is selected according to a user operation among the words of the list-displayed example sentences, control is performed so that at least one example sentence including the selected addition word and the inputted word is searched for among the example sentences stored in the example sentence storing unit, and the list display is updated.

In accordance with a second aspect of the present invention, an information display control apparatus comprises: an example sentence storing unit for storing a plurality of example sentences each of which includes a plurality of words; a storing unit for storing a plurality of entry words and a plurality of pieces of explanation information so as to relate each other; an entry word selecting unit for selecting an entry word among the plurality of entry words stored in the storing unit; an explanation information display control unit for controlling a loading of explanation information related to the entry word selected by the entry word selecting unit, from the storing unit, and for controlling a display of the loaded explanation information; a word selecting unit for selecting a word in the explanation information of which display is under control of the explanation information display control unit; a selected word example sentence display control unit for controlling a search for at least one example sentence each of which includes the word selected by the word selecting unit, and for controlling a display of a list of the searched at least one example sentence; an addition word inputting unit for inputting an addition word in a state where the list of the at least one example sentence each of which includes the selected word is displayed under control of the selected word example sentence display control unit; and an example sentence display update control unit for controlling a search for at least one example sentence each of which includes the addition word selected by the addition word selecting unit and the inputted word, among the plurality of example sentences stored in the example sentence storing unit, and for controlling an update of the display of the list.

According to the apparatus of the second aspect of the present invention, while an entry word is selected among entry words stored in the storage and explanation information related to the selected entry word is loaded from the storage to be displayed and a word is selected in the explanation information of which display is controlled, and then at least one example sentence including the selected word to be displayed as a list, when an addition word is inputted, at least one example sentence including the word selected from the explanation information and the addition word is searched for among the stored example sentences, and the list display is updated.

In accordance with a third aspect of the present invention, an information display control apparatus comprises: an example sentence storing unit for storing a plurality of example sentences each of which includes a plurality of words; a word inputting unit for inputting a word; a list display control unit for controlling a search for at least one example sentence each of which includes the word inputted by the word inputting unit among the plurality of example sentences stored in the example sentence storing unit, and for controlling a display of a list of the searched at least one example sentence; an addition word inputting unit for inputting an addition word in a state where the list of the at least one example sentence each of which includes the inputted word is displayed under control of the list display control unit; and an example sentence display update control unit for controlling a search for at least one example sentence each of which includes the addition word inputted by the addition word inputting unit and the inputted word among the plurality of example sentences stored in the example sentence storing unit, and for controlling an update of the display of the list.

According to the apparatus of the third aspect of the present invention, while at least one example sentence including the inputted word is searched for among example sentences stored in an example sentence storing unit and a list of example sentences including the inputted word is displayed, when an addition word is inputted, at least one example sentence including the inputted addition word and the inputted word is searched for among the example sentences stored in the example sentence storing unit, and the list display is updated.

In accordance with a fourth aspect of the present invention, an information display control apparatus comprises: a storing unit for storing assembled information assembling information in which an entry word and explanation information of the entry word are related to each other; an example sentence storing unit for storing a plurality of example sentences each of which includes a plurality of words; an explanation information display control unit for controlling a display of explanation information related to an entry word among the explanation information stored in the storing unit; a selecting unit for selecting a plurality of words in the explanation information displayed by the explanation information display control unit; an example sentence searching unit for searching for at least one example sentence each of which includes the plurality of words selected by the selecting unit, among the plurality of example sentences stored in the example sentence storing unit; and an example sentence display control unit for controlling a display of the at least one example sentence searched for by the example sentence searching unit.

According to the apparatus of the fourth aspect of the present invention, while a storage storing assembled information assembling information in which an entry word and explanation information of the entry word are related to each other and an example sentence storing unit storing a plurality of example sentences each of which includes a plurality of words are provided and then control is performed so that explanation information related to an entry word among the explanation information stored in the storage is displayed, when a user selects a plurality of words in the displayed explanation information, control is performed so that at least one example sentence including the selected plurality of words is searched for among the example sentences stored in the example sentence storing unit, and the searched example sentences are displayed.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 6 is a view showing one example of a data structure of a word example sentence table, FIG. 7 is a view showing one example of a data structure of a search example sentence number storing area, FIG. 8 is a view showing one example of a data structure of an inputted word group storing area, FIGS. 20A to 20D are views showing screen transitions (second operation example) in the present embodiment, FIG. 29A is a view showing one example of a data structure of a Japanese-English dictionary DB and FIG. 29B is a view showing one example of a data structure of an English-Japanese dictionary DB, in the present embodiment, FIG. 30A is a view showing one example of a data structure of an English-Japanese comprehensive dictionary DB and FIG. 30B is a view showing one example of a data structure of an English-English dictionary DB, in the present embodiment, FIG. 31A is a view showing one example of a data structure of an English-Japanese example sentence DB, FIG. 31B is a view showing one example of a data structure of an English-Japanese comprehensive example sentence DB, FIG. 31C is a view showing one example of a data structure of an English-English example sentence DB, in the present embodiment, FIG. 32A is a view showing one example of a data structure of an English-Japanese dictionary word example table, FIG. 32B is a view showing one example of a data structure of an English-Japanese comprehensive dictionary word example table, FIG. 32C is a view showing one example of a data structure of an English-English dictionary word example table, in the present embodiment, FIG. 33A is a view showing one example of a data structure of an English-Japanese dictionary phrase DB, FIG. 33B is a view showing one example of a data structure of an English-Japanese comprehensive dictionary phrase DB, FIG. 33C is a view showing one example of a data structure of an English-English dictionary phrase DB, in the present embodiment, FIG. 34A is a view showing one example of a data structure of an entry word correspondence table, FIG. 34B is a view showing one example of a data structure of a phrase entry word correspondence table, in the present embodiment.

PREFERRED EMBODIMENT OF THE INVENTION

Hereinafter, with reference to figures, an embodiment in which the present invention is applied to an electronic dictionary being one type of an information display control apparatus will be described in detail. However, what the present invention can be applied to is not limited to an electronic dictionary, and the present invention can be applied to an electronic book, a PDA (Personal Digital Assistant), a cellular phone and the like.

[1. Structure]

An electronic dictionary incorporates therein various kinds of electronic dictionary data (dictionary database) such as a Japanese dictionary, an English-Japanese dictionary, a Japanese-English dictionary, an English-English dictionary. These dictionary databases (hereafter, database will be simply called "DB") store explanation information such as letter data, image data, moving picture data, sound data and the like for explaining an entry word, so as to relate the explanation information to the entry word. By selecting a type of dictionary and inputting a word, a user can make explanation information of the word displayed.

Figure 1:
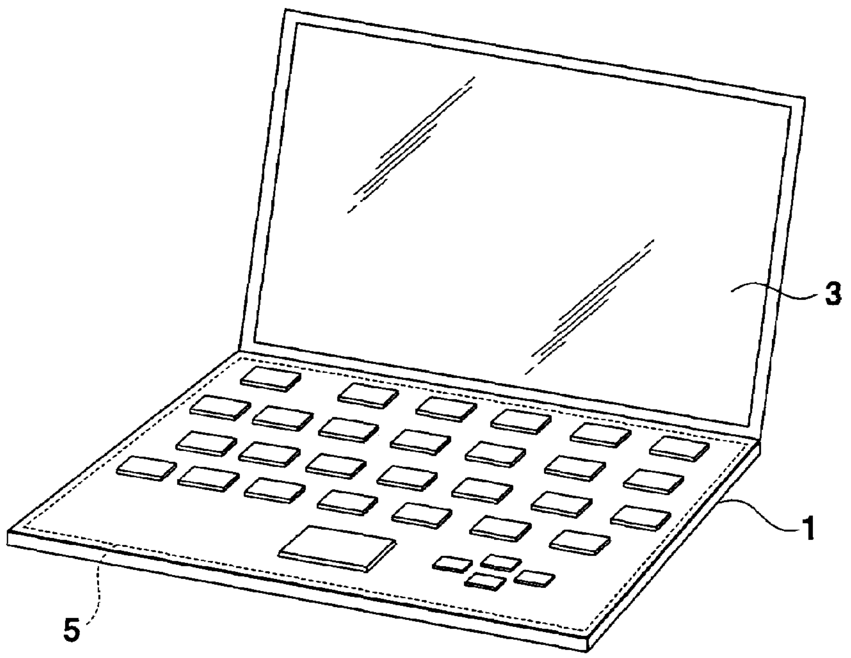
FIG. 1 is a view showing an outline of an electronic dictionary.

FIG. 1 shows an outline of the electronic dictionary 1. As shown in FIG. 1, the electronic dictionary 1 comprises a display 3 and various types of key groups 5. Here, unique functions are respectively allocated to keys composing the various types of key groups 5. A user operates the electronic dictionary 1 by pushing these keys.

Figure 2:
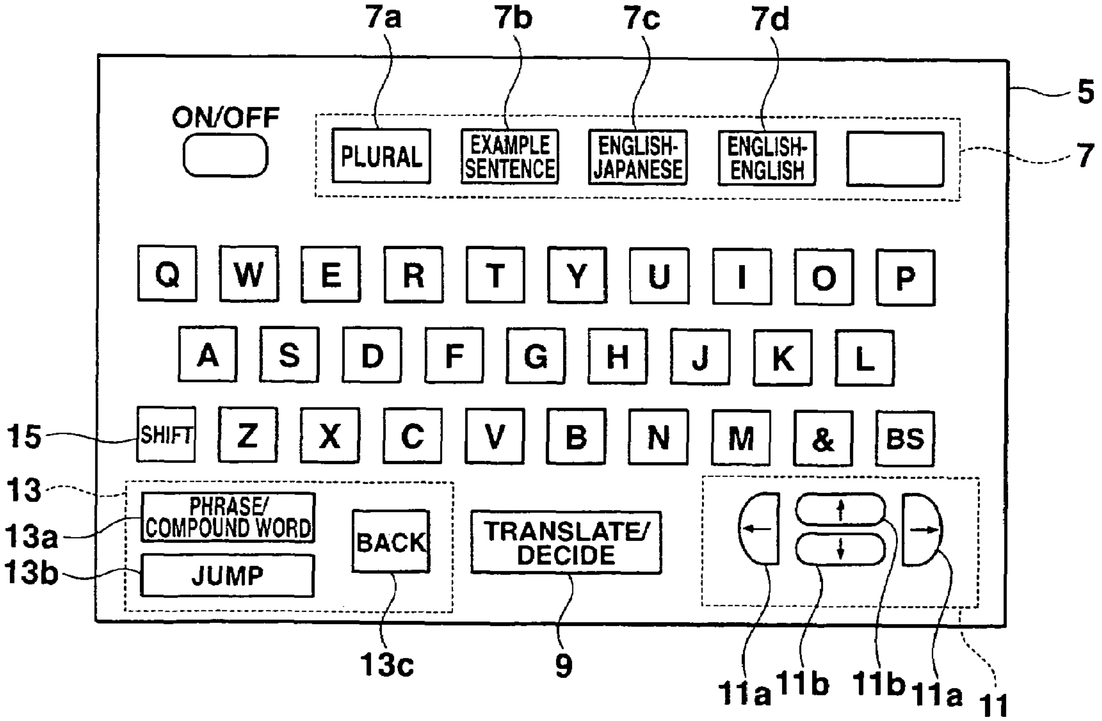
FIG. 2 is a view showing an inputting unit of the electronic dictionary.

For example, as shown in FIG. 2, the various types of key groups 5 comprise an operation mode selecting key group 7 for selecting an operation mode of the electronic dictionary, a translate/decide key 9 for accepting an input of an instruction such as an operation decision or the like, a direction key 11 for instructing a direction of a cursor or the like, an instruction operating key group 13 for executing various types of assigned operations, a shift key 15 and the like. Here, detail of functions, operations of each key will be described accordingly.

Figure 3:
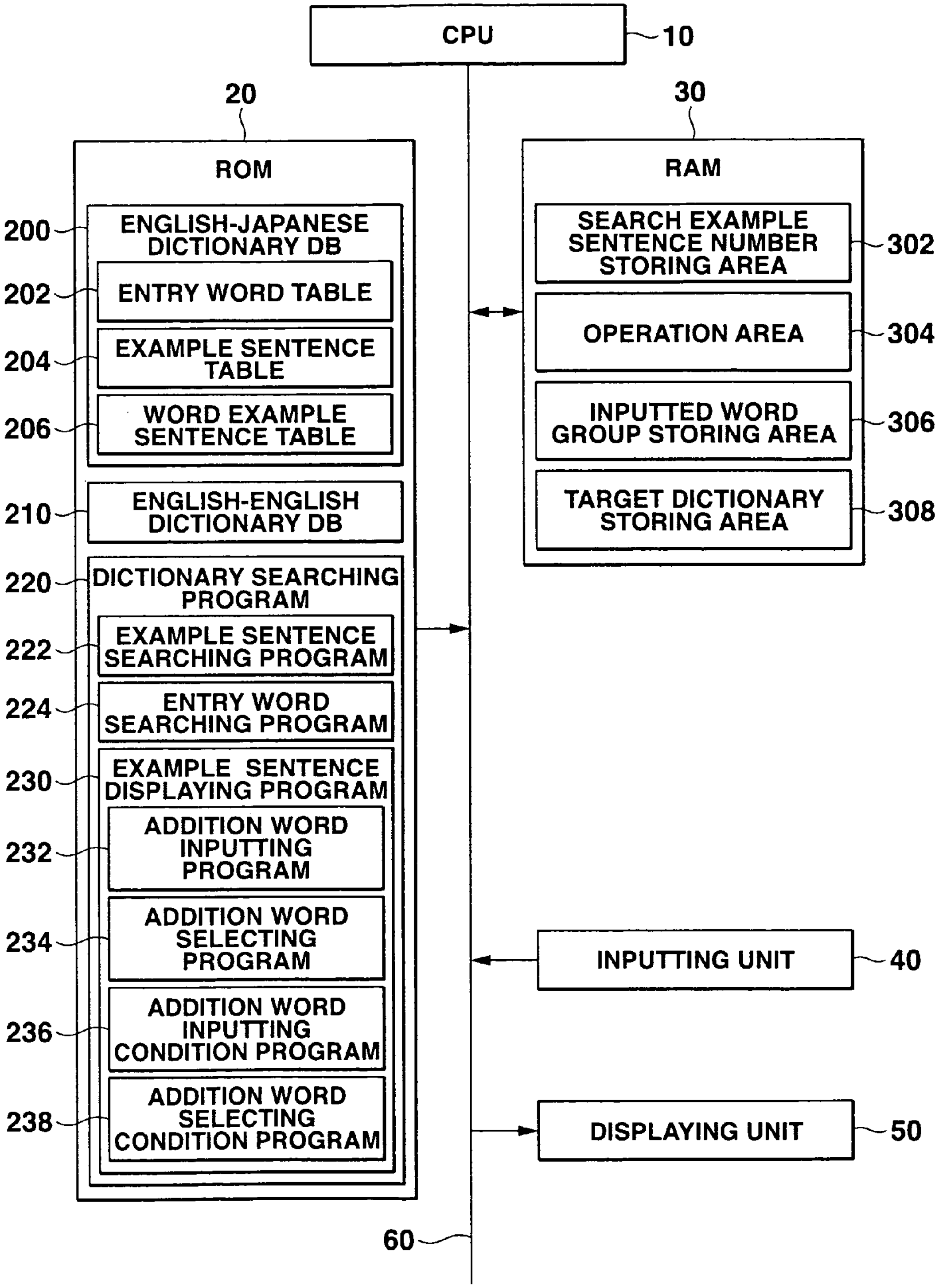
FIG. 3 is a block diagram of the electronic dictionary.

FIG. 3 is a block diagram showing a structure of the electronic dictionary 1. As shown in FIG. 3, the electronic dictionary 1 comprises a CPU (Central Processing Unit) 10, a ROM (Read Only Memory) 20, a RAM (Random Access Memory) 30, an inputting unit 40, and a displaying unit 50. Each unit is connected through a bus 60.

[1.1 Storage]

The ROM 20 stores initial programs for performing various initial settings, hardware inspection, loading of necessary programs and the like. The CPU 10 sets an operating environment of the electronic dictionary 1 by executing the initial programs at the time of powering the electronic dictionary 1 on.

Further, the ROM 20 stores various types of programs regarding an operation of the electronic dictionary 1 such as a menu displaying process, various types of setting processes, various types of searching processes and the like, and programs for realizing various types of functions that the electronic dictionary 1 comprises, such as a searching function, a displaying function, a setting function and the like. Further, the ROM 20 stores an English-Japanese dictionary DB 200 and an English-English dictionary DB 210 as a dictionary DB. Furthermore, the ROM 20 stores a dictionary searching program 220 as a program.

The English-Japanese dictionary DB 200 is a dictionary DB storing contents regarding an English-Japanese dictionary. Here, the dictionary DB is a DB structured to include an entry word table, an example sentence table and a word example sentence table. The English-Japanese dictionary DB 200 includes an entry word table 202, an example sentence table 204 and a word example sentence table 206.

Figures 4, 5:
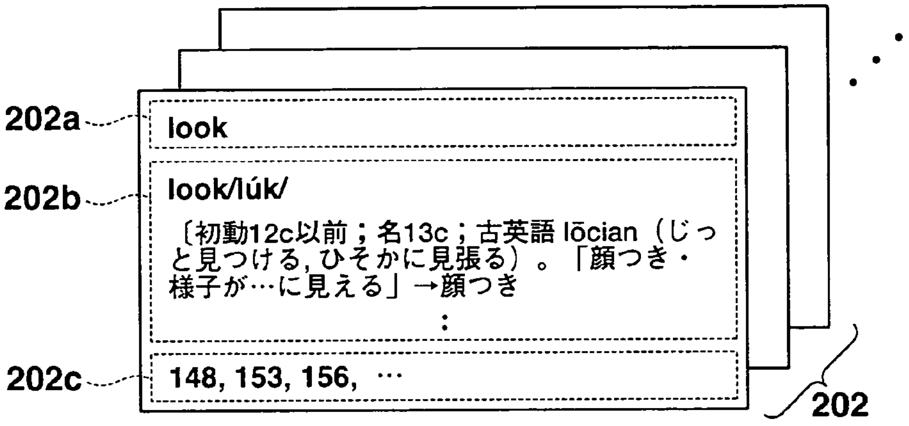
FIG. 4 is a view showing one example of a data structure of entry word data.
FIG. 5 is a view showing one example of a data structure of an example sentence table.

The entry word table 202 is a table in which an entry word, explanation information and an example sentence number of an example sentence which indeed uses the entry word are stored. FIG. 4 shows a data structure example of the entry word table 202. As shown in FIG. 4, the entry word table 202 stores an entry word 202*a*, explanation information 202*b* and an example sentence number 202*c*. When an example sentence key 7*b* is pushed when either the entry word 202*a* or the explanation information 202*b* is displayed, the CPU 10 displays an example sentence on the displaying unit 50 based on the example sentence number stored in the example sentence number 202*c*.

The example sentence table 204 is a table in which an example sentence number, an example sentence and translation of the example sentence (hereafter, a pair of an example sentence and translation of the example sentence is referred to as "example sentence information") are stored so as to relate the example sentence and the translation to the example sentence number. FIG. 5 shows a data structure example of the example sentence table 204. As shown in FIG. 5, the example sentence table 204 stores an example sentence number (for example, "80"), and example sentence information composed of an example sentence (for example, "a look forward") and translation of the example sentence (for example, "先見") so as to relate each other. Further, the example sentence is a sentence composed of a plurality of words. In several dictionary contents, "look for" or the like is called as a phrase, "be interested in" or the like is called as an idiom, and "United States" or the like is called as a compound word. However, in the present embodiment, these are regarded as a type of an example sentence and therefore are included in example sentences.

The word example sentence table 206 is a table in which an example sentence number of an example sentence using a word, so as to relate the example sentence number to the word. As shown in FIG. 6, the word example sentence 206 stores an example sentence word (for example, "look") being a word used in an example sentence, and an example sentence number (for example, ". . . , 30, . . . , 80, . . . ") so as to relate the example sentence word to the example sentence number.

The English-English dictionary DB 210 is a dictionary DB storing contents of an English-English dictionary. The CPU 10 refers to the English-English dictionary 210 when an operation mode of the dictionary is English-English dictionary search, or when a plural dictionary search is to be performed. Here, since a dictionary DB structure of the English-English dictionary DB 210 is approximately the same as that of the English-Japanese dictionary DB, the description thereof is omitted.

The dictionary searching program 220 is a program to be loaded from the ROM 20, to be developed into the RAM 30 and then to be executed by the CPU 10. The dictionary searching program 220 includes an example sentence searching program 222, an entry word searching program 224, an example sentence displaying program 230 as a subroutine. Further, the example sentence displaying program 230 includes an addition word inputting program 232, an addition word selecting program 234, an addition word inputting condition program 236 and an addiction word selecting condition program 238 as a subroutine. These subroutine programs will be described in detail.

The RAM 30 is a memory being writable at any time, for temporarily storing various types of programs to be executed by the CPU 10, data regarding the execution of these programs, and the like. In the present embodiment, in the RAM 30, what is secured is a search example number storing area 302, an operation area 304, an inputted word group storing area 306 and a target dictionary storing area 308.

The search example sentence number storing area 302 is a storing area to be referred to when the CPU 10 displays a list of example sentences. As shown in FIG. 7, the search example sentence number storing area 302 stores a type (name) of a dictionary DB and an example sentence number so as to relate each other. Then, based on example sentence numbers stored in the search example sentence number storing area 302 (hereafter, it is accordingly referred to as "search example sentence number"), the CPU 10 displays a list of the example sentences.

For example, a case of extracting a search example sentence number of an example sentence including "look" and "forward" will be described briefly. The CPU 10 loads example sentence numbers ". . . , 30, . . . , 80, . . . 84, . . . " corresponding to "look", from the word example sentence table 206. Subsequently, the CPU 10 loads example sentence numbers ". . . , 24, . . . , 48, . . . 80, . . . " corresponding to "forward", from the word example sentence table 206. Then, example sentence numbers ". . . , 80, 84, 153, . . . " being common in the two are extracted as search example sentence numbers, and stored in the search example sentence number storing area 302.

The operation area 304 is a memory area which is temporarily used for extracting and organizing example sentence numbers. For example, an example sentence number for each inputted word included in an inputted word group is once stored in the operation area 304. Then, the CPU 10 extracts common example sentence numbers from the example sentence numbers stored in the operation area 304, and stores them in the search example sentence number storing area 302 as example sentence numbers of example sentences including all the inputted words of the inputted word group.

The inputted word group storing area 306 is an area for storing an inputted words group comprising at least one inputted word which is inputted by a user. When the CPU 10 stores a plurality of inputted words in the inputted word group, a separating letter (for example, "&") is used to store them with. For example, as an example of the inputted word group storing area 306 shown in FIG. 8, when "look" and "forward" are to be stored as inputted words, they are connected with the separating letter "&" to be stored as "look&forward".

The target dictionary storing area 308 is an area for storing a type (name) of a dictionary DB which is currently a target of a process of searching, displaying or the like. For example, if "English-Japanese dictionary" is stored, at the time of searching for an entry word, displaying a list of example sentences the like, the CPU 10 executes processes such as searching for explanation information of the entry word from the entry word table 202, loading example sentence information from the example sentence table 204 by using the English-Japanese dictionary DB 200 as a target.

[1.2 CPU]

The CPU 10 executes a process based on a predetermined program according to an inputted instruction, for instructing to each function unit and for transmitting data. Concretely, the CPU 10 loads a program stored in the ROM 20 according to an instruction signal inputted from the inputting unit 40, and executes a process according to the program. Then, the CPU 10 accordingly outputs a display control signal for displaying the process result, to the displaying unit 50, and displays the corresponding display information.

Further, in the present embodiment, the CPU 10 executes a dictionary searching process (see FIG. 9) according to the dictionary searching program 220 in the ROM 20. Further, the CPU 10 executes an example sentence searching process (see FIG. 10) according to the example sentence searching program 222, an entry word searching process (FIG. 11) according to the entry word searching program 224, and an example sentence displaying process (see FIG. 12) according to the example sentence displaying program 230, as a subroutine. Further, in the example sentence displaying process, the CPU 10 executes an addition word inputting process (see FIG. 13) according to the addition word inputting program 232, an addition word selecting process (see FIG. 14) according to the addition word selecting program 234, an addition word inputting condition process (see FIG. 15) according to the addition word inputting condition program 236, and an addition word selecting condition process (see FIG. 16) according to the addition word selecting condition program 238, as a subroutine.

The CPU 10 allows a user to select an operation of the electronic dictionary in the dictionary searching process. Then, if the operation of the electronic dictionary is the plural dictionary search, the CPU 10 executes the example sentence searching process. If the operation of the electronic dictionary is the English-Japanese dictionary search, the CPU 10 executes the entry word searching process as a subroutine. Then, the CPU 10 executes the example sentence displaying process as a subroutine.

Further, in the example sentence searching process, the CPU 10 extracts an example sentence number including all the inputted words of the inputted word group. Then, the CPU 10 stores the extracted example sentence number in the search example sentence number storing area 302.

Further, in the entry word searching process, the CPU 10 selects an entry word conforming to an inputted word. Then, the CPU 10 displays explanation information of the selected entry word on the displaying unit 50. Then, when the example sentence key **7*b* is pushed, the CPU 10 loads an example sentence number corresponding to the entry word, and stores it in the search example sentence number storing area 302**.

Further, in the example sentence displaying process, the CPU 10 displays a list of example sentences corresponding to an example sentence DB corresponding to a selected dictionary DB, according to the search example sentence number storing area 302. Then, if there is an instruction of a narrowing down operation, the CPU 10 executes each of the addition word inputting process, the addition word selecting process, the addition word inputting condition process and the addition word selecting condition process, according to the narrowing down operation, and re-displays a list of the example sentences. Then, when the decide key 9 is pushed, the CPU 10 displays example sentence information. Here, the narrowing down operation is an operation to update display of the list according to an assigned addition word, if the addition word is assigned when a list of example sentences are displayed.

Further, in the addition word inputting process, the CPU 10 allows a user to input an addition word. Then, the CPU 10 loads an example sentence number corresponding to the addition word (hereafter, it is accordingly referred to as "addition example sentence number"), and extracts a common example sentence number with the search example sentence number. Then, in conjunction with updating the search example sentence number storing area 302 with the extracted common example sentence number, the CPU 10 updates the inputted word group storing area 306 by adding the addition words.

Further, in the addition word selecting process, the CPU 10 displays a selection cursor. Then, when the decide key 9 is pushed, the CPU 10 stores a word on which the selection cursor is located, as an addition word. Then, the CPU 10 loads the addition example sentence number, and extracts a common example sentence number with the search example sentence numbers. Then, in conjunction with updating the search example sentence number storing area 302 with the extracted common example sentence number, the CPU updates the inputted word group storing area by adding the addition word.

Further, in the addition word inputting condition process, the CPU 10 displays a condition selecting window, allows a user to input an addition word, and allows the user to select an extracting condition. Here, the extracting condition is a condition assigning a relative positional relation between the inputted word group and the addition word. Concretely, the assignation is made by combining a condition assigning a relative positional relation whether the addition word is located near the beginning of the sentence with respect to the inputted word group (located before the inputted word group), or near the end of the sentence with respect to the inputted word group (located after the inputted word group), and a condition assigning whether the addition word is adjacent to the inputted word or away from the inputted word. Therefore, the extraction condition includes five types of conditions, which are "AWAY-BEFORE", "ADJACENT-BEFORE", "ADJACENT-AFTER" and "AWAY-AFTER", and "NORMAL SEARCH" under which the search is normally done. Then, the CPU 10 extracts an example sentence number according to the extraction condition, and updates the search example sentence number storing area 302.

Further, in the addition word selecting condition process, the CPU 10 displays a selection cursor. Then, when the decide key 9 is pushed, the CPU 10 stores a word on which the selection cursor is located, as an addition word. Then, the CPU 10 displays a condition selecting window, for allowing a user to select an extraction condition. Then, the CPU 10 extracts an example sentence number according to the selected extraction condition, and updates the search example sentence number storing area.

[1.3 Inputting Unit, Displaying Unit, etc.]

The inputting unit 40 is an inputting device comprising a key group which is necessary for inputting letters such as kana, alphabet and the like, and for selecting a function. The inputting unit 40 outputs a signal of a pushed key to the CPU 10. Key inputs at the inputting unit 40 realize an inputting unit for inputting a search word, selecting a dictionary mode, assigning search execution, starting the jump function and the like. Here, the inputting unit 40 is not limited to the key group 5 in FIG. 1, and may be a touch panel or the like.

The displaying unit 50 displays various types of screens based on a display signal inputted from the CPU 10. The displaying unit 50 comprises an LCD (Liquid Crystal Display) or the like. Here, the displaying unit 50 is equivalent to the display 3 shown in FIG. 1.

The bus 60 is a path for passing an electrical signal such as data and the like from the CPU 10. Further, the bus 60 is a signal line for interconnecting the CPU 10, the ROM 20, the RAM 30, the inputting unit 40 and the displaying unit 50, respectively.

[2. Process]

[2.1 Dictionary Searching Process]

Figure 9:
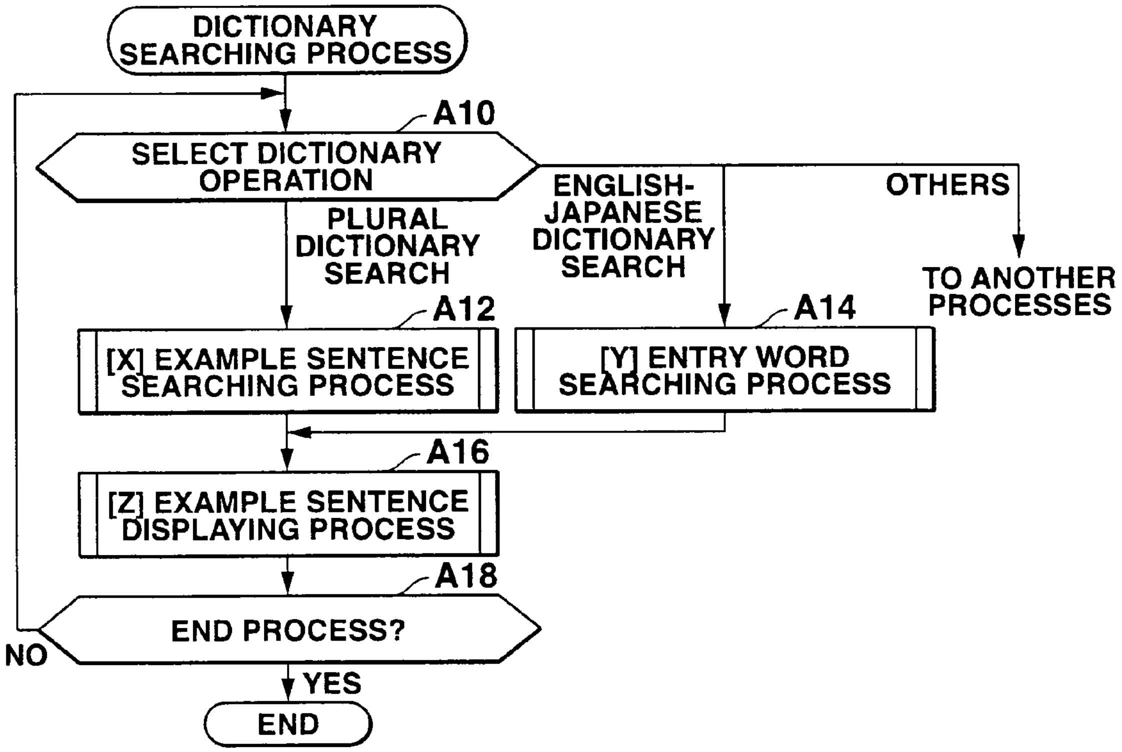
FIG. 9 is a view showing an operation flow of a dictionary searching process.

First, a dictionary searching process will be described. FIG. 9 is a flowchart for describing an operation of the electronic dictionary 1 according to the dictionary searching process. The dictionary searching process is a process implemented with the CPU 10 executing the dictionary searching program 220 stored in the ROM 20.

First, the CPU 10 allows a user to select a dictionary operation, and executes a process according to the selected dictionary operation (Step A10). Here, if "PLURAL DICTIONARY SEARCH" is selected as the dictionary operation (Step A10; PLURAL DICTIONARY SEARCH), the CPU 10 executes [X] example sentence searching process (FIG. 10) as a subroutine (Step A12), if "ENGLISH-JAPANESE DICTIONARY SEARCH" is selected (Step A10; ENGLISH-JAPANESE DICTIONARY SEARCH), the CPU 10 executes [Y] entry word searching process (FIG. 11) as a subroutine (Step A14). Here, as a method for selecting a dictionary operation, for example, selection of a dictionary operation is detected by pushing the plural dictionary search key 7*a* or the English-Japanese dictionary search key 7*c*, or by selecting one from a displayed menu.

The CPU 10 continuously executes [Z] example sentence displaying process (FIG. 12) as a subroutine (Step A16), and judges whether to end the process or not (Step A18). If a user inputs to end the process (Step A18; Yes), the CPU 10 ends the dictionary searching process. On the contrary, if a user does not input to end the process (Step A18; No), the CPU 10 executes processes back from Step A10, repeatedly (Step A18; No→Step A10).

[2.2 [X] Example Sentence Searching Process]

Figure 10:
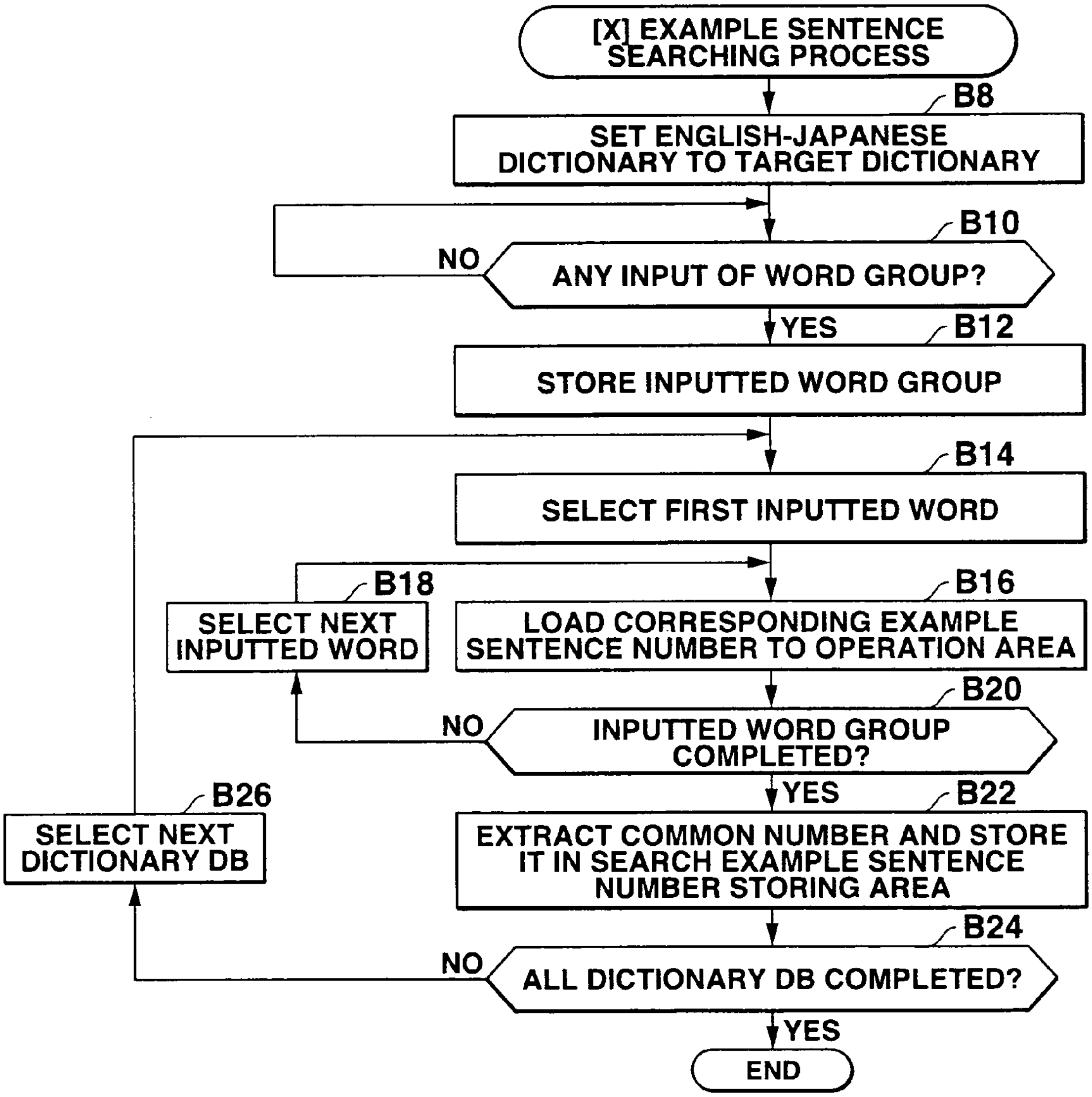
FIG. 10 is a view showing an operation flow of an example sentence searching process.

Continuously, [X] example sentence searching process will be described. FIG. 10 is a flowchart for describing an operation of the electronic dictionary 1 according to the example sentence searching process. The example sentence searching process is a process implemented with the CPU 10 executing the example sentence searching program 222 stored in the ROM 20. Further, the example sentence searching process is a process executed in Step A12 of the dictionary searching process as a subroutine.

First, the CPU 10 store a dictionary name as "English-Japanese dictionary" in the target dictionary storing area 308 (Step B8). Continuously, the CPU 10 judges whether there is an input of an inputted word group comprising at least one inputted word (Step B10). If there is an input of an inputted word group (Step B10; Yes), the CPU 10 stores the inputted word group in the inputted word group storing area 306 (Step B12). Continuously, the CPU 10 selects the first inputted word of the inputted word group (Step B14). Then, the CPU 10 loads an example sentence number corresponding to the selected inputted word from an example sentence table of the target dictionary DB, and stores the loaded number in the operation area 304 (Step B16). Here, since "English-Japanese dictionary" is stored in the target dictionary storing area 308, the CPU 10 loads an example sentence number corresponding to the inputted word from the word example sentence table 206 of the English-Japanese dictionary DB 200.

Next, the CPU 10 judges whether the process is completed on all the inputted word group stored in the inputted word group storing area 306 (Step B20). If there is an inputted word on which the process has not yet done (Step B20; No), the CPU 10 selects a next inputted word (Step B18), and executes processes back from Step B16, repeatedly.

Continuously, the CPU 10 extracts a common number in respective example sentence number corresponding to the inputted word stored in the operation area 304, and stores the extracted example sentence number (search example sentence number) in the search example sentence number storing area 302 (Step B22). Then, when the process is entirely completed on the English-Japanese dictionary DB and the English-English dictionary DB stored in the ROM 20 (Step B24; Yes), the CPU 10 ends the example sentence searching process, and returns to the dictionary searching process (FIG. 9), which is a main routine. On the contrary, if the process is not entirely completed on the dictionary DB stored in the ROM 20 (Step B24; No), the CPU 10 stores the next dictionary DB (English-English dictionary DB 210) as a target dictionary DB in the target dictionary storing area 308, and executes the processes back from Step B14, repeatedly.

[2.3 [Y] Entry Word Searching Process]

Figure 11:
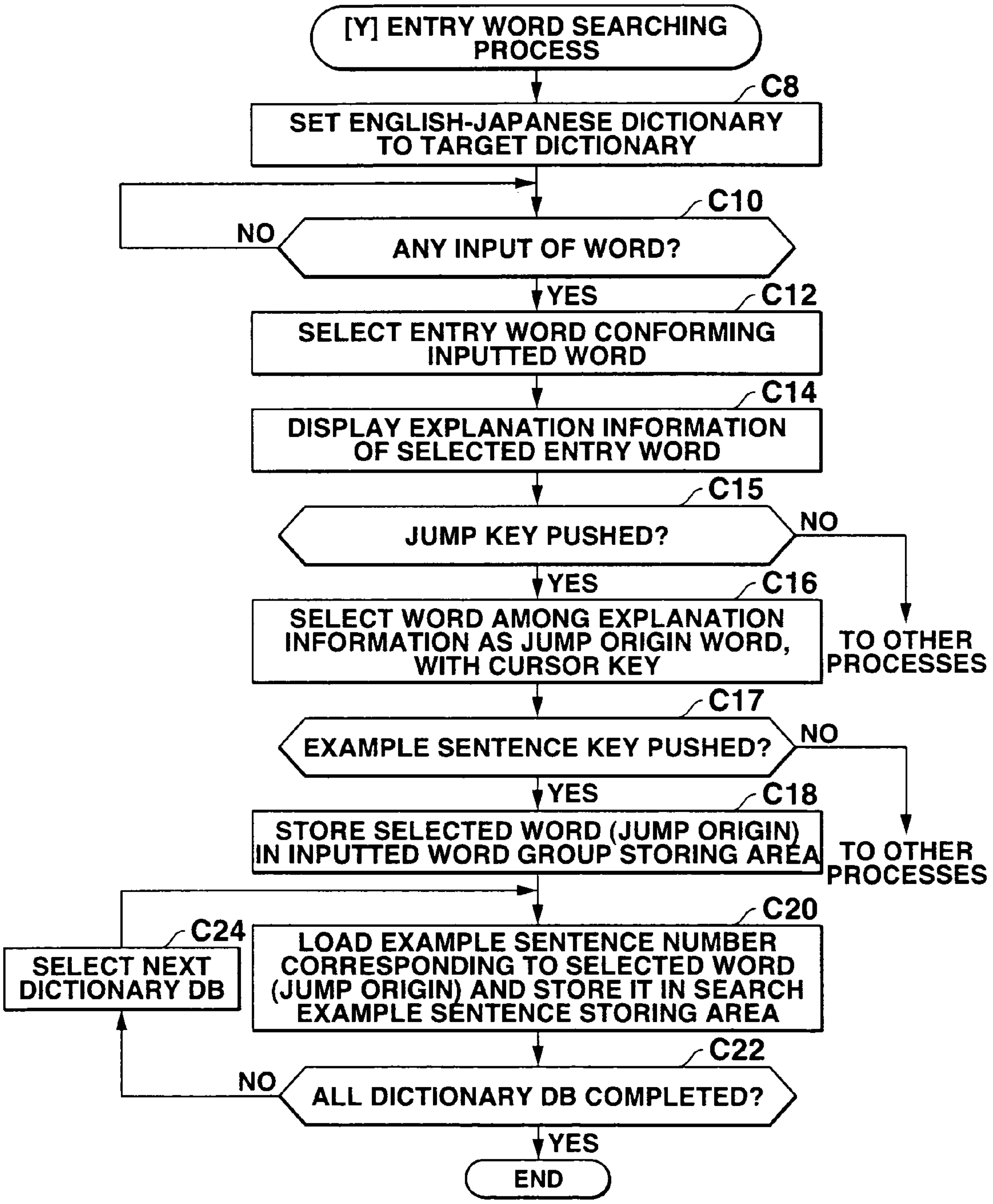
FIG. 11 is a view showing an operation flow of an entry word searching process.

Continuously, [Y] entry word searching process will be described. FIG. 11 is a flowchart for describing an operation of the electronic dictionary 1 according to the entry word searching process. The entry word searching process is a process implemented with the CPU 10 executing the entry word searching program 224 stored in the ROM 20. Further, the entry word searching process is a process executed in Step A14 of the dictionary searching process, as a subroutine.

First, in response to the push on the English-Japanese dictionary search key 7*c*, the CPU 10 stores "English-Japanese dictionary" in the target dictionary storing area 308 as a target dictionary (Step C8).

Continuously, when a word is inputted (Step C10; Yes), the CPU 10 selects an entry word conforming to the inputted word from the entry word table 202 (Step C12). Then, the CPU 10 loads explanation information corresponding to the selected entry word from the entry word table 202 and displays the loaded information on the displaying unit 50 (Step C14).

Next, the CPU 10 judges whether the jump key 13*b* is pushed (Step C15) Here, if the jump key 13*b* is pushed (Step C15; Yes), inversion display is applied on the top word in the explanation information displayed on the displaying unit 50. Here, by operating the cursor keys 11*a* and 11*b* for moving an inversion-displayed word, any one word within the explanation information is selected as a jump origin word (Step C16).

Next, the CPU 10 judges whether the example sentence key 7*b* is pushed (Step C17). Here, if the example sentence key 7*b* is pushed (Step C17; Yes), the CPU 10 stores a word which is selected as the jump origin word in the inputted word group storing area 306 (Step C18).

The CPU 10 loads an example sentence number corresponding to the word selected as the jump origin word from the entry word table 202, and stores the loaded number in the search example sentence number storing area 302 (Step C20).

Then, the CPU 10 judges whether the process is completed on the other dictionary DB (English-English dictionary DB 210) stored in the ROM 20 (Step C22). If the process is not completed on the other dictionary (English-English dictionary DB 210) (Step C22; No), the CPU 10 stores the other dictionary DB (English-English dictionary DB 210) in the target dictionary storing area 308 as a target dictionary (Step C24), and executes the processes back from Step C20, repeatedly. On the contrary, if the process is completed on the other dictionary DB stored in the ROM 20 (Step C22; Yes), the CPU 10 ends the entry word searching process, and returns to the dictionary searching process (FIG. 9), which is a main routine.

[2.4 [Z] Example Sentence Displaying Process]

Figure 12:
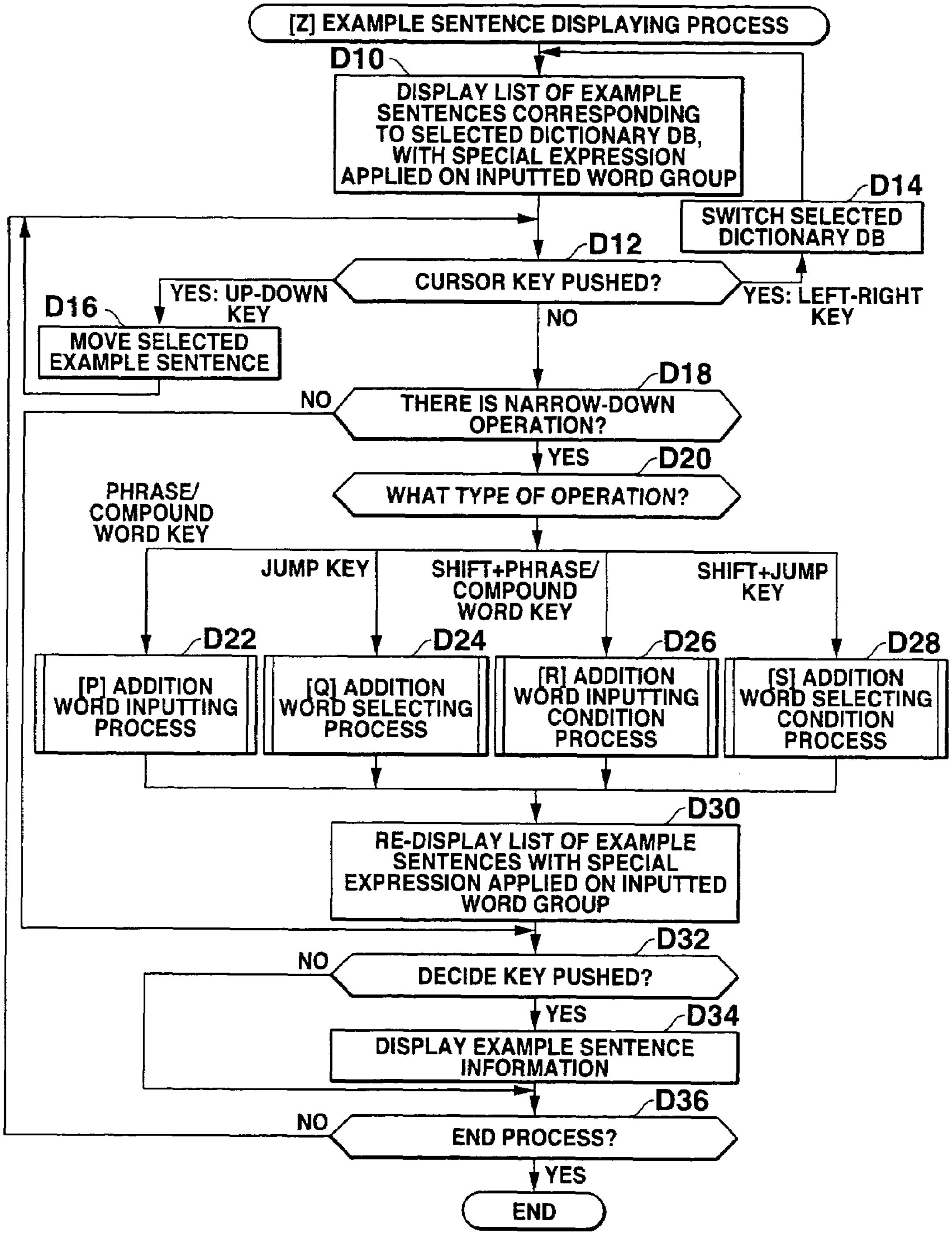
FIG. 12 is a view showing an operation flow of an example sentence displaying process.

Continuously, [Z] example sentence displaying process will be described. FIG. 12 is a flowchart for describing an operation of the electronic dictionary 1 according to the example sentence displaying process. The example sentence displaying process is a process implemented with the CPU 10 executing the example sentence displaying program 230 stored in the ROM 20. Further, the example sentence displaying process is a process executed in Step A16 of the dictionary searching process, as a subroutine.

First, the CPU 10 displays a list of example sentences corresponding to the selected dictionary DB, with special expression applied on the inputted word group (Step D10). Continuously, the CPU 10 judges whether the cursor key 11 is pushed (Step D12). Here, if the left-right direction key 11*a* is pushed (Step D12; LEFT-RIGHT KEY), the CPU 10 switches a selected dictionary DB (Step D14), and re-execute Step D10. Further, if the up-down cursor key is pushed (Step D12; UP-DOWN KEY), the CPU 10 moves a selected example sentence (Step D16), and the process returns to Step D12.

Continuously, the CPU 10 judges whether there is a narrow-down operation (Step D18). Here, if there is a narrow-down operation (Step D18; Yes), the CPU 10 executes a subroutine according to contents of the narrow-down operation (Step D20). Concretely, if the phrase/compound word key 13*a* is pushed, the CPU 10 executes [P] addition word inputting process (FIG. 13) as a subroutine (Step D22). If the jump key 13*b* is pushed, the CPU 10 executes [Q] addition word selecting process (FIG. 14) as a subroutine (Step D24). If the phrase/compound word key 13*a* is pushed after the shift key 15 is pushed, the CPU 10 executes [R] addition word inputting condition process (FIG. 15) as a subroutine (Step D26). If the jump key 13*b* is pushed after the shift key 15 is pushed, the CPU 10 executes [S] addition word selecting condition process (FIG. 16) as a subroutine (Step D28).

Then, the CPU 10 re-displays a list of example sentences based on example sentence numbers stored in the search example sentence number storing area 302, with special expression applied on the inputted word group (Step D30). Here, if the decide key 9 is pushed (Step D32; Yes), the CPU 10 loads example sentence information from the example sentence table 204 and displays the loaded example sentence information (Step D34). Then, if the CPU 10 judges that a user inputs to end the process (Step D36; Yes), the CPU 10 ends the example sentence displaying process and the process returns to the dictionary searching process (FIG. 9). On the contrary, if the CPU 10 judges that a user does not input to end the process (Step D36; No), the CPU 10 executes the processes back from Step D12, repeatedly.

[2.5 [P] Addition Word Inputting Process]

Figure 13:
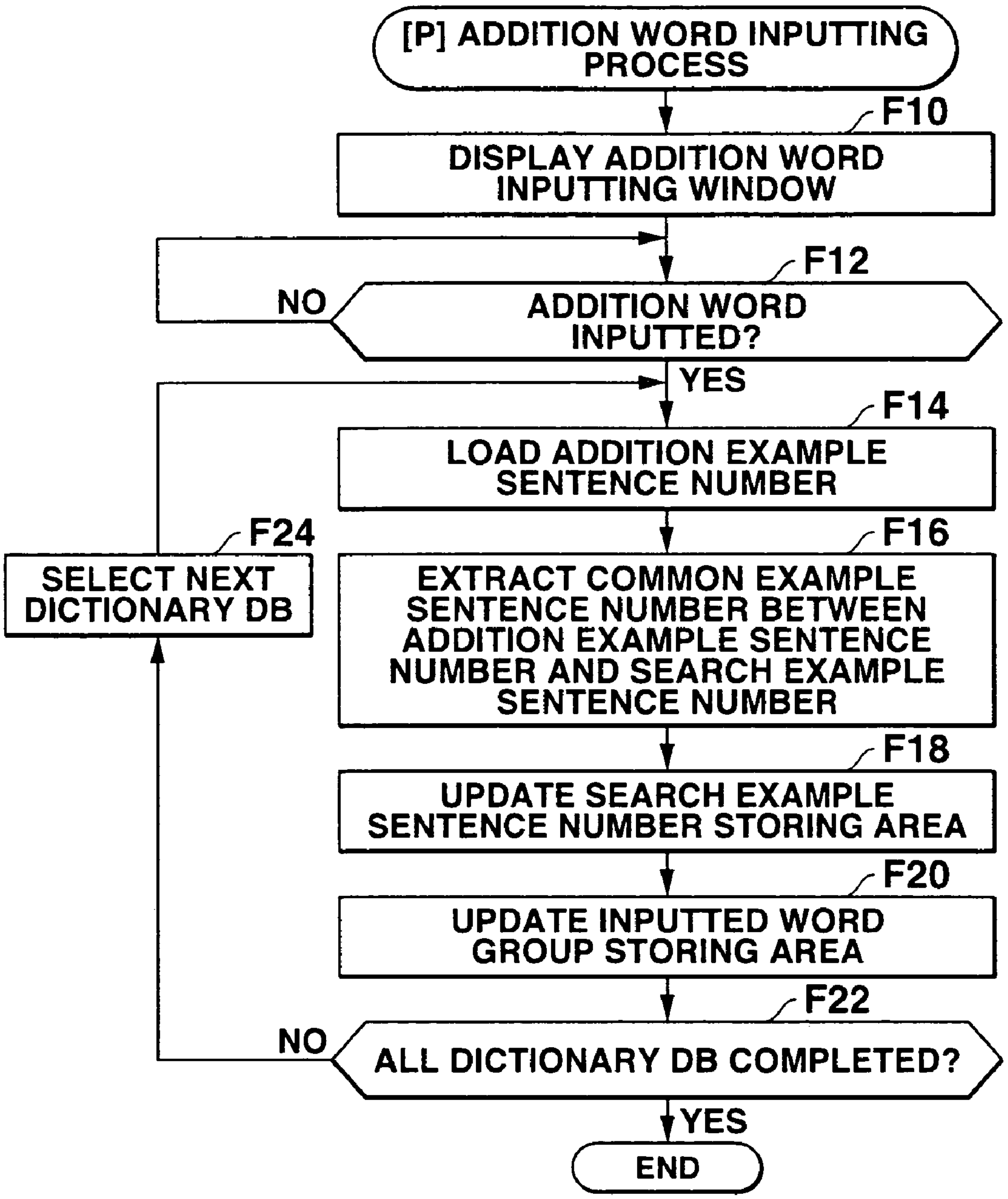
FIG. 13 is a view showing an operation flow of an addition word inputting process.

Continuously, [P] addition word inputting process will be described. FIG. 13 is a flowchart for describing an operation of the electronic dictionary 1 according to the addition word inputting process. The addition word inputting process is a process implemented with the CPU 10 executing the addition word inputting program 232 stored in the ROM 20. Further, the addition word inputting process is a process executed in Step D22 of the example sentence displaying process, as a subroutine.

First, the CPU 10 displays an addition word inputting window (Step F10). Continuously, when an addition word is inputted (Step F12), the CPU 10 loads an example sentence number corresponding to the addition word from the word example sentence table 206 as an addition example sentence number, and stores the loaded example sentence number (Step F14). Continuously, the CPU 10 extracts a common example sentence number between the addition example sentence number and the search example sentence number (Step F16), and updates the search example sentence number storing area 302 (Step F18). Further, the CPU 10 adds the addition word to the inputted word group and updates the inputted word group storing area 306 (Step F20).

Here, if the CPU 10 judges that the process is completed on all the dictionary DB(s) (Step F22; Yes), the CPU 10 ends the addition word inputting process and the process returns to the example sentence displaying process (FIG. 12). On the contrary, if the process is not completed on all the dictionary DB(s) (Step F22; No), the CPU 10 selects a next dictionary DB (Step F24), and executes the processes back from Step F14, repeatedly.

[2.6 [Q] Addition Word Selecting Process]

Figure 14:
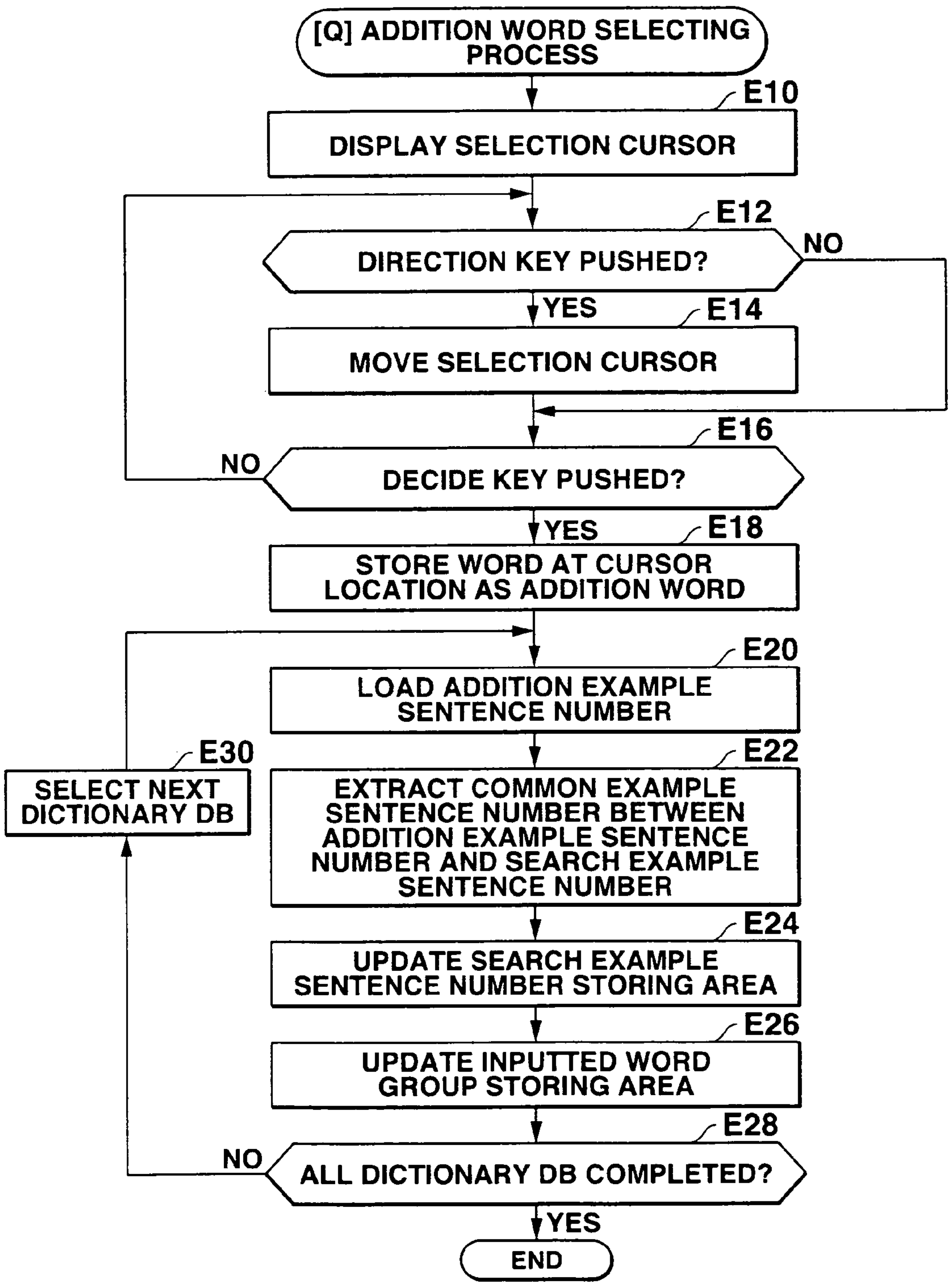
FIG. 14 is a view showing an operation flow of an addition word selecting process.

Continuously, [Q] addition word selecting process will be described. FIG. 14 is a flowchart for describing an operation of the electronic dictionary 1 according to the addition word selecting process. The addition word selecting process is a process implemented with the CPU 10 executing the addition word selecting program stored in the ROM 20. Further, the addition word selecting process is a process executed in Step D24 of the example sentence displaying process, as a subroutine.

The CPU 10 displays a selection cursor on the displaying unit 50, the selection cursor selecting a word (Step E10). Continuously, if the direction key 11 is pushed (Step E12; Yes), the CPU 10 moves the selection cursor to a word located in the same direction as the pushed direction key (Step E14). Then, if the decide key is pushed (Step E16; Yes), the CPU 10 stores a word at the cursor location as an addition word (Step E18).

Continuously, the CPU 10 loads an addition example sentence number corresponding to the stored addition word from the example sentence table 204 (Step E20). Continuously, the CPU 10 extracts a common example sentence number between the addition example sentence number and the search example sentence number (Step E22), and updates the search example sentence number storing area 302 (Step E24). Further, the CPU 10 adds the addition word to the inputted word group and updates the inputted word group storing area 306 (Step E26).

Here, if the CPU 10 judges that the process is completed on all the dictionary DB(s) (Step E28; Yes), the CPU 10 ends the addition word inputting process and the process returns to the example sentence displaying process (FIG. 12). On the contrary, if the process is not completed on all the dictionary DB(s) (Step E28; No), the CPU 10 selects a next dictionary DB (Step E30), and executes the processes back from Step E20, repeatedly.

[2.7 [R] Addition Word Inputting Condition Process]

Figure 15:
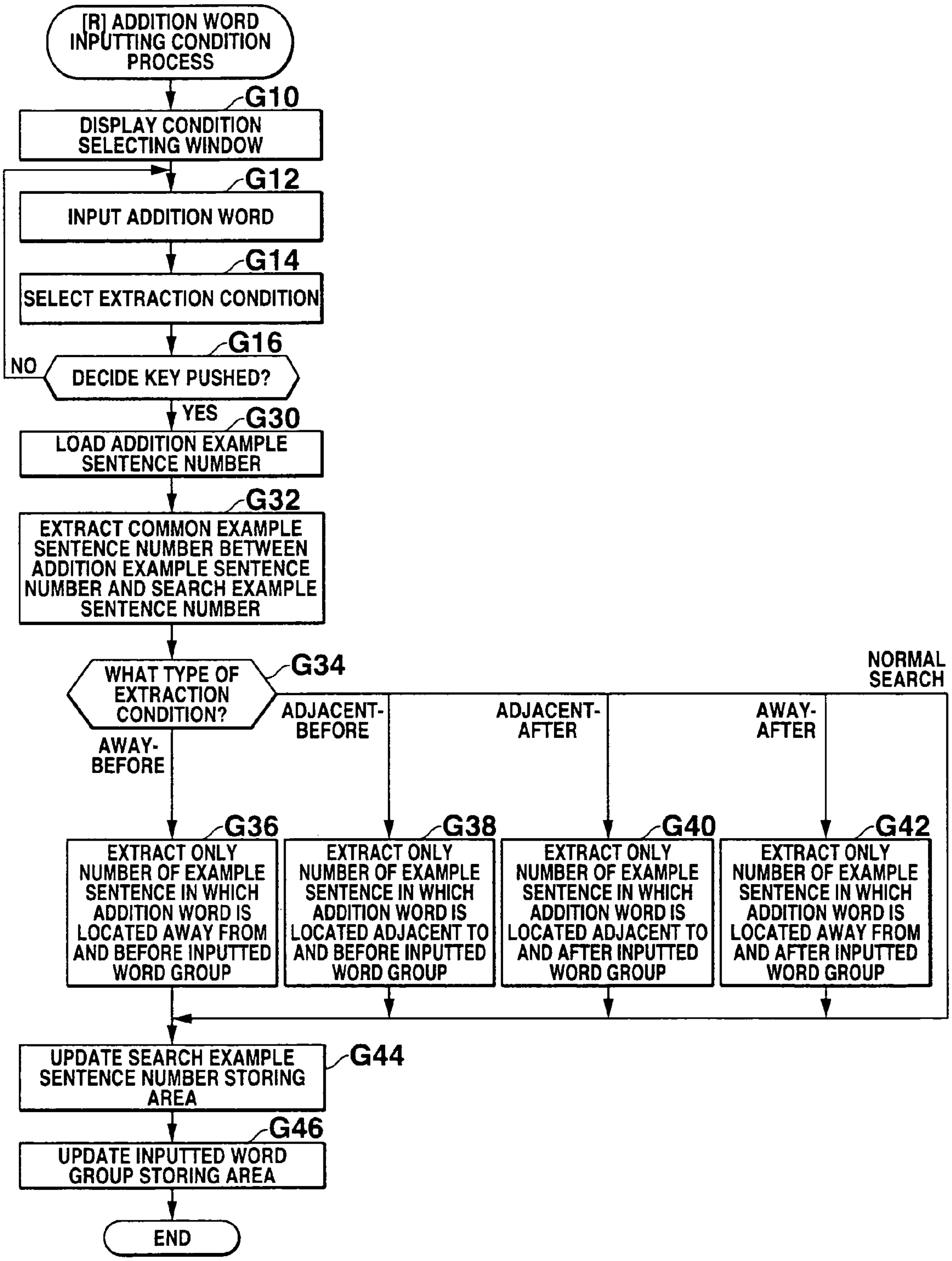
FIG. 15 is a view showing an operation flow of an addition word inputting condition process.

Continuously, [R] addition word inputting condition process will be described. FIG. 15 is a flowchart for describing an operation of the electronic dictionary 1 according to the addition word inputting condition process. The addition word inputting condition process is a process implemented with the CPU executing the addition word inputting condition program stored in the ROM 20. Further, the addition word inputting condition process is a process executed in Step D26 of the example sentence displaying process as a subroutine.

First, the CPU 10 displays a condition selecting window (Step G10). Next, after a user inputs an addition word (Step G12) and selects an extraction condition (Step G14), the CPU 10 judges whether the decide key 9 is pushed (Step G16).

If the decide key 9 is pushed (Step G16; Yes), the CPU 10 loads an addition example sentence number corresponding to the addition word from the word example sentence table 206 (Step G30). Then, the CPU 10 extracts a common example sentence number between the addition example sentence number and the search example sentence number (Step G32). Then, the CPU 10 judges an assigned extraction condition in Step G14 (Step G34).

If "AWAY-BEFORE" is selected as an extraction condition (Step G34; AWAY-BEFORE), the CPU 10 further extracts only an example sentence number of an example sentence in which the addition word is located away from the inputted word group and is relatively located before the inputted word group (Step G36).

Further, if "ADJACENT-BEFORE" is selected as an extraction condition (Step G34; ADJACENT-BEFORE), the CPU 10 further extracts only an example sentence number of an example sentence in which the addition word is located adjacent to the inputted word group and is relatively located before the inputted word group (Step G38).

Further, if "ADJACENT-AFTER" is selected as an extraction condition (Step G34; ADJACENT-AFTER), the CPU 10 further extracts only an example sentence number of an example sentence in which the addition word is located adjacent to the inputted word group and is relatively located after the inputted word group (Step G40).

Further, if "AWAY-AFTER" is selected as an extraction condition (Step G34; AWAY-AFTER), the CPU 10 further extracts only an example sentence number of an example sentence in which the addition word is located away from the inputted word group and is relatively located after the inputted word group (Step G42).

Further, is an extraction condition is "NORMAL SEARCH" (Step G34; NORMAL SEARCH), the common example sentence number extracted in Step G32 is as-is to be used.

Then, the CPU 10 updates the search example sentence number storing area 302 based on the extracted example sentence number (step G44), and the CPU 10 updates the inputted word group storing area 306 by adding the addition word to the inputted word group (Step G46). Then, the CPU 10 ends the addition word inputting condition process, and the process returns to the example sentence displaying process (FIG. 12).

[2.8 [S] Addition Word Selecting Condition Process]

Figure 16:
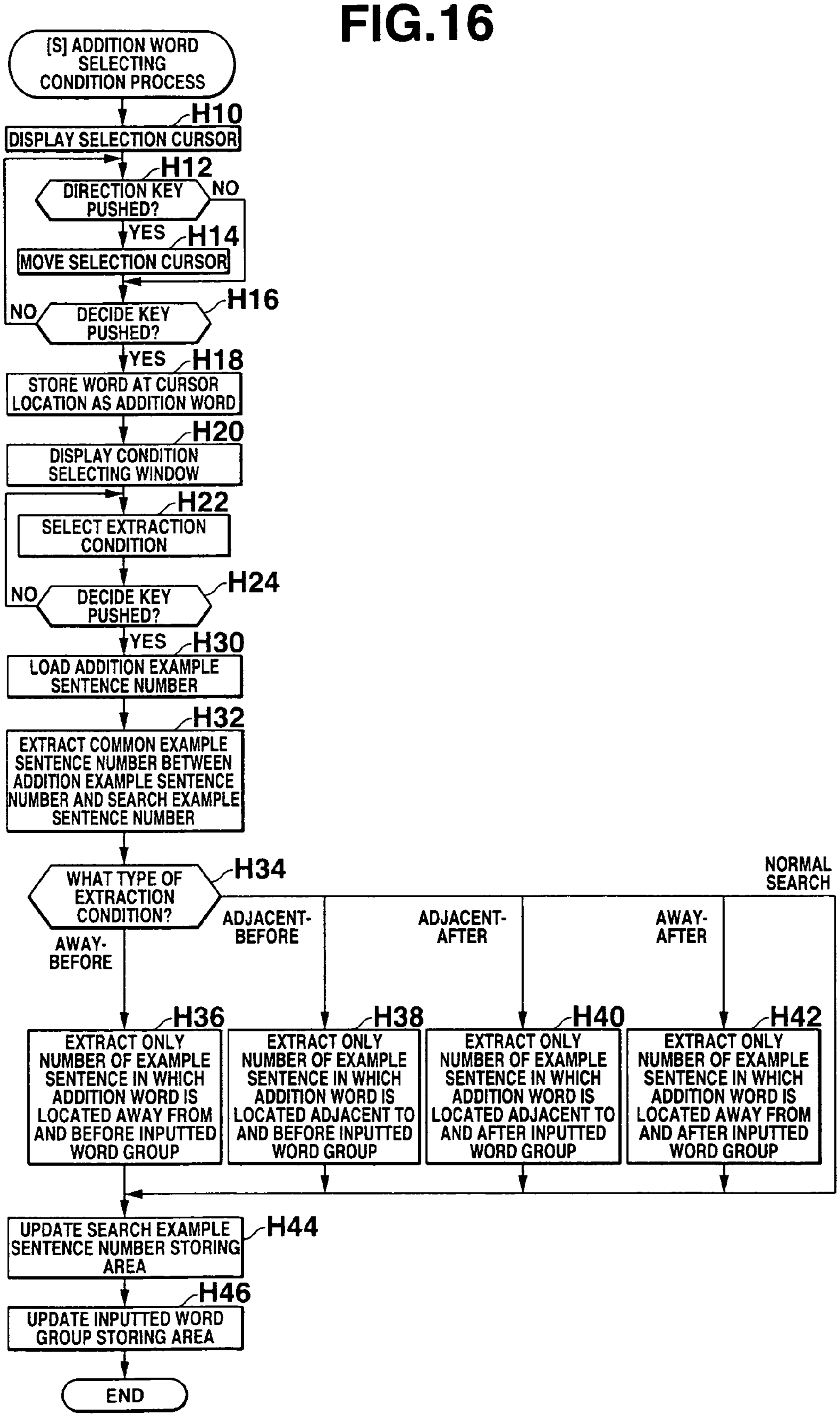
FIG. 16 is a view showing an operation flow of an addition word selecting condition process.

Continuously, [S] addition word selecting condition process will be described. FIG. 16 is a flowchart for describing an operation of the electronic dictionary 1 according to the addition word selecting condition process. The addition word selecting condition process is a process implemented with the CPU 10 executing the addition word selecting condition program stored in the ROM 20. Further, the addition word selecting condition process is a process executed in Step D28 of the example sentence displaying process, as a subroutine. Here, since the processes from Step H30 to H46 in the addition word selecting condition process are the same as the processes from Step G30 to Step G46 in the addition word inputting condition process, detailed description of the corresponding part is omitted.

First, the CPU 10 displays a selection cursor on the displaying unit 50 (Step H10). If the CPU 10 judges that the direction key 11 is pushed (Step H12; Yes), the CPU 10 moves the cursor to a direction corresponding to the pushed direction key (Step H14).

When the decide key 9 is pushed (Step H16; Yes), the CPU 10 stores a word at the cursor location as an addition word (Step H18). Continuously, the CPU 10 displays a condition selecting window on the displaying unit 50 (Step H20), and allows a user to select an extraction condition (Step H22).

Here, if the decide key 9 is pushed (Step H24; Yes), the CPU 10 loads an addition example sentence number based on the addition word, and extracts a common example sentence number with the search example sentence number. Then, the CPU 10 updates the search example sentence number storing area 302 with the example sentence number extracted according to the selected extraction condition, and further updates the inputted word group storing area 306 with the addition word (Step H30 to Step H46). Then, the CPU 10 ends the addition word inputting condition process, and the process returns to the example sentence displaying process (FIG. 12).

3. OPERATION EXAMPLES

3.1 First Operation Example

Continuously, operation examples of the electronic dictionary 1 will be described with reference to figures of display screens. First, as a first operation example, a case of, in the dictionary searching process, after a word is inputted and a list of example sentences is displayed, updating display of a list of example sentences by further inputting an addition word will be described with reference to FIGS. 17A to 18D.

Figure 17A:
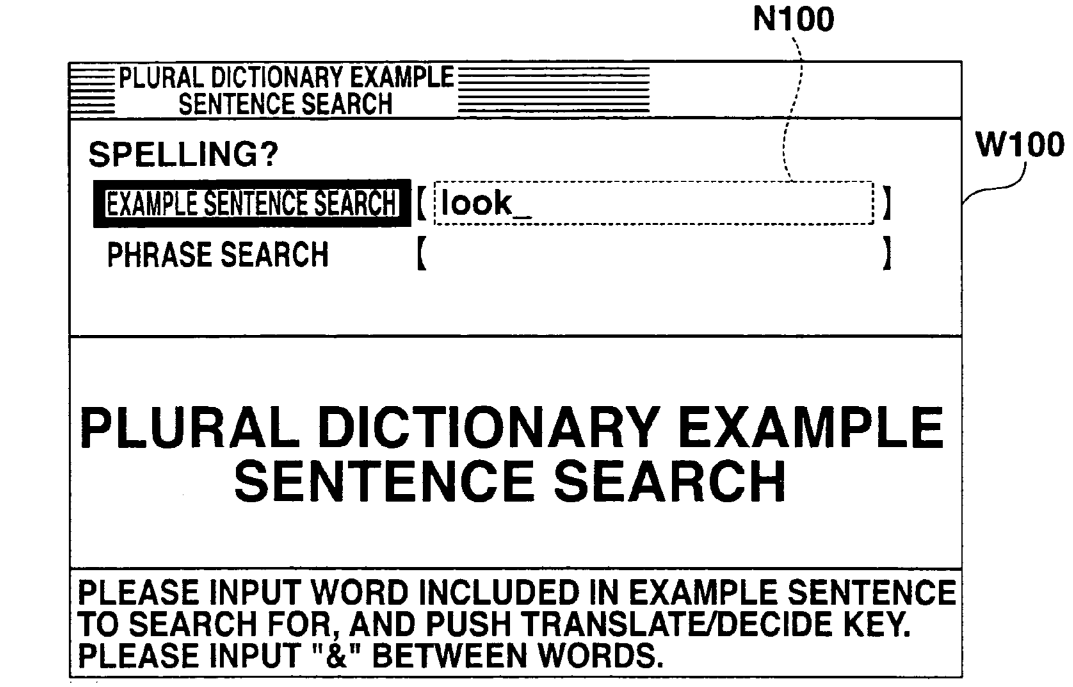
FIGS. 17A to 17D are views showing screen transitions (first operation example) in the present embodiment.

FIG. 17A is one example of a display screen W100 in the case of displaying a screen on the displaying unit 50, the screen prompting a user to input a word group. The CPU 10 stores a word "look" inputted in an input area N100 in the inputted word group storing area 306 (FIG. 9; A10, A12→FIG. 10; B12).

Figure 17B:
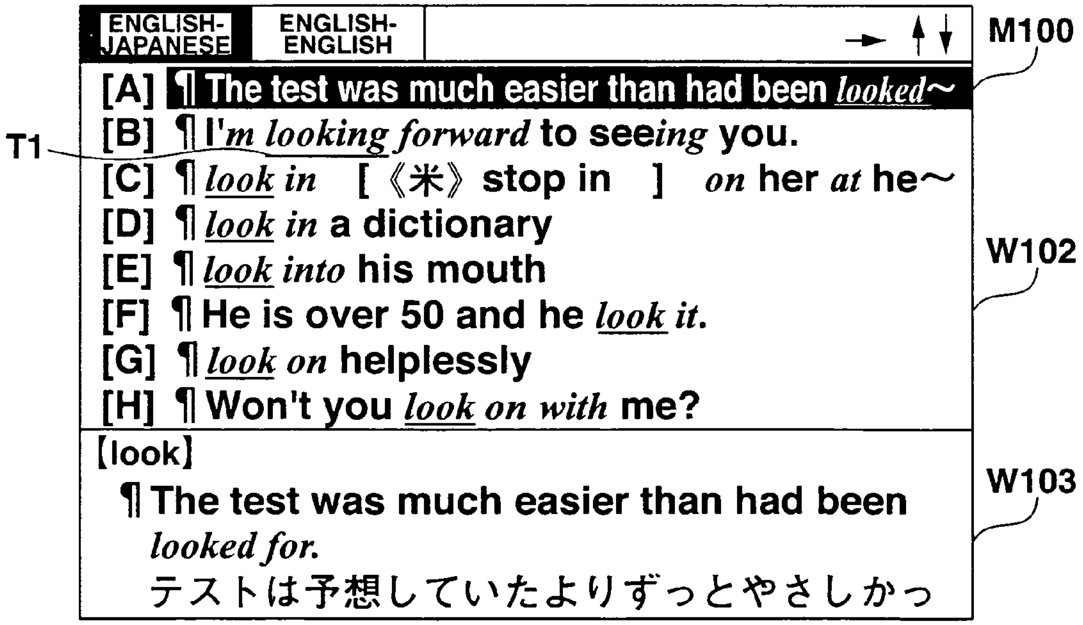

A display screen W102 in FIG. 17B is a state where the decide key 9 is pushed in the state of FIG. 17A. The CPU 10 loads example sentences corresponding to the search example sentence numbers stored in the search example sentence number storing area 302 from the example sentence table 204, and displays them as a list (FIG. 10; B14, B16, B20, B22, B24, END→FIG. 9; A16→FIG. 12; D10). Here, a screen of FIG. 17B is divided into two screens vertically, which are the display screen W102 and a display screen W103. The CPU 10 displays the example sentences corresponding to the search example sentence numbers stored in the search example sentence number storing area 302, on the display screen W102. Further, the CPU 10 applies special expression T1 on a portion conforming to the inputted word "look". Further, one example sentence is selected among the example sentences which are displayed as a list, and an inversion display M100 is applied on the selected example sentence. On the contrary, on the display screen W103, a part of example sentence information corresponding to the selected example (the example sentence on which the inversion display M100 is applied) is displayed. It is possible for a user to confirm a part of example sentence information of the selected example sentence by looking at the display screen W103. Accordingly, it is possible to improve the convenience at the search. Hereafter, between the divided two screens, only the upper screen will be described.

Figure 17C:
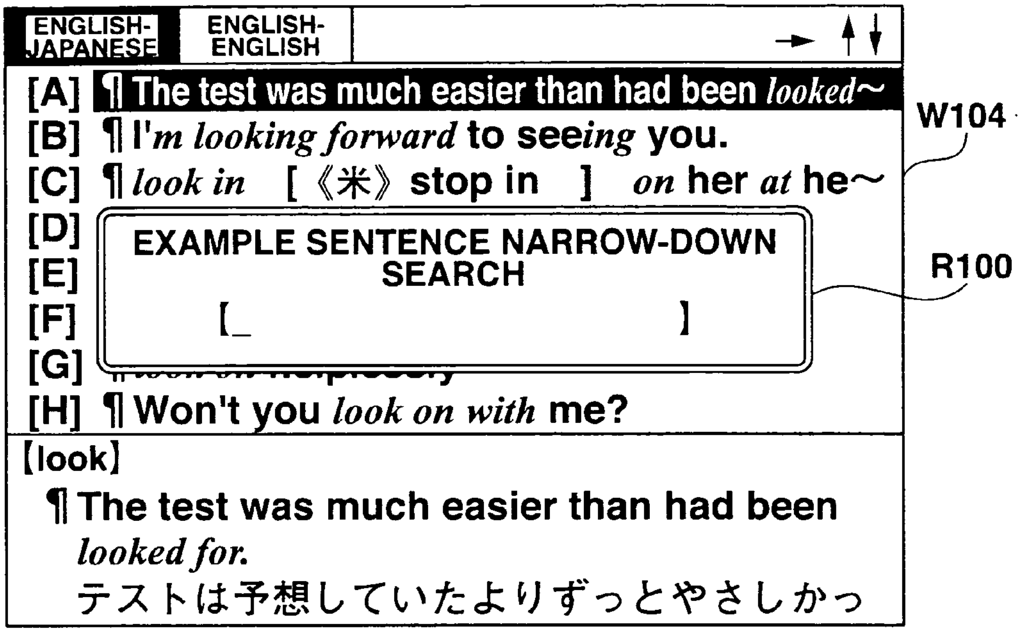
Figure 17D:
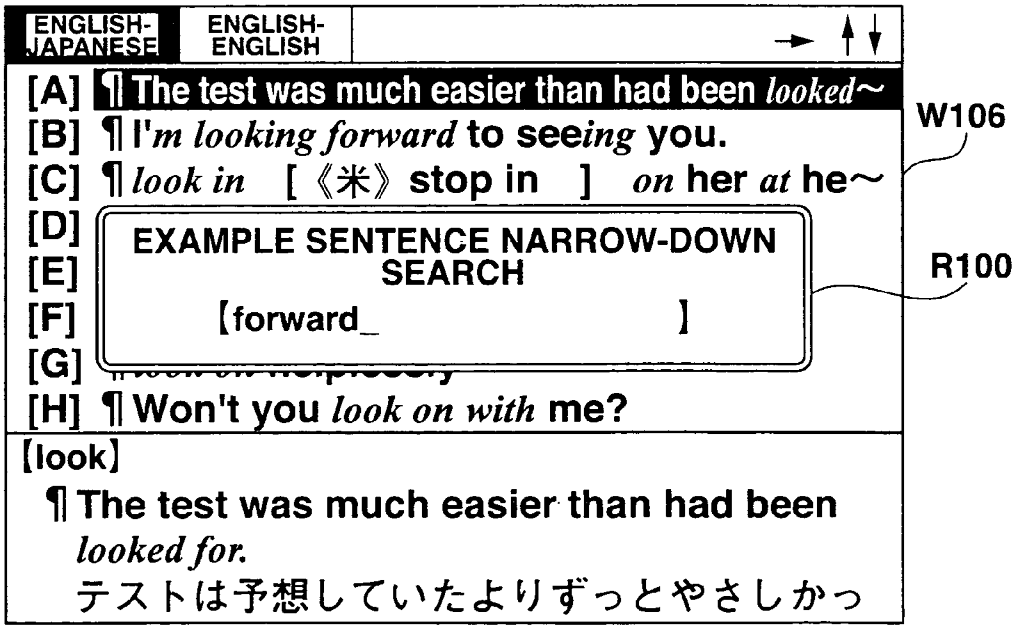

A display screen W104 of FIG. 17C is a state where the phrase/compound word key 13*a* is pushed in the state of FIG. 17B. When the phrase/compound word key 13*a* is pushed, the CPU 10 displays an addition word inputting window R100 on the display screen W104. Here, if an addition word "forward" is inputted (a display screen W106 of FIG. 17D) and the decide key 9 is pushed, the CPU 10 stores "forward" as an addition word (FIG. 12; D10, D12, D18, D20, D22→FIG. 13; F10).

Then, the CPU 10 displays example sentences including both the inputted word "look" and the addition word "forward" as a list (a display screen W108 of FIG. 18A) (FIG. 13; F12, F14, F16, F18, F20, F22, END→FIG. 12; D30). Here, a special expression T1 is applied on the inputted word "look", and a special expression T2 is applied on the addition word "forward".

Figure 18A:
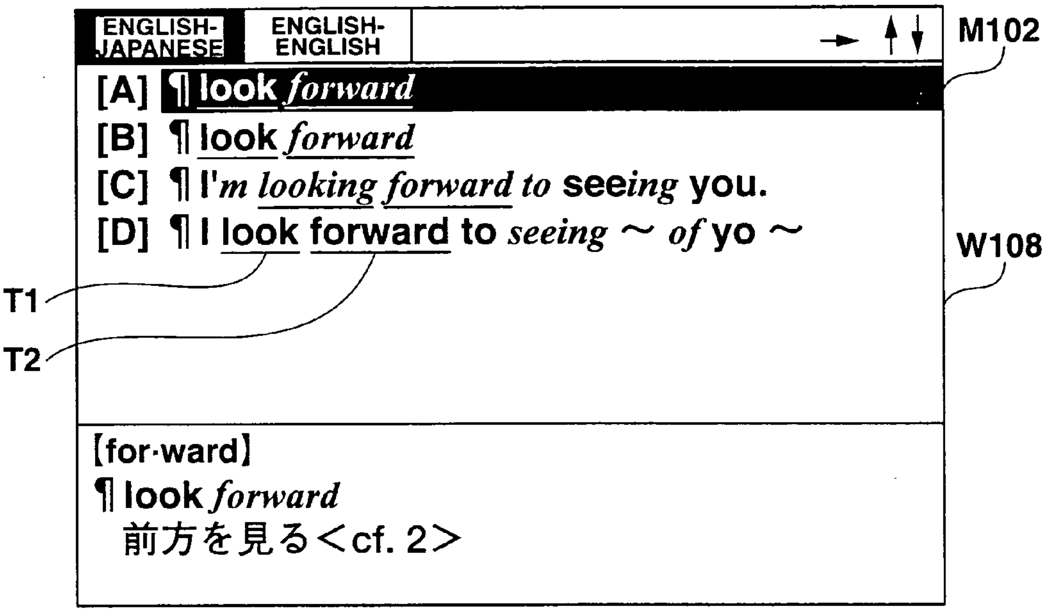
FIGS. 18A to 18D are views showing screen transitions (first operation example) in the present embodiment.
Figure 18B:
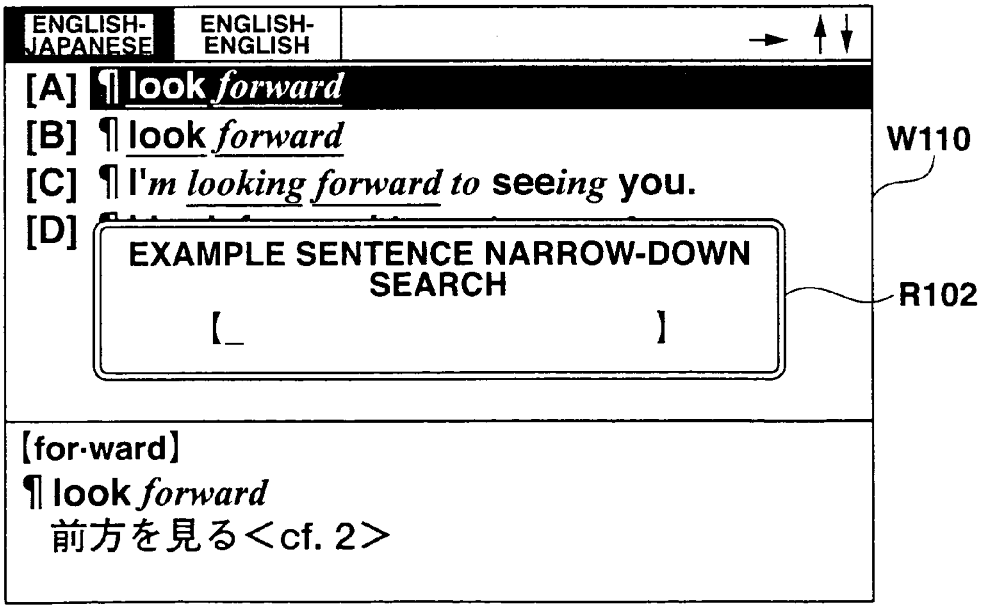
Figure 18C:
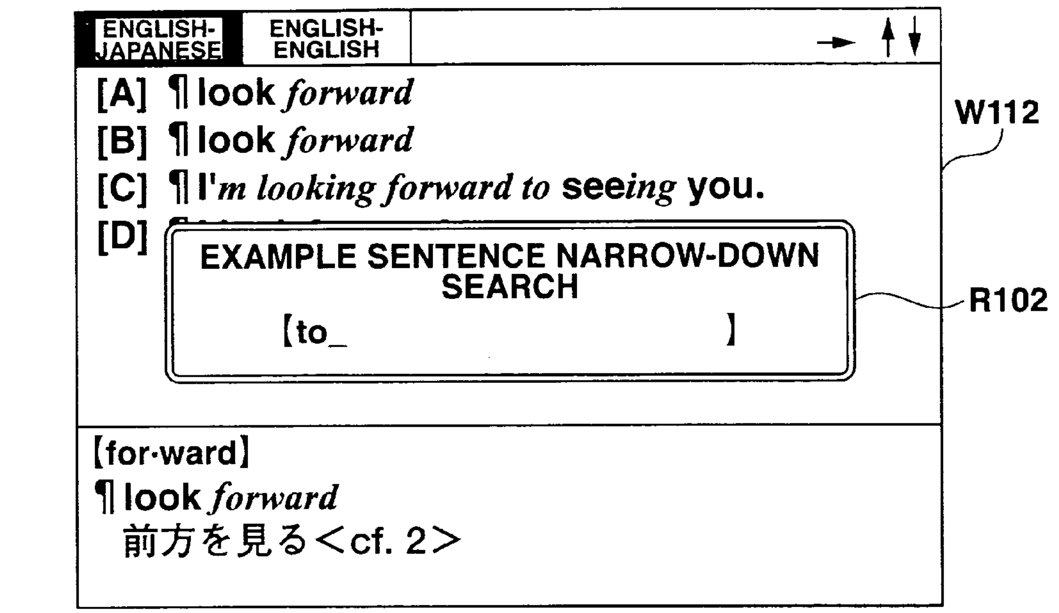

Further, a display screen W110 of FIG. 18B is a state where the phrase/compound word key 13*a* is pushed in the state of FIG. 18A. The CPU 10 displays an addition word inputting screen R102 (FIG. 12; D32, D34, D36, D12, D18, D20, D24→FIG. 13; F10). Here, when an addition word "to" is inputted on the addition word inputting window R102 (FIG. 18C) and the decide key 9 is pushed (FIG. 13; F12; Yes), the CPU 10 loads an addition example sentence number related to the addition word "to", and updates display of the list of example sentences based on a common number with the search example sentence number (FIG. 13; F12, F14, F16, F18, F20, F22, END→FIG. 12; D30).

Figure 18D:
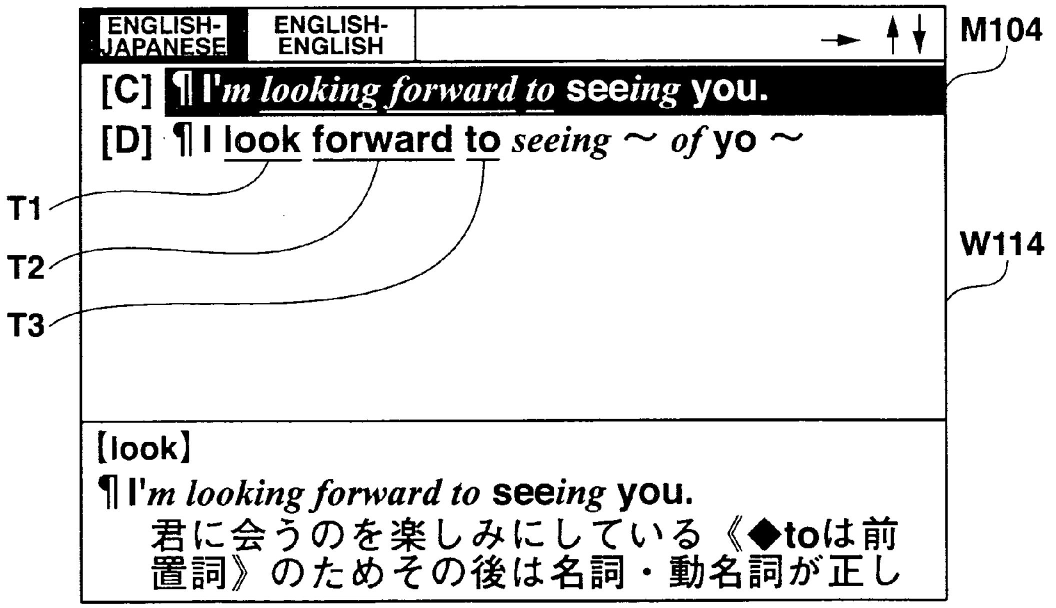

FIG. 18D is one example of a display screen W114 displaying the updated list display. A special expression T3 is applied to the addition word "to" as well.

3.2 Second Operation Example

Next, as a second operation example, a case of, in the dictionary searching process, after a word is inputted and a list of example sentences is displayed, updating display of a list of example sentences by further selecting an addition word among displayed words will be described with reference to FIGS. 19A to 20D.

Figure 19A:
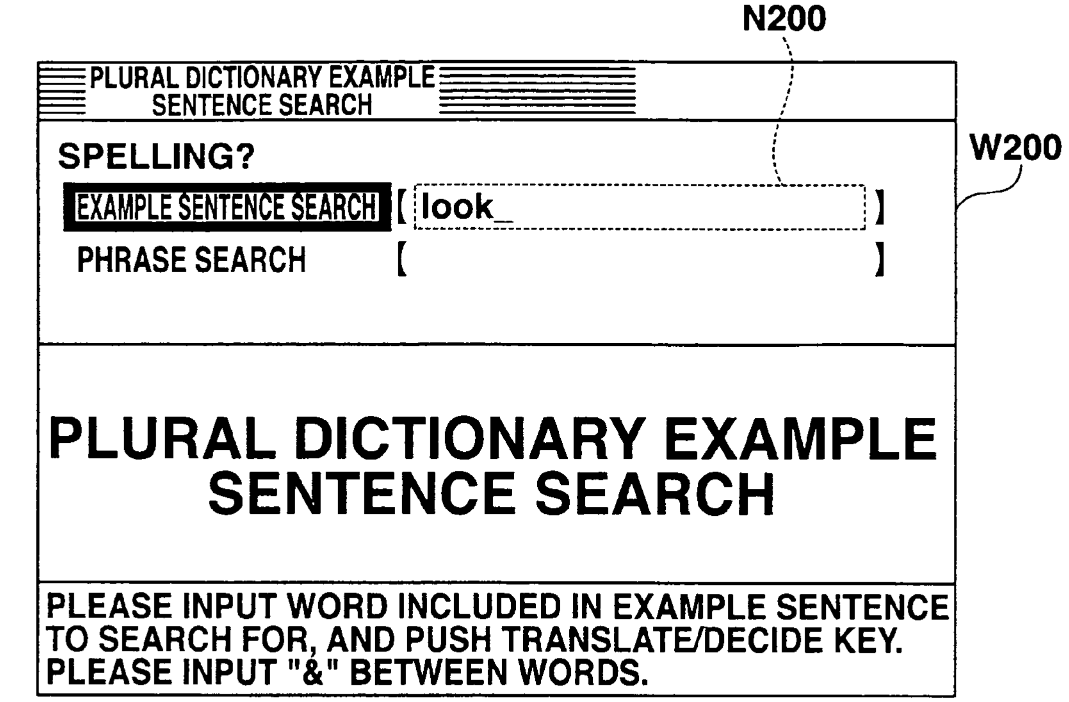
FIGS. 19A to 19D are views showing screen transitions (second operation example) in the present embodiment.

FIG. 19A is one example of a display screen W200 in a case of displaying a screen on the displaying unit 50, the screen prompting a user to input a word group. The CPU 10 stores a word "look" inputted on an inputting area N200, in the inputted word group storing area 306 (FIG. 9; A10, A12→FIG. 10; B8, B10, B12).

Figure 19B:
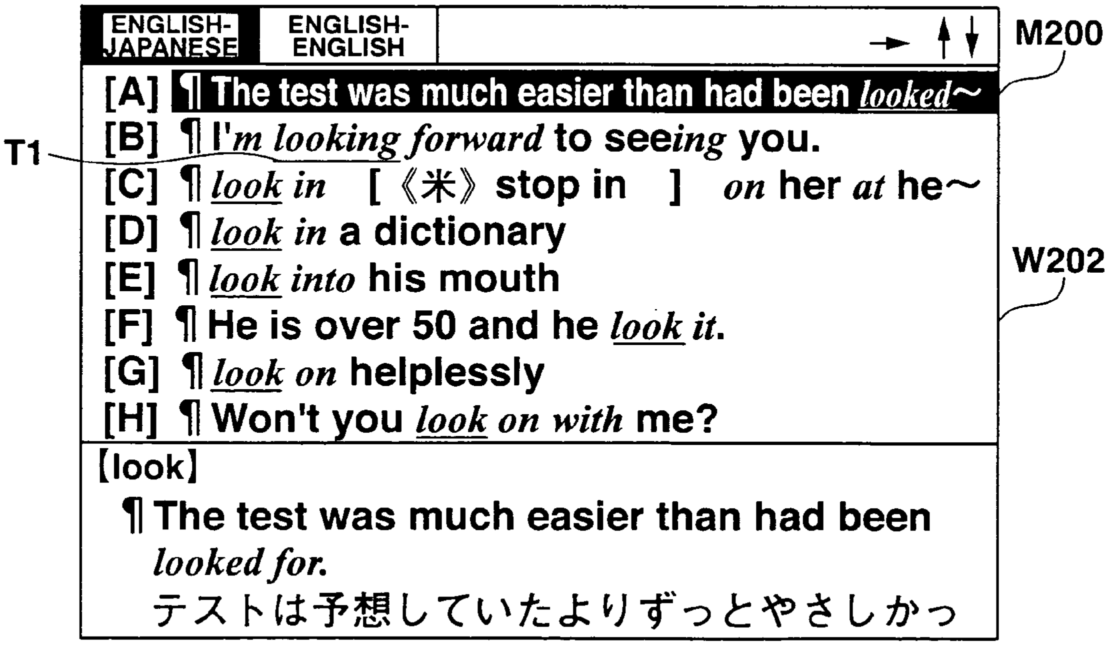

FIG. 19B is one example of a display screen W202 in a state where the decide key 9 is pushed in FIG. 19A. The CPU 10 loads example sentences corresponding to the search example sentence numbers stored in the search example sentence number storing area 302 from the example sentence table 204, and displays a list of the loaded sentences (FIG. 10; B14, B16, B20, B22, B24, END→FIG. 19; A16→FIG. 12; D10). Further, the special expression T1 is applied on a portion conforming to the inputted word "look". Further, one example sentence is selected among the example sentences displayed as a list, and the inversion display M100 is applied to the selected example sentence.

Figure 19C:
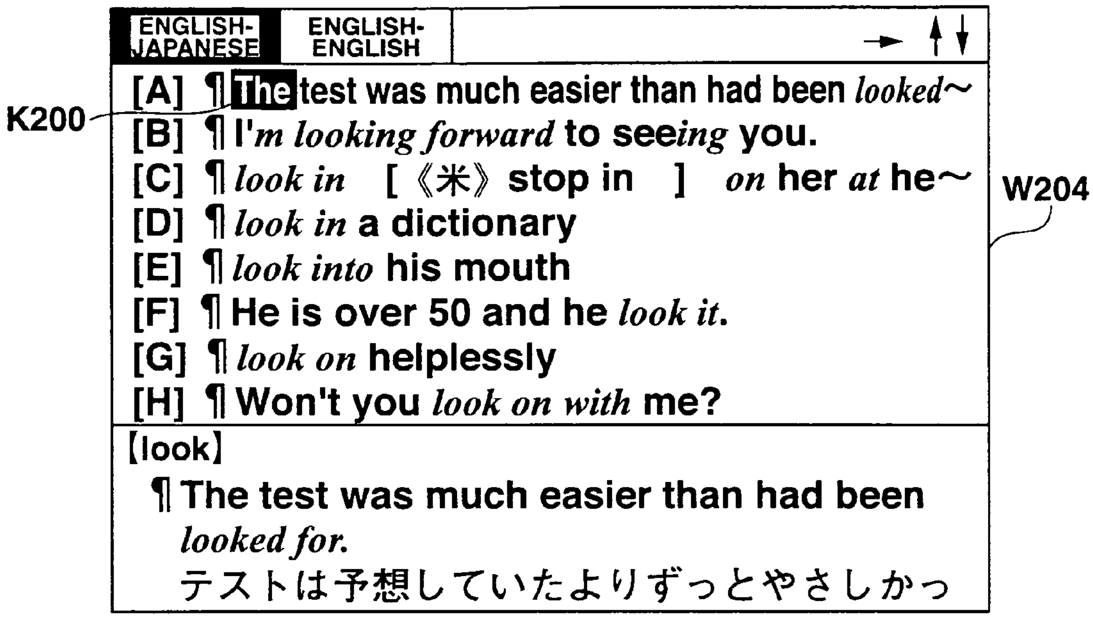

A display screen W204 of FIG. 19C is a state where the jump key 13*b* is pushed in the state of FIG. 19B. By pushing the jump key 13*b*, the CPU 10 displays a selection cursor K200 on the display screen W204 (FIG. 12; D10, D12, D18, D29, D24→FIG. 14; E10). Then, by pushing the direction key 11, the CPU 10 moves the selection cursor D200 (FIG. 14; E10, E12, E14). By selecting the word "forward" in this state, a display screen W206 of FIG. 19D is displayed.

Figure 19D:
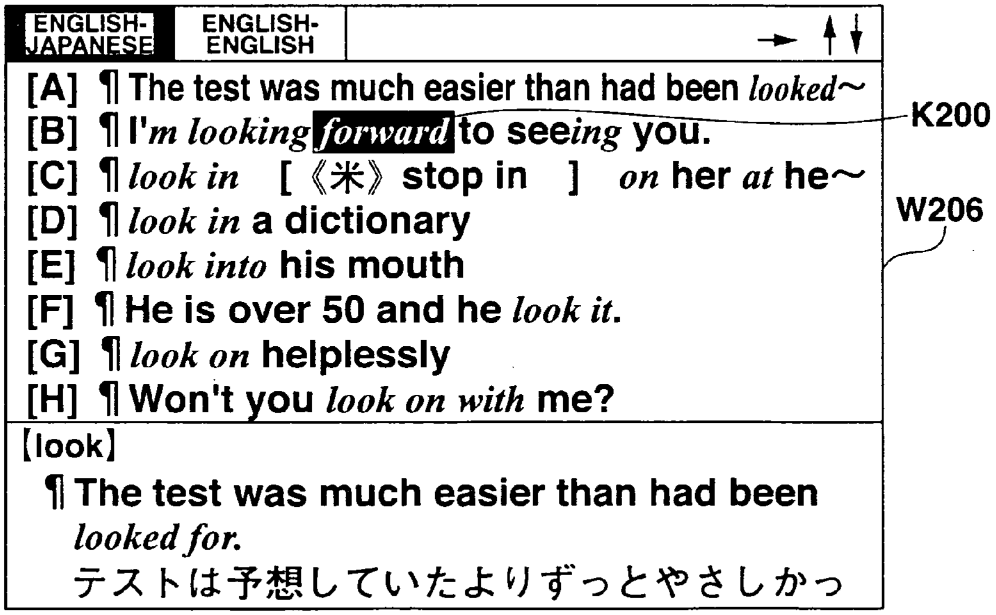

Continuously, by pushing the decide key 9 in the state of FIG. 19D, the CPU 10 stores "forward" as an addition word (FIG. 14; E16, E18). Then, the CPU 10 narrows down example sentences to ones including both the inputted word "look" and the addition word "forward", and updates display of the list of example sentences (a display screen W208 of FIG. 20A, FIG. 14; E20, E22, E24, E26, E28, END→FIG. 12; D30). Here, the special expression T2 is also applied on "forward" assigned as an addition word. Further, one example sentence is selected among the displayed example sentences so as to apply the inversion display M202 thereon.

Figure 20A:
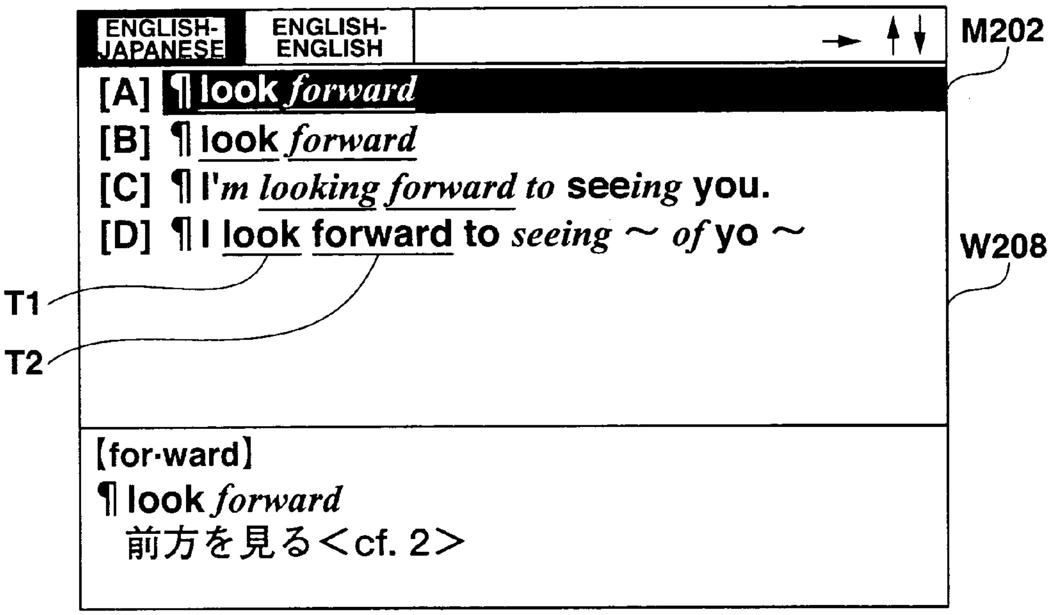
Figure 20B:
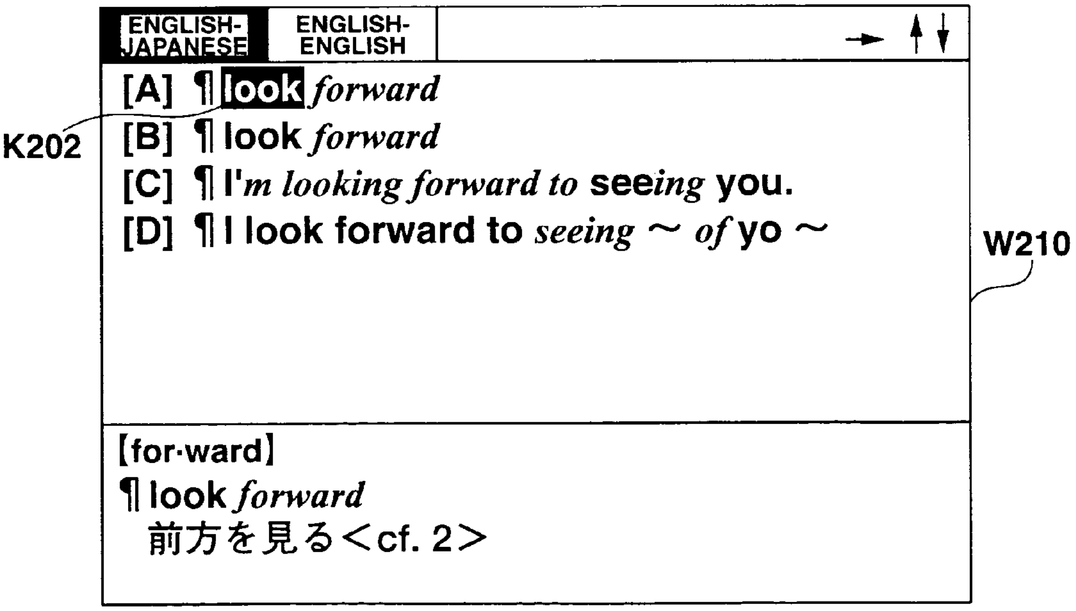

A display screen W210 of FIG. 20B is a state where the jump key 13*b* is pushed in the state of FIG. 20A. When the jump key 13*b* is pushed, the CPU 10 displays the selection cursor K202 on the display screen W210 (FIG. 12; D32, D34, D36, D12, D18, D20, D24→FIG. 14; E10)

FIG. 20C is a display screen W212 indicating a state where the word "to" is selected by the cursor K202. Here, when the decide key 9 is pushed, the CPU 10 further stores "to" as an addition word. Then, the CPU 10 narrows down example sentences to ones including "look", "forward" and "to", and updates display of the list of example sentences to be displayed (FIG. 14; E12, E14, E16, E18, E20, E22, E24, E26, E28, END→FIG. 12; D30). One example of a display screen at this time is a display screen W214 of FIG. 20D. Here, the special expression T3 is also applied on "to", which is additionally selected as the addition word. Further, one example sentence is selected among the displayed example sentences so as to apply the inversion display M204 thereon.

As mentioned, in the second operation example, the electronic dictionary is controlled so as to search for an example sentence including a word inputted by a word inputting unit (for example, the inputting unit 40 of FIG. 3; Step B10 of FIG. 10) among example sentences stored in the example sentence storing unit (for example, the ROM 20 of FIG. 3; the example sentence table 204). Then, in a state where the example sentences including the inputted word are displayed as a list, when any one addition word among words of example sentences displayed as a list is selected by an addition word selecting unit (for example, the inputting unit 40 of FIG. 3; Steps E14 to E18 of FIG. 14) according to a user operation, an example sentence including the selected addition word and the inputted word is searched for among example sentences stored in the example sentence storing unit, and display of the list of example sentences is updated.

Accordingly, it is possible that, after a word is inputted according to a user operation and example sentences including the word is displayed as a list, an addition word is selected among words in the example sentences displayed as a list according to a user operation, example sentences are narrowed down to ones including the inputted word and the addition word to be displayed as a list. Therefore, it is possible to easily and appropriately display an example sentence including desired plural words among a large number of example sentences.

3.3 Third Operation Example

Next, as a third operation example, a case of, in the entry word searching process, after a jump origin word is selected from explanation information of an entry word for searching for an example sentence and the example sentences are displayed as a list, updating display of the list of example sentences by further inputting an addition word will be described with reference to FIGS. 21A to 22D.

Figure 21A:
FIGS. 21A to 21D are views showing screen transitions (third operation example) in the present embodiment.

FIG. 21A is one example of a display screen W300 displaying explanation information of an entry word "look", after a search is done according to the entry word "look" (FIG. 9; A10, A14→FIG. 11; C8, C10, C12, C14). Here, when the jump key 13*b* is pushed, the inversion display is applied on a top word (for example, "look") among the explanation information displayed on the displaying unit 50. Here, by operating the cursor keys 11*a* and 11*b*, the inversion display on a word is moved to select any one word as a jump origin word among the explanation information (FIG. 11; C16). Here, if the example sentence key 7*b* is pushed (FIG. 11; C17; Yes), the CPU 10 stores a word selected as a jump origin word in the inputted word group storing area 305 (FIG. 11; C18), and a list of example sentences including the selected word are displayed (FIG. 11; C20, C22, END→FIG. 9; A16, FIG. 12; D10). One example of a display screen at this time is a display screen W302 shown in FIG. 21B. In the display screen W302, the special expression T1 is applied on the inputted word "look".

Figure 21B:
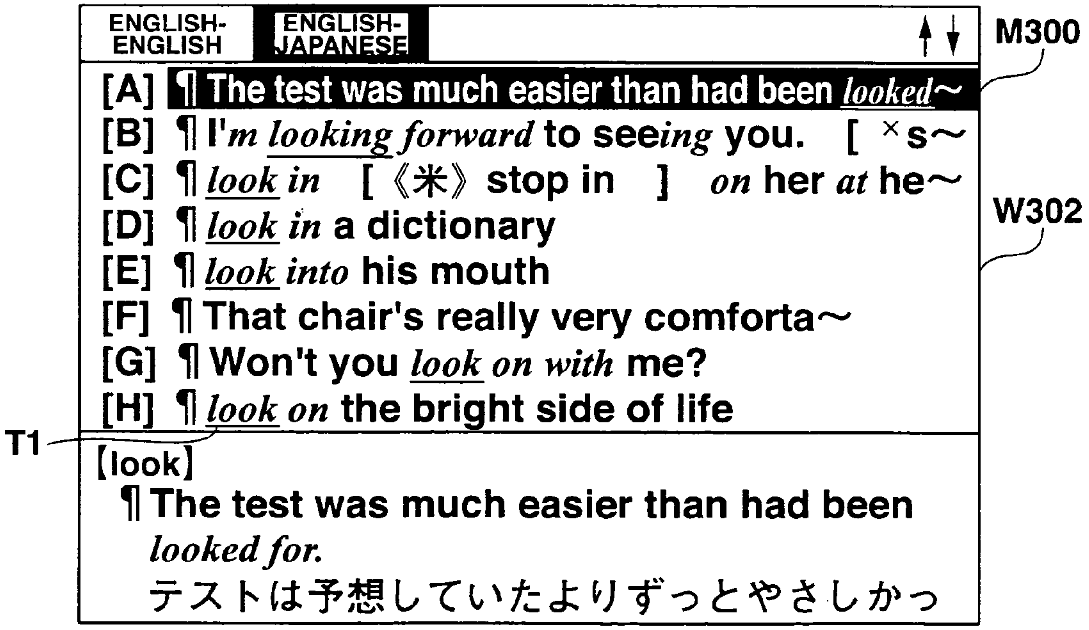
Figure 21C:
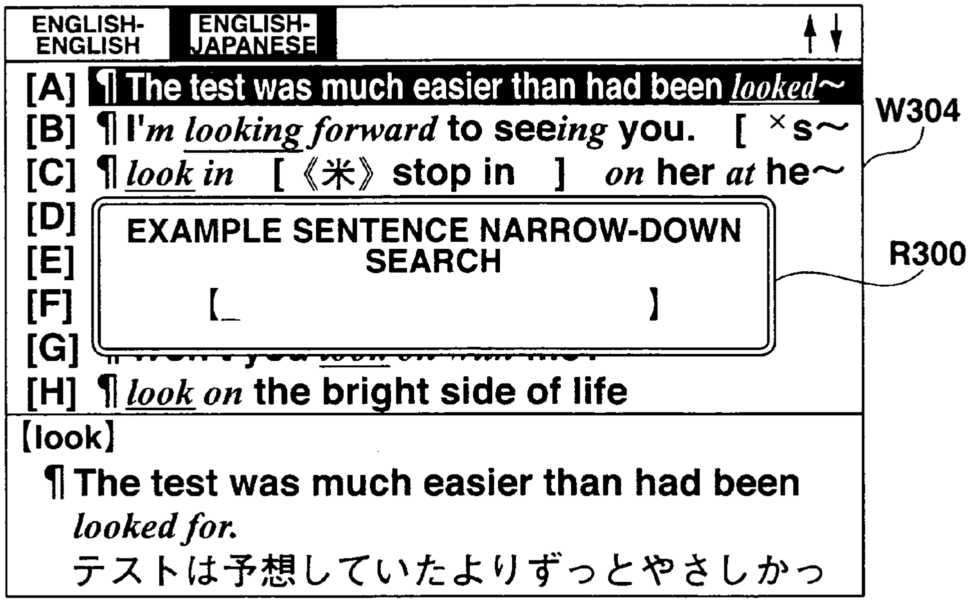
Figure 21D:
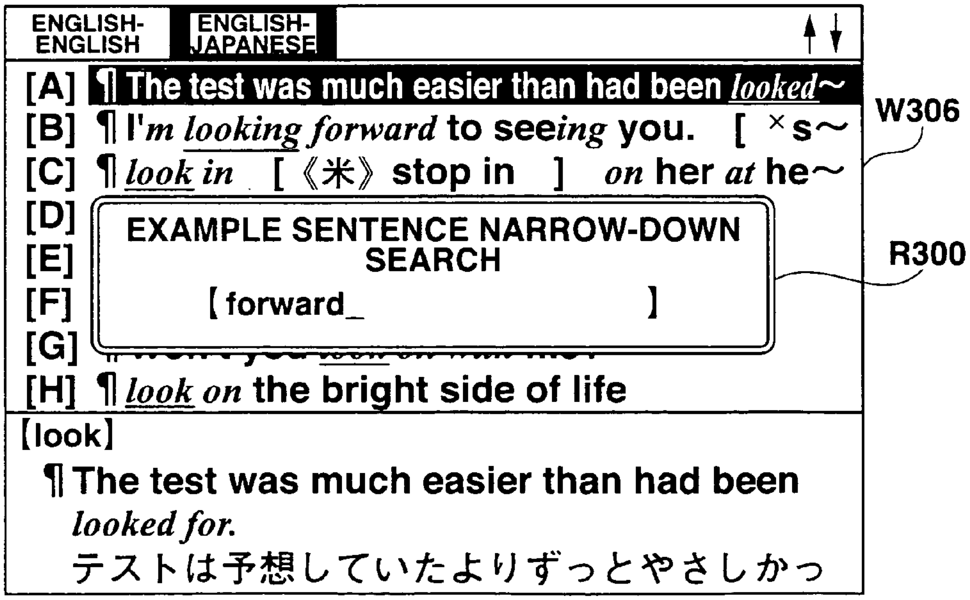
Figure 22A:
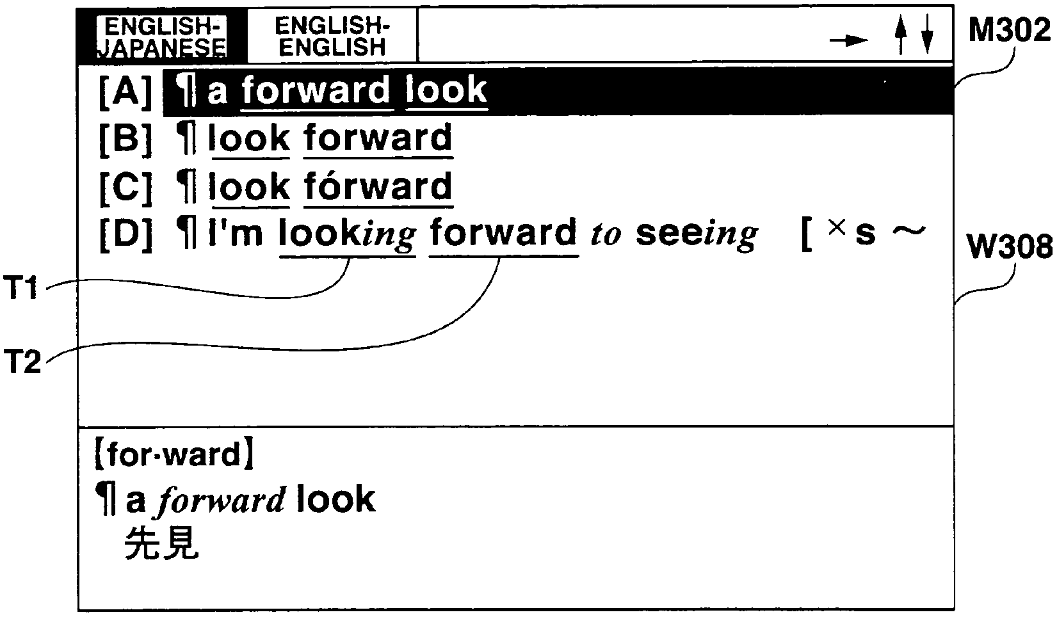
FIGS. 22A to 22D are views showing screen transitions (third operation example) in the present embodiment.
Figure 22B:
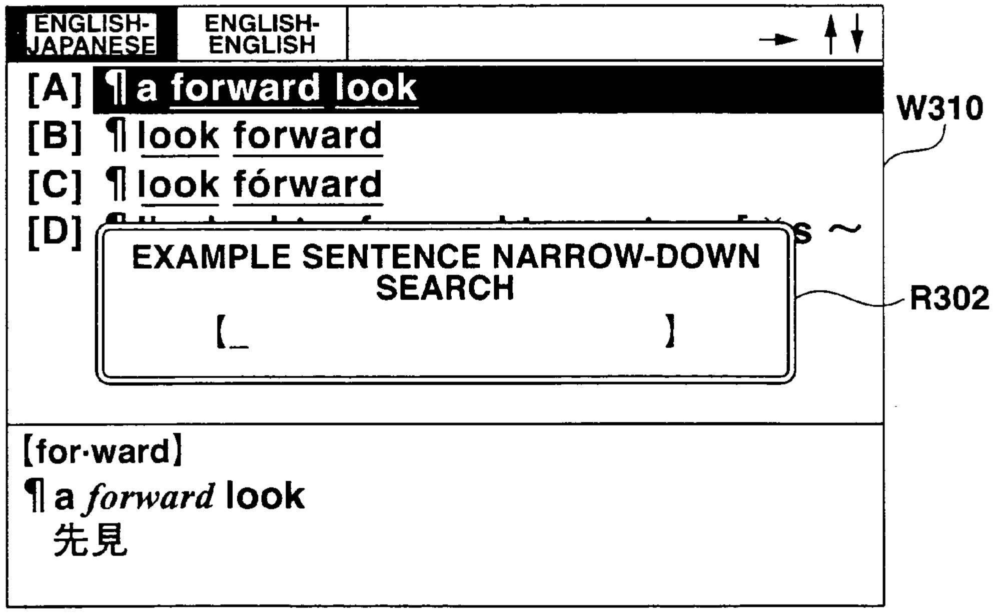
Figure 22C:
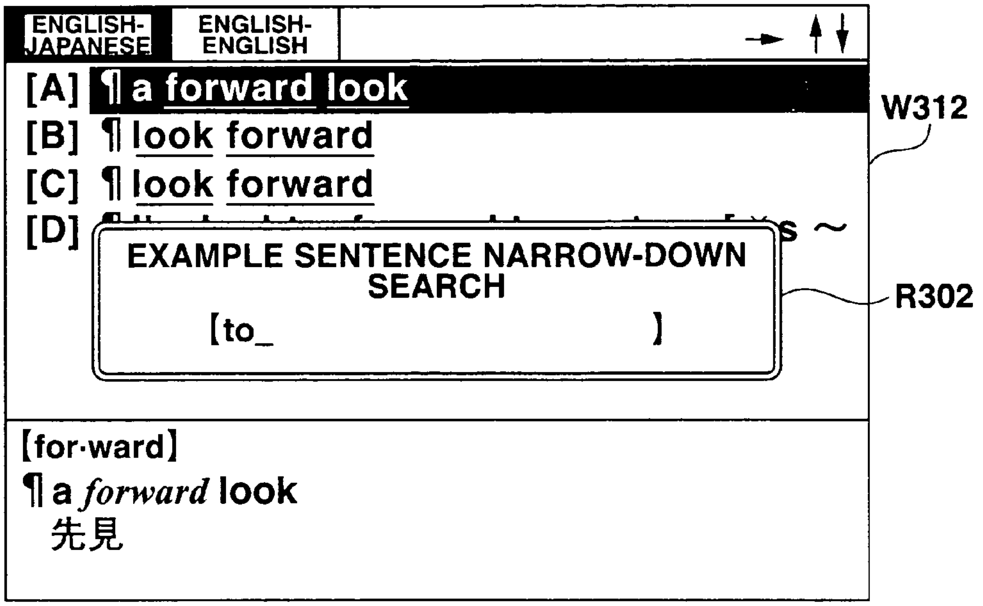
Figure 22D:
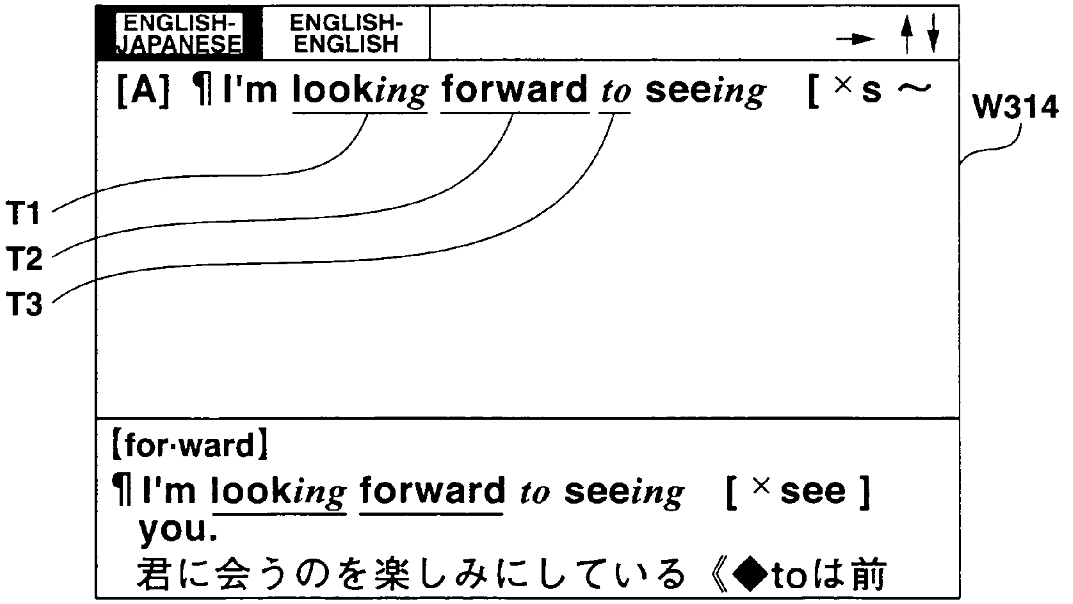

Next, if the phrase/compound word key 13*a* is pushed in the state of the display screen W302 of FIG. 21B, as shown in a display screen W304 of FIG. 21C, the CPU 10 displays an addition word inputting window R300 (FIG. 12; D10, D12, D18, D20, D22→FIG. 13; F10). Then, as shown in a display screen W306 of FIG. 21D, an addition word "forward" is inputted on the addition word inputting window R300 (FIG. 13; F12; Yes), and then a display screen at the time that the decide key 9 is pushed is a display screen W308 of FIG. 22A. The CPU 10 narrows down example sentences to ones including the selected word "look" and the addition word "forward" and updates display of the list of example sentences (FIG. 13; F14, F16, F18, F20, F22, END→FIG>12, D30). Further, the special expression T2 is also applied on the addition word "forward". Further, one example sentence is selected among the displayed example sentences so as to apply the inversion display M302 thereon.

If the phrase/compound key 13*a* is re-pushed (FIG. 12; D32, D34, D36, D12, D18, D20; Yes, D22, FIG. 13; F10), the CPU 10 displays an addition word inputting window R302 (a display screen W310 of FIG. 22B, FIG. 13; F10). Here, if "to" is inputted as an addition word, the CPU 10 displays it on the addition word inputting window R302 (a display screen W312 of FIG. 22C), and when the decide key 9 is pushed, the CPU 10 further stores "to" as the addition word. Accordingly, the CPU 10 updates display of the list of example sentences including "look", "forward" and "to" to be displayed (FIG. 13; F14, F16, F18, F20, F22, END→FIG. 12; D30). A screen displayed in this case is a display screen W314 of FIG. 22D. Here, the special expression T3 is also applied on "to" additionally selected as the addition word.

Here, in the present operation example, by pushing the example sentence key 7*b* while explanation information of an entry word is displayed, a list of example sentences including the entry word is displayed. However, a list of example sentences may be displayed by pushing the jump key 13*b*. For example, in the display screen W300 of FIG. 21A, if the jump key 13*b* is pushed, the selection cursor K300 is displayed on the display screen W300. Here, if the decide key 9 is pushed, the CPU 10 displays example sentences including the selected word "look".

As mentioned, in the third operation example of the present invention, the electronic dictionary is controlled so that, when any one entry word is selected (for example, the inputting unit 40 of FIG. 3, Step C12 of FIG. 11) among the entry words stored in the storing unit (for example, the ROM 20, the entry word table 202), explanation information related to the selected entry word is loaded from the storing unit to be displayed (for example, the CPU 10 of FIG. 31 Step C14 of FIG. 11), and when any one word is selected in the explanation information of which display is controlled (for example, the inputting unit 40 of FIG. 2; Step C16 of FIG. 11), example sentences including the selected word are searched for to be displayed as a list (for example, the CPU 10 of FIG. 3; Step D10 of FIG. 12), and further in the state of the example sentences including the selected word are displayed as a list, when an addition word is inputted (for example, the inputting unit 40 of FIG. 3; Step G12 of FIG. 15), an example sentence including the selected word from the explanation information and the addition word is searched for among the stored example sentences, and display of the list of example sentences is updated (for example, the CPU 10 of FIG. 3; Step D30 of FIG. 12).

Therefore, it is possible that, after a word is inputted according to a user operation and explanation information of the word displayed, a word is selected among words in the explanation information according to a user operation, and then, after example sentences including the selected word of the explanation information are displayed as a list, example sentences are narrowed down to ones further including an addition word to be displayed as a list. Consequently, it is possible to easily and appropriately display an example sentence including desired plural words among a large number of example sentences.

3.4 Fourth Operation Example

Next, as a fourth operation example, a case of, in the plural dictionary example sentence searching process, after a word is inputted and example sentences are displayed as a list, updating display of the list of example sentences by inputting an addition word and selecting an extraction condition will be described with reference to FIGS. 23A to 24C.

Figure 23A:
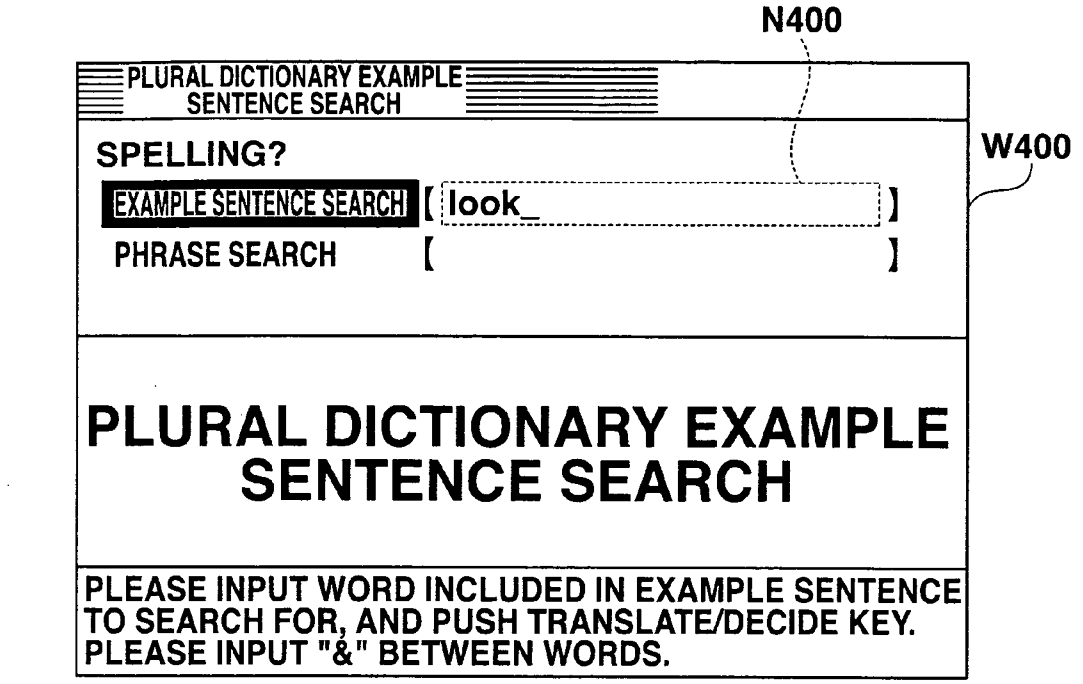
FIGS. 23A to 23D are views showing screen transitions (fourth operation example) in the present embodiment.

FIG. 23A is one example of a display screen W400 in the case of displaying a screen on the displaying unit 50, the screen prompting a user to input a word group. The CPU 10 stores the word "look" inputted in an inputting area N400 in the inputted word group storing area 306 (FIG. 9; A10, A12→FIG. 10; B8, B10, B12)

Figure 23B:
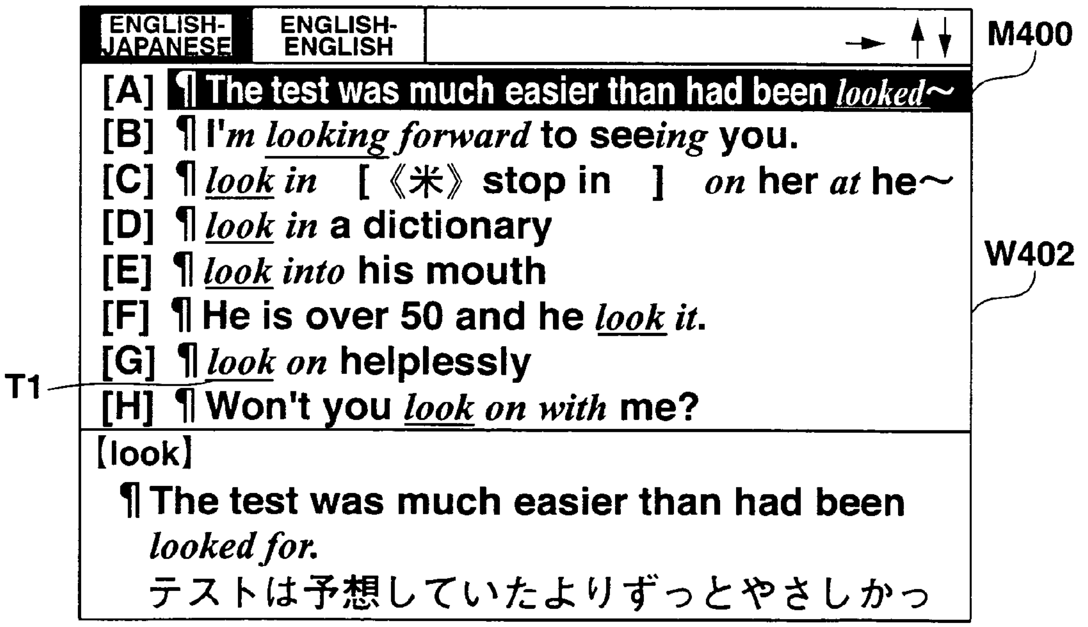

FIG. 23B is one example of a display screen W402 indicating a state where the decide key 9 is pushed in the state of FIG. 23A. The CPU 10 loads example sentences corresponding to the search example sentence number stored in the search example sentence number storing area 302 from the example sentence table 204, and displays a list of them (FIG. 10; B14, B16, B20, B22, B24, END→FIG. 9; A16→FIG. 12; D10). Further, the special expression T1 is applied on a part conforming to the inputted word "look". Further, one example sentence is selected among the example sentences displayed as a list so as to apply an inversion display M400 thereon.

Figure 23C:
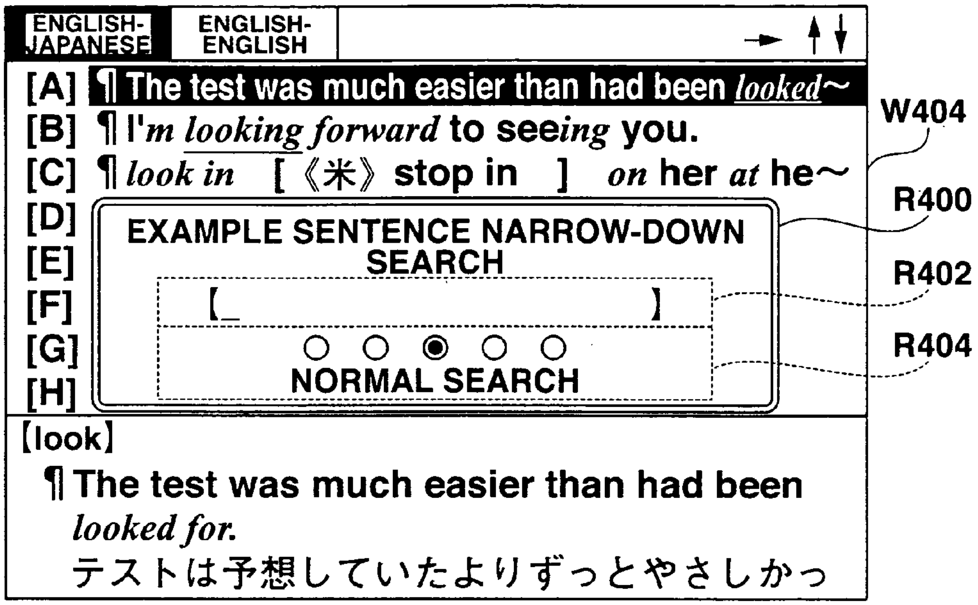

A display screen W404 of FIG. 23C is a state where the phrase/compound key 13*a* is pushed after the shift key 15 pushed in the state of FIG. 23B. In the display screen W404, a condition selecting window R400 is displayed (FIG. 12; D10, D12, D18, D20, D26→FIG. 15; G10). The condition selecting window R400 comprises an addition word inputting area R402 and an extraction condition setting area R404.

Figure 23D:
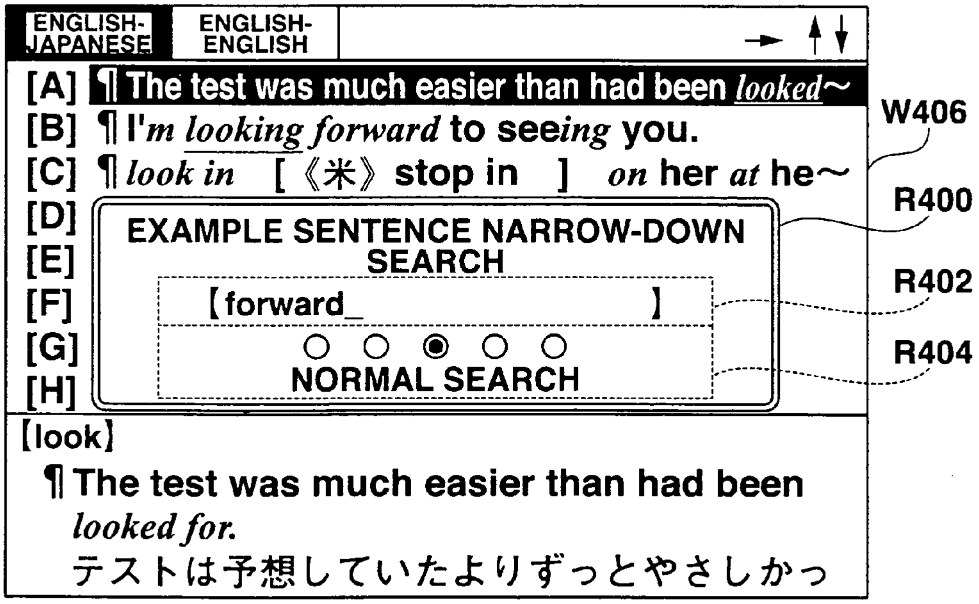

Here, a display screen W406 of FIG. 23D is one example of a display screen in a state where an addition word is inputted on the addition word inputting area R402. When an addition word "forward" is inputted on the addition word inputting area R402 of the condition selecting window R400, and a down key of the up-down cursor key 11*b* is pushed, an operation area is moved to the extraction condition setting area R404. One example of a display screen at this time is a display screen W408 of FIG. 24A. Here, an extraction condition “NORMAL SEARCH”, which is currently being selected, is selected by a mark M402.

Figure 24A:
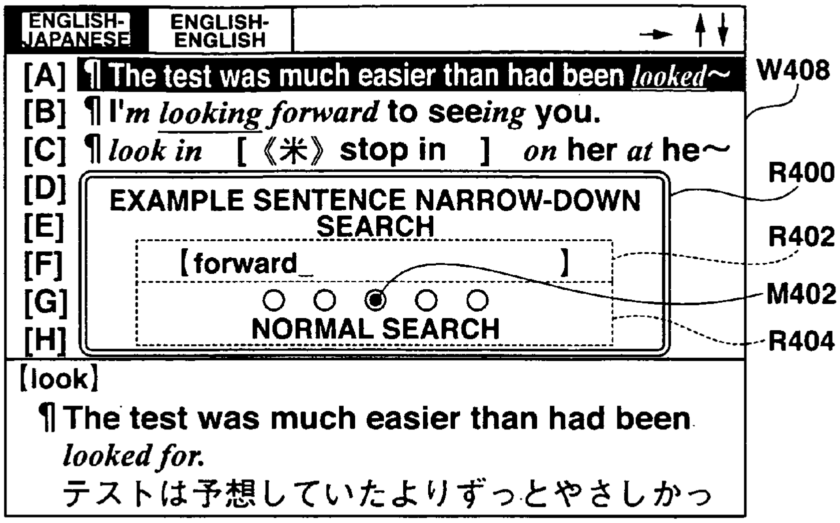
FIGS. 24A to 24C are views showing screen transitions (fourth operation example) in the present embodiment.
Figure 24B:
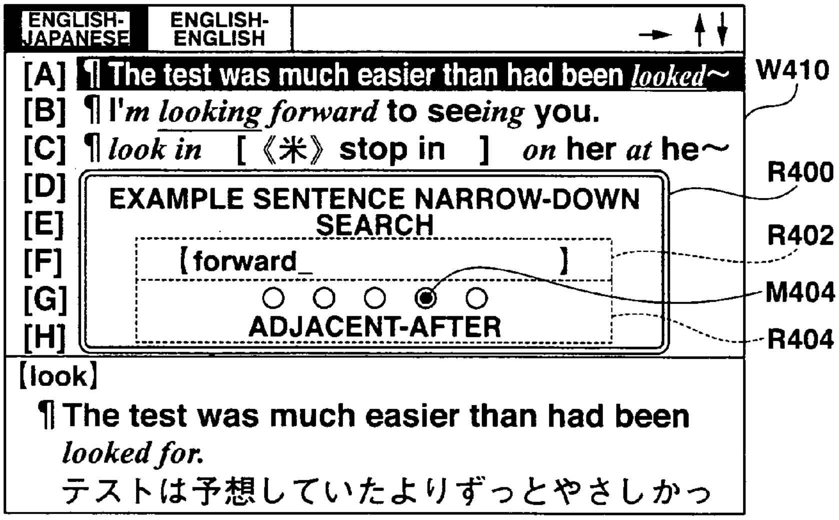
Figure 24C:
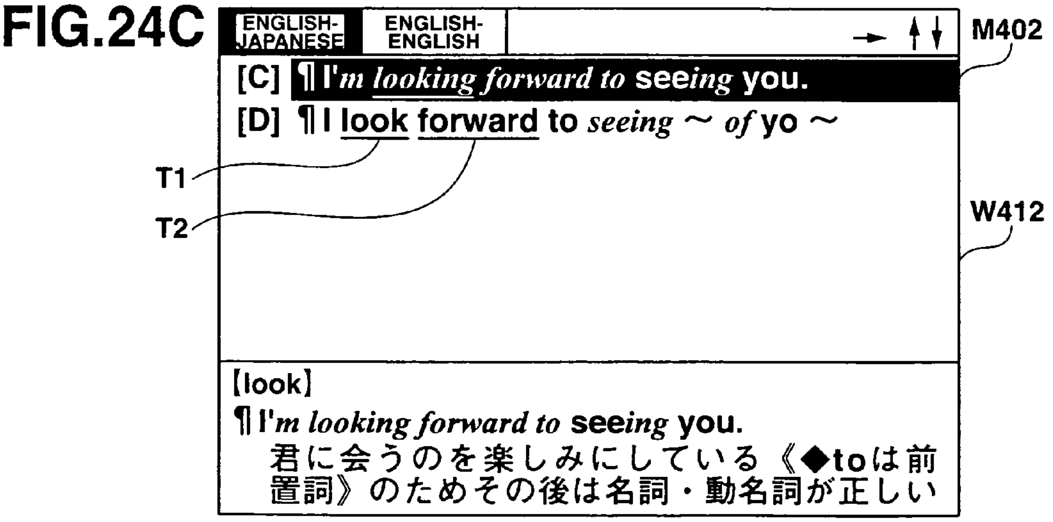

A display screen W410 of FIG. 24B indicates a state where a right key of the left-right direction key 11*a* is pushed in the current state (FIG. 15; G14). Here, A mark M404 displayed on the extraction condition selecting area R404 is located one block toward right with respect to the mark M402 (second block from right end), and an extraction condition “ADJACENT-AFTER” is displayed on the extraction condition selecting area R404 of the condition selecting window R400.

Then, when the decide key 9 is pushed in the state of FIG. 24B (FIG. 15; G16; Yes), “forward” is selected as an addition word, and among example sentences including “look” and “forward”, an example sentence in which “forward” is located adjacent to “look” and is located after “look” (in other words, an example sentence including “look forward”) is extracted (FIG. 15; G30, G32, G34, G40). Here, one example of a display screen displaying the extracted and narrowed down example sentences is a display screen W412 of FIG. 24C. Here, the special expression T2 is also applied on “forward”, which is assigned as the addition word. Further, one example sentence is selected among the displayed example sentences so as to apply the inversion display M202 thereon (FIG. 15; G44, G46, END→FIG. 12; D30).

As mentioned, in the fourth operation example, the electronic dictionary is controlled so that example sentences including a word inputted by the word inputting unit (for example, the inputting unit 40 of FIG. 3; Step B10) are searched for among the example sentences stored in the example sentence storing unit (for example, the ROM 20 of FIG. 3; the example sentence table 204) and displayed as a list (for example, the CPU 10 of FIG. 1; Step D10 of FIG. 12), and in the state of the example sentences including the inputted word being displayed as a list, when an addition word is inputted (for example, the inputting unit 40 of FIG. 3; Step G12 of FIG. 15), an example sentence including the inputted addition word and the inputted word is searched from among the example sentences stored in the example sentence storing unit, and display of the list of example sentences is updated (for example, the CPU 10 of FIG. 3; Step D30 of FIG. 12).

Therefore, it is possible that, after a word is inputted according to a user operation, and a list of example sentences including the word is displayed, an addition word is inputted among words in example sentences displayed as a list according to a user operation, and thereby example sentences are narrowed down to ones including the inputted word and the addition word to be displayed as a list. Thereby, it is possible to easily and appropriately display an example sentence including desired plural words among a large number of example sentences.

Further, the electronic dictionary has a positional relation assigning unit (for example, the inputting unit 40 of FIG. 3; Step G14 of FIG. 15) for assigning a positional relation between an inputted word and an addition word, and the example sentence list display update control unit controls the electronic dictionary to search for an example sentence including the inputted word and the addition word so as to satisfy the relation assigned by the positional relation assigning unit among the example sentences stored in the example sentence storing unit, and to update display of the list of example sentences (for example, the CPU 10 of FIG. 3; Step G44 of FIG. 15). Therefore, it is possible to narrow example sentences down to ones including an inputted word and an addition word with positional relation being assigned in detail, for example, ones in which the addition word is located adjacent to and after the inputted word, ones in which the addition word is located away from and before the inputted word, or the like, are displayed as a list. Consequently, it is possible to even more easily and appropriately display a desired example sentence.

3.5 Fifth Operation Example

Figure 25A:
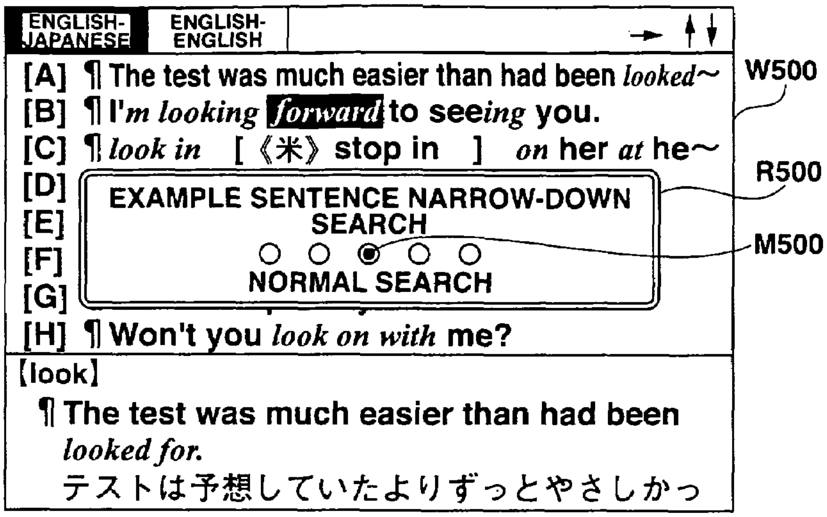
FIGS. 25A to 25C are views showing screen transitions (fifth operation example) in the present embodiment.
Figure 25B:
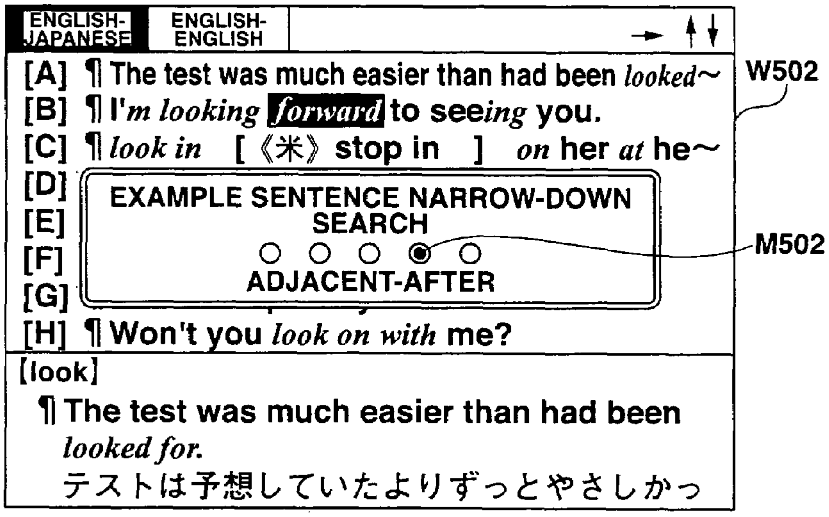
Figure 25C:
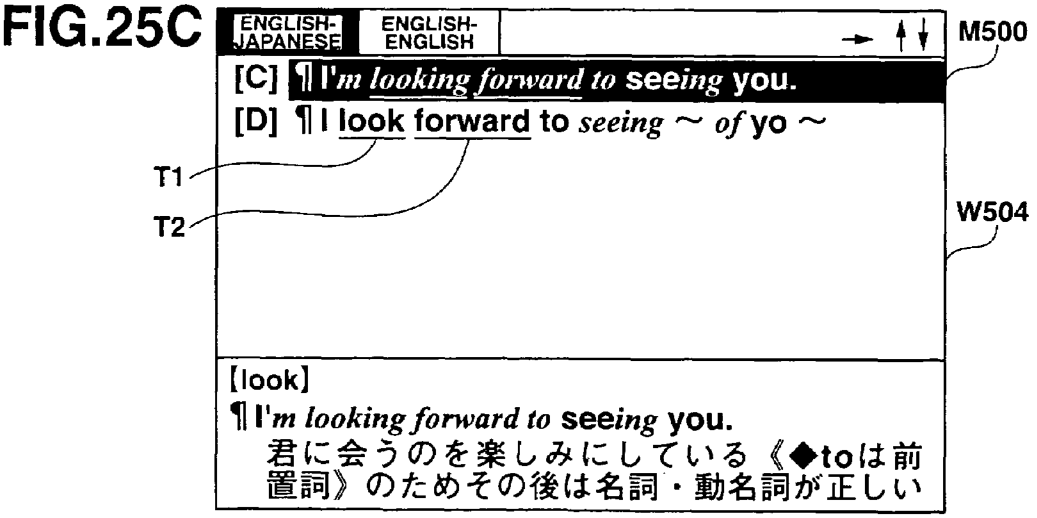

Next, as a fifth operation example, a case of, in the plural dictionary example sentence searching process, after a word is inputted and example sentences are displayed, updating display of the list of example sentences by selecting an addition word among the already-displayed words and selecting an extraction condition (that is, executing the addition word selecting condition process as a subroutine) will be described with reference to FIGS. 25A to 25C.

Here, since a screen transition while the jump key 13*b* is pushed after the shift key 15 is pushed among the list-displayed example sentences, the cursor is displayed and the selection is made with the direction key, is the same as FIGS. 19A to 19D, description thereof is omitted.

Then, if the decide key 9 is pushed (Step H16 of FIG. 16; Yes), the CPU 10 stores “forward” as an addition word (Step H18) and displays a condition selecting window R500. (FIG. 25A, Step H20). If a right direction key of the left-right direction key 11*a* is pushed in the state of a display screen W500 of FIG. 25A, the CPU 10 moves a pointer from a mark M500 to a mark M502. Here, when the decide key 9 is pushed, “ADJACENT-AFTER” is selected as an extraction condition and then the CPU 10 extracts an example sentence conforming to the extraction condition (Step H40). Here, one example of a display screen displaying the extracted and narrowed-down example sentences is a display screen W504 of FIG. 25C. Here, the special expression T2 is also applied on “forward” assigned as the addition word. Further, one example sentence is selected among the displayed example sentences so as to apply the inversion display thereon.

Here, the descriptions from the first operation example to the fifth operation example are respectively made as a one-way flow from inputting a word to executing the example sentence displaying process. However, the present invention is not limited to these operation examples. Respective states can be transited in two-way. For example, in the state of FIG. 18D, by pushing the back key 13*c*, a state transits to FIG. 18C. Then, by inputting another addition word in the state of FIG. 18C, it is possible to display other example sentences.

4. Alternative Example

In the above-described embodiments, an electronic dictionary including an electronic reference book and the like is described as an applicable example. However, the information display control apparatus in the present invention is not limited to such a product, and may be applied to whole electronics devices such as a cellular phone, a personal computer, an electronic watch, a PDA (Personal Digital Assistants) and the like.

Further, in the above-described embodiments, described is the case of searching for an example sentence. However, the present invention is not limited to the case. For example, the present invention may be applied to a case of searching for a phrase, a compound word or the like. Concretely, the English-Japanese dictionary DB 200 stores a phrase table. Here, the phrase table is a table storing a phrase and explanation information so as to relate each other. Then, in the phrase searching function of the electronic dictionary, “look” is inputted as an inputted word. Then, the CPU loads phrases including “look”

from the phrase table and displays a list of them. Thereafter, when "up" is inputted as an addition word, the CPU loads phrases including "look" and "up" from the phrase table and displays a list of them. In other words, on display of the list of phrases, by displaying candidates with an operation of narrowing down performed, it is possible for a user to find a desired phrase immediately.

Further, in the above-described embodiments, described is the case that the electronic dictionary 1 is a device being the so-called standalone type, which operates by itself. However, a device to which the present invention can be applied is not limited to this kind. It is possible to realize a device according to the present invention by having a structure where a communicating device is incorporated or is connectable, and communicating with a server. With reference to figures, this case will be described in detail.

Figure 26:
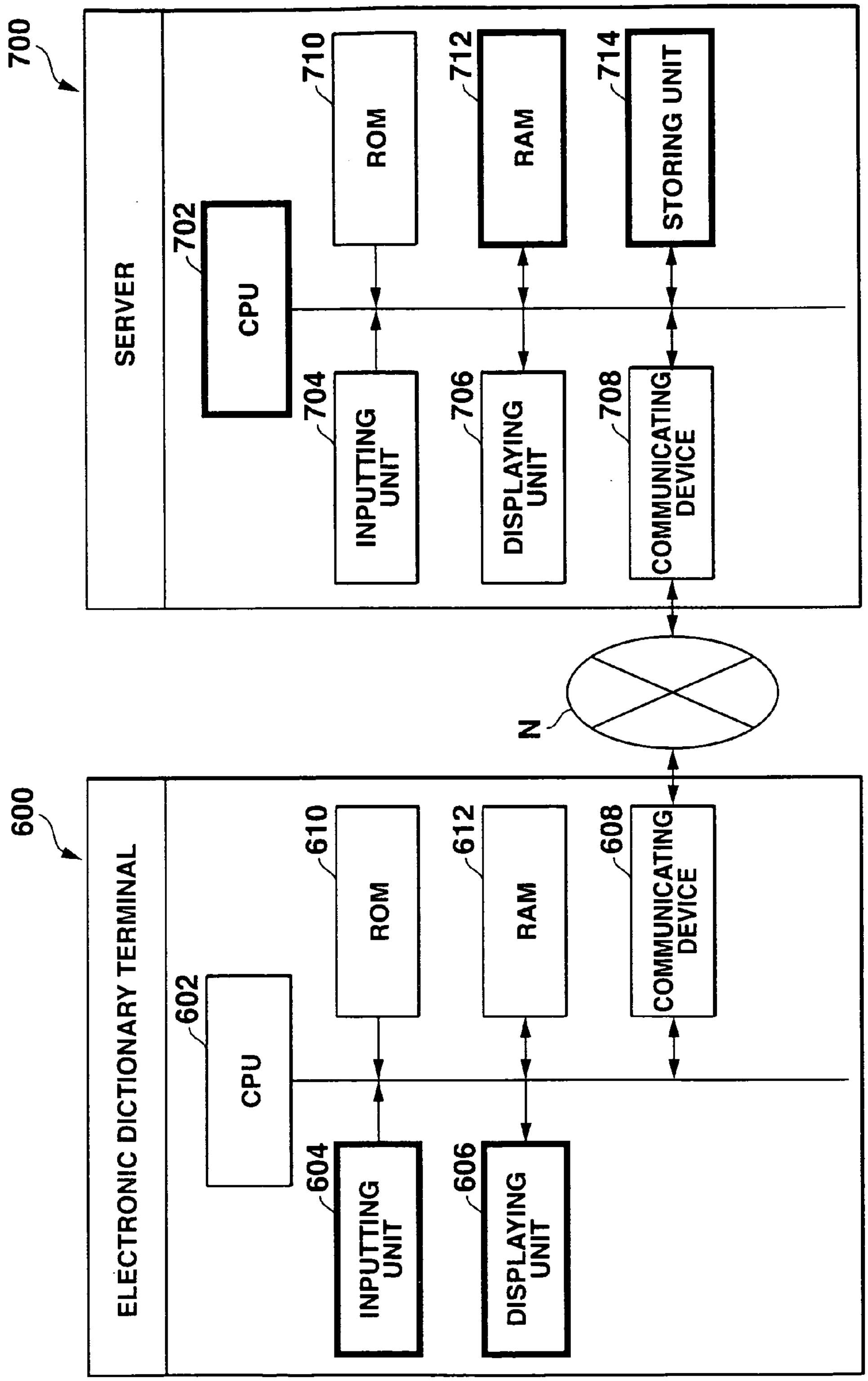
FIG. 26 is a view showing one example of a block diagram of an alternative example in the present embodiment.

FIG. 26 is a view showing an outline example of a system structure where an electronic dictionary terminal 600 incorporating therein a communicating device and a server 700 are connectable to each other through a communication line N. The server 700, for example, comprises a general-purpose workstation, a server-use computer or the like, and the electronic dictionary terminal 600 comprises a personal computer incorporating a communicating device, an electronic dictionary incorporating a communicating device or the like. The communication line N is wired/wireless telephone network, Internet network or the like.

On the contrary, the inputting unit 40 and the displaying unit 50 of the electronic dictionary 1 respectively correspond to an inputting unit 604 and a displaying unit 606 of the electronic dictionary terminal 600.

In other words, a host-terminal (alternatively, client-server) system where the server 700 corresponds to a host (alternatively, server) and the electronic dictionary terminal 600 corresponds to a terminal (alternatively, client) is formed. Then, letters or the like inputted from the inputting unit 604 of the electronic dictionary terminal 600 is transmitted to the server 700 through the communicating device 608, a CPU 702 of the server 700 executes the dictionary searching process according to various types of data and various types of programs stored in a storing unit 714. Then, the CPU 702 transmits a process result to the electronic dictionary terminal 600, and the electronic dictionary terminal 600 displays the process result on the displaying unit 604. In this way, it is possible to realize the present invention in a system comprising the server 700 and the electronic dictionary terminal 600. In this case, the electronic dictionary terminal 600 does not need to store therein an English-Japanese dictionary DB, a dictionary searching program and the like, and also does not need to execute a dictionary searching process and the like. Therefore, the electronic dictionary terminal 600 may comprise a CPU 602 which has competitively low data processing ability, and a ROM 610 having competitively small storage capacity or the like, such as a cellular phone.

Hereinafter, an embodiment in which another one of the present invention is applied to an electronic dictionary being one type of an information display control apparatus will be described in detail with reference to figures. However, what the present invention can be applied to is not limited to this embodiment.

[1. Whole Structure]

The electronic dictionary incorporates each type of electronic dictionary database (hereafter, database is referred to as DB) of Japanese dictionary, English-Japanese dictionary, Japanese-English dictionary, English-English dictionary, kana dictionary and the like. The dictionary DB is assembled information which assembles entry words and explanation information such as letter data, still image data, moving image data, sound data and the like for explaining the entry words, the explanation information being related to the entry word, and therefore the assembled information is structured systematically so as to be able to perform a searching process with the use of a computer. When a user selects a dictionary and inputs letters to be a search word (hereafter, this inputted letters are referred to as "inputted letters"), the electronic dictionary 1 displays a list of entry words conforming to the inputted letters as entry words candidates. Then, the electronic dictionary 1 displays explanation information corresponding to a selected entry word. This is a fundamental function of the electronic dictionary. Here, description hereafter will be made under the assumption that the electronic dictionary in the present embodiment incorporates a dictionary DB of Japanese-English dictionary, a dictionary DB of English-Japanese dictionary, a dictionary DB of English-English comprehensive dictionary and a dictionary DB of English-English dictionary.

Figure 27:
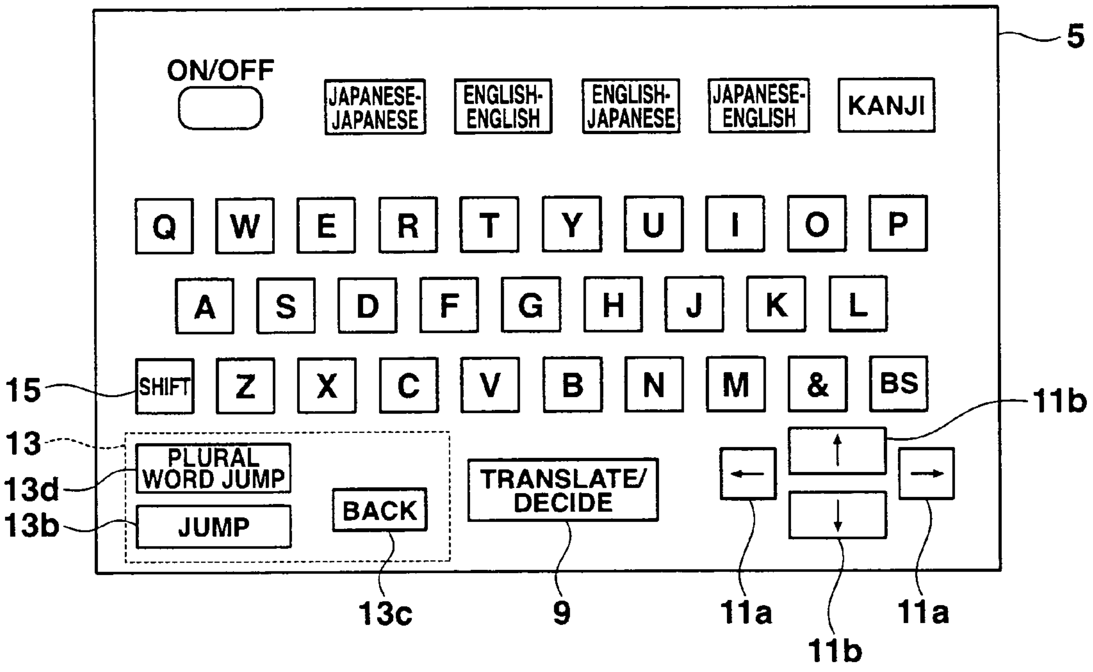
FIG. 27 is a view showing one example of an inputting unit of an electronic dictionary to which the present invention is applied.

FIG. 27 shows an outline of the electronic dictionary 1. As shown in FIG. 27, the electronic dictionary 1 comprises a display 3 and various types of key groups 5. Here, a unique function is allocated to each key that structures the various types of key groups 5, and with a user pushing these keys, the electronic dictionary 1 operates. For example, as shown in FIG. 27, the various types of key groups 5 comprise a decide key 9 for inputting an instruction such as operation confirmation and the like, an up-down direction key 11*b* and a left-right direction key 11*a* for instructing a cursor movement and selecting a word for assignation, a jump key 13*b* for executing a jump process based on a single word, a plural word jump key 13*b* for executing a jump process based on plural words, and a shift key 15.

Figure 28:
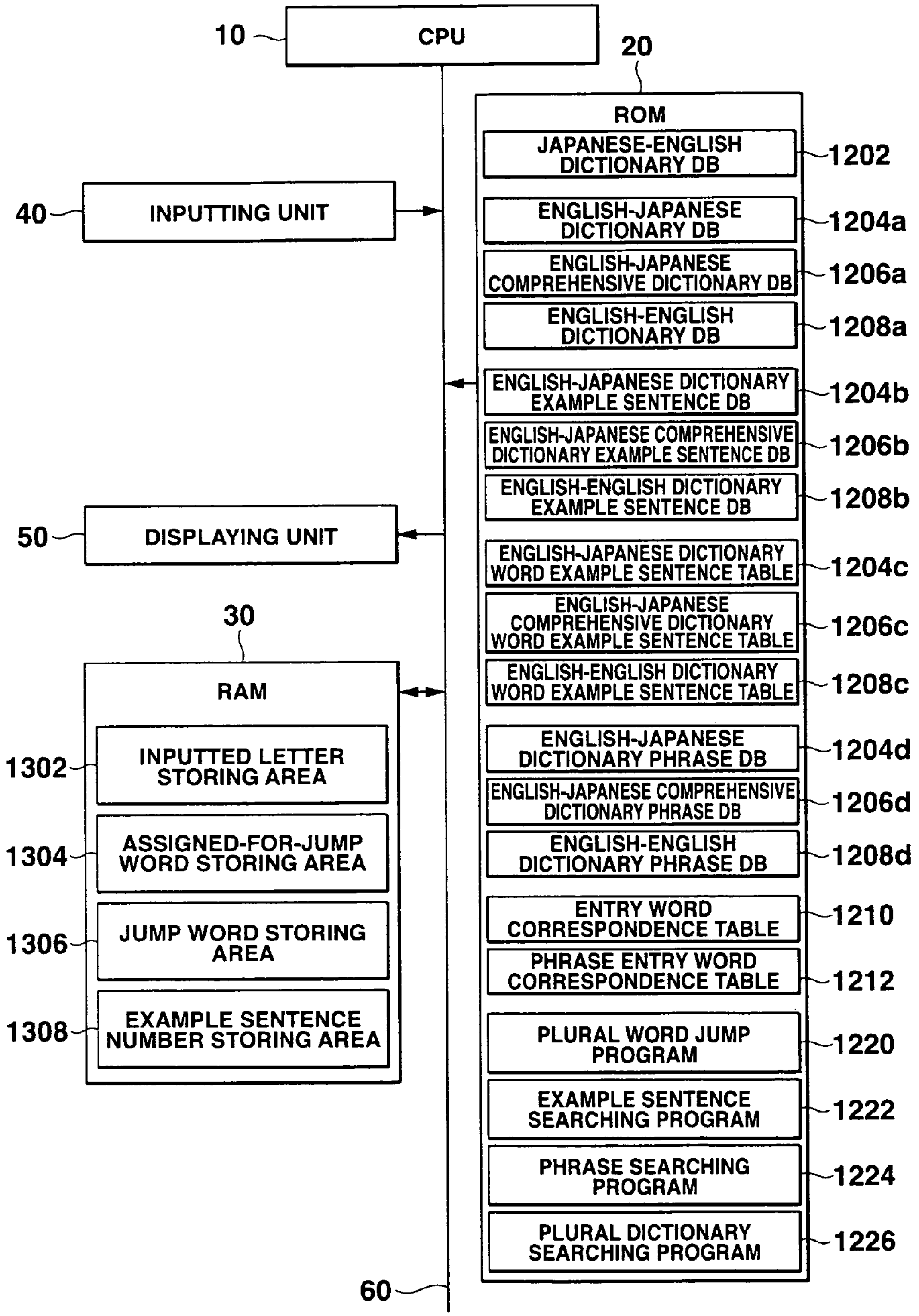
FIG. 28 is a block diagram of the electronic dictionary in the present embodiment.

FIG. 28 is a block diagram showing a structure of the electronic dictionary 1. As shown in FIG. 28, the electronic dictionary 1 comprises a CPU (Central Processing Unit) 10, a ROM (Read Only Memory) 20, a RAM (Random Access Memory) 30, an inputting unit 40, a displaying unit 50 and a bus 60.

The ROM 20 stores initial programs for performing various types of initial settings, hardware inspection, loading of necessary programs and the like. By executing the initial programs at the time of powering the electronic dictionary 1 on, the CPU 10 sets an operation environment of the electronic dictionary 1.

Further, the ROM 20 stores various types of programs according to operations of the electronic dictionary 1, the operations such as a menu displaying process, various types of setting processes, various types of searching processes and the like, and also stores programs for realizing various types of functions that the electronic dictionary 1 has. Further, the ROM 20 stores a dictionary DB, an example sentence DB corresponding to the dictionary DB, a word example sentence table, a phrase DB, and an entry word correspondence table. As the dictionary DB, the ROM 20 stores a Japanese-English dictionary DB 1202, an English-Japanese dictionary DB 1204*a*, an English-Japanese comprehensive dictionary DB 1206*a*, and an English-English dictionary DB 1208*a*. Further, as the example sentence DB, the ROM 20 stores an English-Japanese dictionary example sentence DB 1204*b*, an English-Japanese comprehensive dictionary example sentence table 1206*b*, and an English-English dictionary example sentence 1208*b*. As the word example sentence table, the ROM 20 stores an English-Japanese dictionary word example sentence DB 1204*c*, an English-Japanese comprehensive dictionary word example sentence DB 1206*c*, and an English- English dictionary word example sentence DB 1208*c*. Further, as the phrase DB, the ROM 20 stores an English-Japanese dictionary phrase DB 1204*d*, an English-Japanese comprehensive dictionary phrase DB 1206*d*, and an English-English dictionary phrase DB 1208*d*. Further, as the entry word correspondence table, the ROM 20 stores an entry word correspondence table 1210, an phrase entry word correspondence table 1212. Further, as the programs, the ROM 20 stores a plural word jump program 1220, an example sentence searching program 1222, a phrase searching program 1224 and a plural dictionary searching program 1226.

The Japanese-English dictionary DB 1202 is a DB storing contents of a dictionary DB "Japanese-English dictionary". When a user inputs the inputted letters, the CPU 10 searches for an entry word conforming to the inputted letters within the Japanese-English dictionary DB 1202.

FIG. 29A is a view showing one example of a data structure of the Japanese-English dictionary DB 1202. The Japanese-English dictionary DB 1202 stores an entry word (for example, "せわする") and explanation information of the entry word ("→せわ take care of . . . のせわをする, . . . ") so as to relate each other.

The English-Japanese dictionary DB 1204*a* is a DB storing contents of a dictionary DB "English-Japanese dictionary". When a user inputs inputted letters, the CPU 10 searches for an entry word conforming to the inputted letters within the English-Japanese dictionary DB 1204*a*.

FIG. 29B is a view showing one example of a data structure of the English-Japanese dictionary DB 1204*a*. The English-Japanese dictionary DB 1204*a* stores an entry word (for example "take") and explanation information of the entry word ("I [取る] 1[SVO(M)]<人が><人·物>を . . . ") so as to relate each other.

The English-Japanese comprehensive dictionary DB 1206*a* is a DB storing contents of a dictionary DB "English-Japanese comprehensive dictionary". When a user inputs the inputted letters, the CPU 10 searches for an entry word conforming to the inputted letters within the English-Japanese comprehensive dictionary DB 1206*a*.

FIG. 30A is a view showing one example of a data structure of the English-Japanese comprehensive dictionary DB 1206*a*. The English-Japanese comprehensive dictionary DB 1206*a* stores an entry word (for example, "take") and explanation information of the entry word ("1. a.手に取る, 持つ, つかむ, 握る, . . . ") so as to relate each other.

The English-English dictionary DB 1208*a* is a DB storing contents of a dictionary DB "English-English" dictionary. When a user inputs the inputted letters, the CPU 10 searches for an entry word conforming to the inputted letters within the English-English dictionary DB 1208*a*.

FIG. 30B is a view showing one example of a data structure of the English-English dictionary DB 1208*a*. The English-English dictionary DB 1208*a* stores an entry word (for example, "take") and explanation information of the entry word ("1.[T] to move something from one . . . ") so as to relate each other.

The example sentence DB is a DB accompanying the dictionary DB, and is provided for each dictionary DB correspondingly. Each example sentence DB stores an example sentence number, an example sentence and a source entry word so as to relate one another. Here, an example sentence number is determined so as to be related to each dictionary DB. For example, an example sentence number corresponding to the English-Japanese dictionary DB starts with "X", an example sentence number corresponding to the English-Japanese comprehensive dictionary DB starts with "Y", and an example sentence number corresponding to the English-English dictionary DB starts with "Z". Further, the source entry word indicates an entry word of each dictionary DB that the example sentence corresponds to. In the present embodiment, the electronic dictionary comprises an example sentence DB corresponding to each dictionary DB, the example sentence DB comprising the English-Japanese dictionary example sentence DB 1204*b* corresponding to the English-Japanese dictionary DB 1204*a*, the English-Japanese comprehensive dictionary example sentence DB 1206*b* corresponding to the English-Japanese comprehensive dictionary DB 1206*a*, and the English-English dictionary example sentence DB 1208*b* corresponding to the English-English dictionary DB 1208*a*.

FIG. 31A is a view showing one example of a data structure of the English-Japanese dictionary example sentence DB 1204*b*. The English-Japanese dictionary example sentence DB 1204*b* stores an example sentence number (for example, "X128"), an example sentence ("Take care | when you cross the street. 道路を横断するときは気をつけなさい") and a source entry word ("care") so as to relate one another.

FIG. 31B is one example of a data structure of the English-Japanese comprehensive dictionary example sentence DB 1206*b*. The English-Japanese comprehensive dictionary example sentence DB 1206*b* stores an example sentence number (for example, "Y125"), an example sentence ("Take care! き をつけて《別れの挨拶》") and a source entry word ("care") so as to relate one another.

FIG. 31C is one example of a data structure of the English-English dictionary example sentence DB 1208*b*. The English-English dictionary example sentence DB 1208*b* stores an example sentence number (for example, "Z127") an example sentence ("All right, take care, thanks, Daphne." "You bet.") and a source entry word ("care") so as to relate one another.

The word example sentence table is a table storing a word used in an example sentence (hereafter, it is accordingly referred to as "example sentence word"), and also a table storing an example sentence number of an example sentence using the example sentence word at each example sentence word. In the present embodiment, the electronic dictionary comprises an word example sentence table corresponding to each dictionary DB, the word example sentence table comprising the English-Japanese dictionary word example sentence table 1204*c* corresponding to the English-Japanese dictionary DB 1204*a*, the English-Japanese comprehensive dictionary word example sentence table 1206*c* corresponding to the English-Japanese comprehensive dictionary DB 1206*a*, and the English-English dictionary word example sentence table 1208*c* corresponding to the English-English dictionary DB 1208*a*.

FIG. 32A is a view showing one example of a data structure of the English-Japanese dictionary word example sentence table 1204*c*. The English-Japanese dictionary word example sentence table 1204*c* stores an example sentence word (for example, "care") and an example sentence number (". . . , X54, X76, X128, X203, . . . ") so as to relate each other.

FIG. 32B is a view showing one example of a data structure of the English-Japanese comprehensive dictionary word example sentence table 1206*c*. The English-Japanese comprehensive dictionary word example sentence table 1206*c* stores an example sentence word (for example, "care") and an example sentence number (". . . , Y10, Y125, Y126, Y232, . . . ") so as to relate each other.

FIG. 32C is a view showing one example of a data structure of the English-English dictionary word example sentence table 1208*c*. The English-English dictionary word example sentence table 1208*c* stores an example sentence word (for example, "care") and an example sentence number (". . . , Z24, Z83, Z127, Z252, . . . ") so as to relate each other.

The phrase DB is a DB storing an entry word of each phrase (hereafter, it is accordingly referred to as "phrase entry word") and explanation information of the phrase entry word so as to relate each other. In the present embodiment, the electronic dictionary comprises a phrase DB corresponding to each dictionary DB, the phrase DB comprising the English-Japanese dictionary phrase DB 1204*d* corresponding to the English-Japanese dictionary DB 1204*a*, the English-Japanese comprehensive dictionary phrase DB 1206*d* corresponding to the English-Japanese comprehensive dictionary DB 1206*a*, and the English-English dictionary phrase DB 1208*d* corresponding to the English-English dictionary DB 1208*a*.

FIG. 33A is a view showing one example of a data structure of the English-Japanese dictionary phrase DB 1204*d*. The English-Japanese dictionary phrase DB 1204*d* stores an entry word (for example, "take care") and explanation information ("[自][. . . に] 気をつける, 注意する. . . ") so as to relate each other.

FIG. 33B is one example of a data structure of the English-Japanese comprehensive dictionary phrase DB 1206*d*. The English-Japanese comprehensive dictionary phrase DB 1206*d* stores an entry word (for example, "take care") and explanation information ("用心する, 気をつける; 取り計らう. . . ") so as to relate each other.

FIG. 33C is a view showing one example of a data structure of the English-English dictionary phrase DB 1208*d*. The English-English dictionary phrase DB 1208*d* stores an entry word (for example, "take care") and explanation information ("to be careful") so as to relate each other.

The entry word correspondence table 1210 is a DB storing a common entry word including all the entry words registered in each dictionary DB, and an entry word stored in each dictionary DB (hereafter, it is accordingly referred to as "entry word for each dictionary DB") so as to relate each other. By referring to the entry word correspondence table 1210, the CPU 10 judges which dictionary DB stores the common entry word.

FIG. 34A is a view showing one example of a data structure of the entry word correspondence table 1210. The entry word correspondence table 1210 stores a common entry word (for example, "unitedstates") and entry word for each dictionary DB so as to relate each other. The entry word for each dictionary DB stores an entry word of the English-Japanese dictionary DB 1204*a* ("United States (of America)"), an entry word of the English-Japanese comprehensive dictionary DB 1206*a* ("United States") and an entry word of the English-English dictionary DB 1208*a* ("United States of America").

Further, there is a case where, depending on a dictionary DB, although the meaning of an entry word is identical, different notations are used. For example, although "United States (of America)" is registered in the English-Japanese dictionary DB 1204*a*, "United States" is registered in the English-Japanese comprehensive dictionary DB 1206*a* and "United States of America" is registered in the English-English dictionary DB 1208*a*. In this case, since "unitedstates" is registered in the entry word correspondence table 1210 as a common entry word, it is possible to load corresponding entry word for each dictionary DB, as long as "unitedstates" is recognized.

FIG. 34B is a view showing one example of a data structure of the phrase entry word correspondence table 1212. The phrase entry word correspondence table 1212 stores, in approximately the same way as the entry word correspondence table 1210, a common phrase entry word including all the entry words registered in each phrase DB, and an entry word stored in each phrase DB (hereafter, it is accordingly referred to as "entry word for each phrase DB"), so as to relate each other. The phrase entry word correspondence table 1212 stores a common phrase entry word (for example, "take care of") and entry word for each phrase DB so as to relate each other. The entry word for each phrase DB stores an entry word of the English-Japanese dictionary phrase DB 1204*d* ("take care of O"), an entry word of the English-Japanese comprehensive dictionary phrase DB 1206*d* ("take care of") and an entry word of the English-English dictionary phrase DB 1208*d* ("take care of").

The RAM 30 comprises a memory area for temporarily holding various types of programs to be executed by the CPU 10, data concerning the execution of the various types of programs and the like. In the present embodiment, the RAM 30 comprises an inputted letter storing area 1302, an assigned-for-jump word storing area 1304, a jump word storing area 1306 and an example sentence number storing area 1308.

The inputted letter storing area 1302 is an area storing letters inputted by a user as inputted letters. For example, if a user inputs "せわする" through the inputting unit 40, the CPU 10 stores "せわする" in the inputted letter storing area 1302.

Figures 35A, 35B:
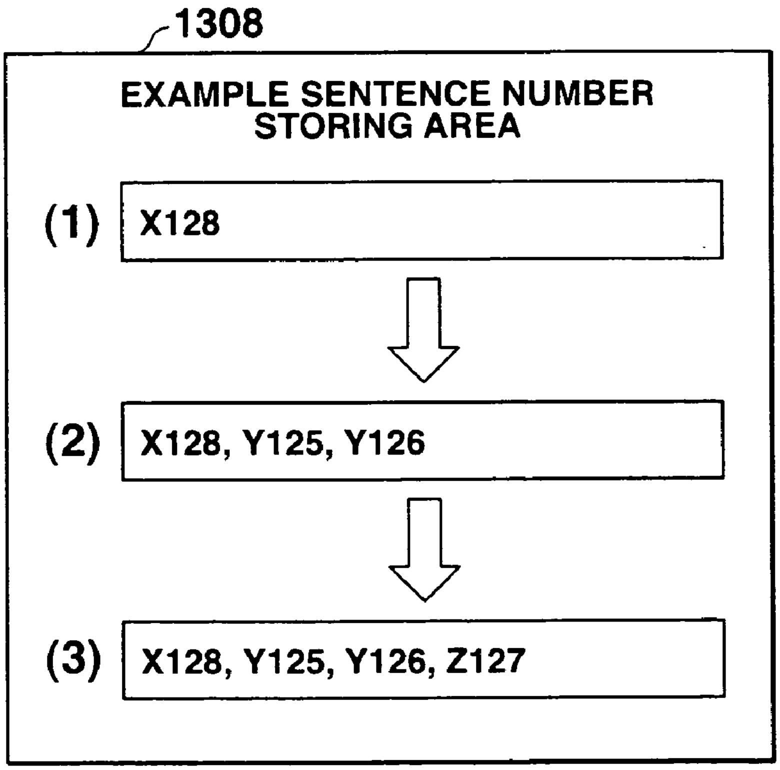
FIG. 35A is a view showing one example of a data structure of an assigned-for-jump word storing area.
FIG. 35B is a view showing one example of a data structure of an example sentence number storing area.

The assigned-for-jump word storing area 1304 is an area comprising a word storing area for a plurality of words. FIG. 35A is one example of the assigned-for-jump word storing area 1304. For example, in the plural word jump process, if "take care" is assigned, "take" is stored in an area for a first word, and "care" is stored in an area for a second word, respectively.

The jump word storing area 1306 is an area used with a phrase searching program 1224 and a plural dictionary searching program 1226. For example, when the CPU 10 executes the phrase searching program 1225, words stored in the assigned-for-jump word storing area 1304 are united with blank. Then, the united words are stored in the jump word storing area 1306.

The example sentence number storing area 1308 is an area for storing an example sentence number in the example sentence searching process. Also, the example sentence number storing area 1308 is a storage area for storing an example sentence number of an example sentence including a selected word so as to accumulate the example sentence number.

The CPU 10 executes processes based on predetermined programs according to inputted instructions, for instructing each function unit and for transmitting data. Concretely, the CPU 10 loads a program stored in the ROM 20 according to an operation signal inputted through the inputting unit 40, and executes a process according to the program. Then, the CPU 10 outputs a display control signal for displaying a process result to the displaying unit accordingly, and displays corresponding display information.

Further, in the present embodiment, the CPU 10 executes a plural word jump process (see FIG. 36) according to a plural word jump program 1220 in the ROM 20. In addition, in the plural word jump process, the CPU 10 executes an example sentence searching process (see FIG. 37) according to an example sentence searching program 1222, a phrase searching process (see FIG. 41) according to a phrase searching program 1224, and a plural dictionary searching process (see FIGS. 42A and 42B) according to a plural dictionary searching program 1226.

Concretely, in the plural word jump process, the CPU 10 searches for an entry word conforming to the inputted letters within the English-Japanese dictionary DB. Then, the CPU 10 displays a list of the searched entry words, and further displays explanation information corresponding to an entry word selected among the entry words displayed as a list. Then, when a plurality of words are selected in the displayed explanation information according to a predetermined operation, the CPU 10 stores the selected plurality of words in the assigned-for-jump word storing area 1304. Then, when a jump destination is selected, the CPU 10 executes a program corresponding to the jump destination. Here, when the CPU 10 executes the phrase searching process, words stored in the assigned-for-jump word storing area 1304 are united with blank, and the united words are stored in the jump word storing area 130 and then the CPU 10 executes the phrase searching process. Further, when the CPU 10 executes the plural dictionary searching process, words stored in the assigned-for-jump word storing area 1304 are united as-is, and the united words are stored in the jump word storing area 1306 and the CPU 10 executes the plural dictionary searching process.

Further, in the example sentence searching process, the CPU 10 extracts an example sentence number of an example sentence including all the words stored in the assigned-for-jump word storing area 1304, from the English-Japanese dictionary word example sentence table 1204*c*. Then, the CPU 10 stores the extracted example sentence number in the example sentence number storing area 1308. Similarly, the CPU 10 stores a number extracted from the English-Japanese comprehensive dictionary word example sentence table 1206*c* and a number from the English-English dictionary word example sentence table 1208*c*, in the example sentence number storing area 1308. Then, based on the example sentence number stored in the example sentence number storing area 1308, the CPU 10 displays a dictionary mark and the example sentence, the dictionary mark indicating a dictionary DB related to the example sentence.

Further, in the phrase searching process, based on a jump word stored in the jump word storing area 1306, the CPU 10 searches for a common phrase entry word within the phrase entry word correspondence table 1212. Then, the CPU 10 loads the corresponding entry word for each phrase DB, and displays a list of phrases with a dictionary mark. When one phrase is selected among the list-displayed phrases, the CPU 10 displays explanation information of the selected phrase on the displaying unit 50.

Further, in the plural dictionary searching process, based on a jump word stored in the jump word storing area 1306, the CPU 10 searches for a common entry word within the entry word correspondence table. Then, the CPU 10 loads the corresponding entry word for each DB, and displays the entry word with a dictionary mark as a list. When one entry word is selected among the list-displayed entry words, the CPU 10 displays explanation information of the selected entry word on the displaying unit 50.

The inputting unit 40 is an inputting device comprising a key group which is necessary for inputting letters such as kana, alphabet and the like, and for selecting a function and the like. The inputting unit 40 outputs a signal of a pushed key to the CPU 10. This key input at the inputting unit 40 realizes an inputting unit for inputting a search word, selecting a dictionary mode, instructing search execution, starting a jump function and the like. Here, the inputting unit 40 is not limited to the key group 5, and it may be a touch panel or the like.

The displaying unit 50 is a device for displaying various types of screen based on a display signal inputted from the CPU 10. The displaying unit 50 comprises an LCD (Liquid Crystal Display) or the like. Here, the displaying unit 50 corresponds to the display 3 in FIG. 1.

The Bus 60 is a path for passing electric signals such as data and the like, and is a signal line for interconnecting among the CPU 10, the ROM 20, the RAM 40 the inputting unit 40 and the displaying unit 50.

[2 Operation]

[2.1 Whole Flow]

Figure 36:
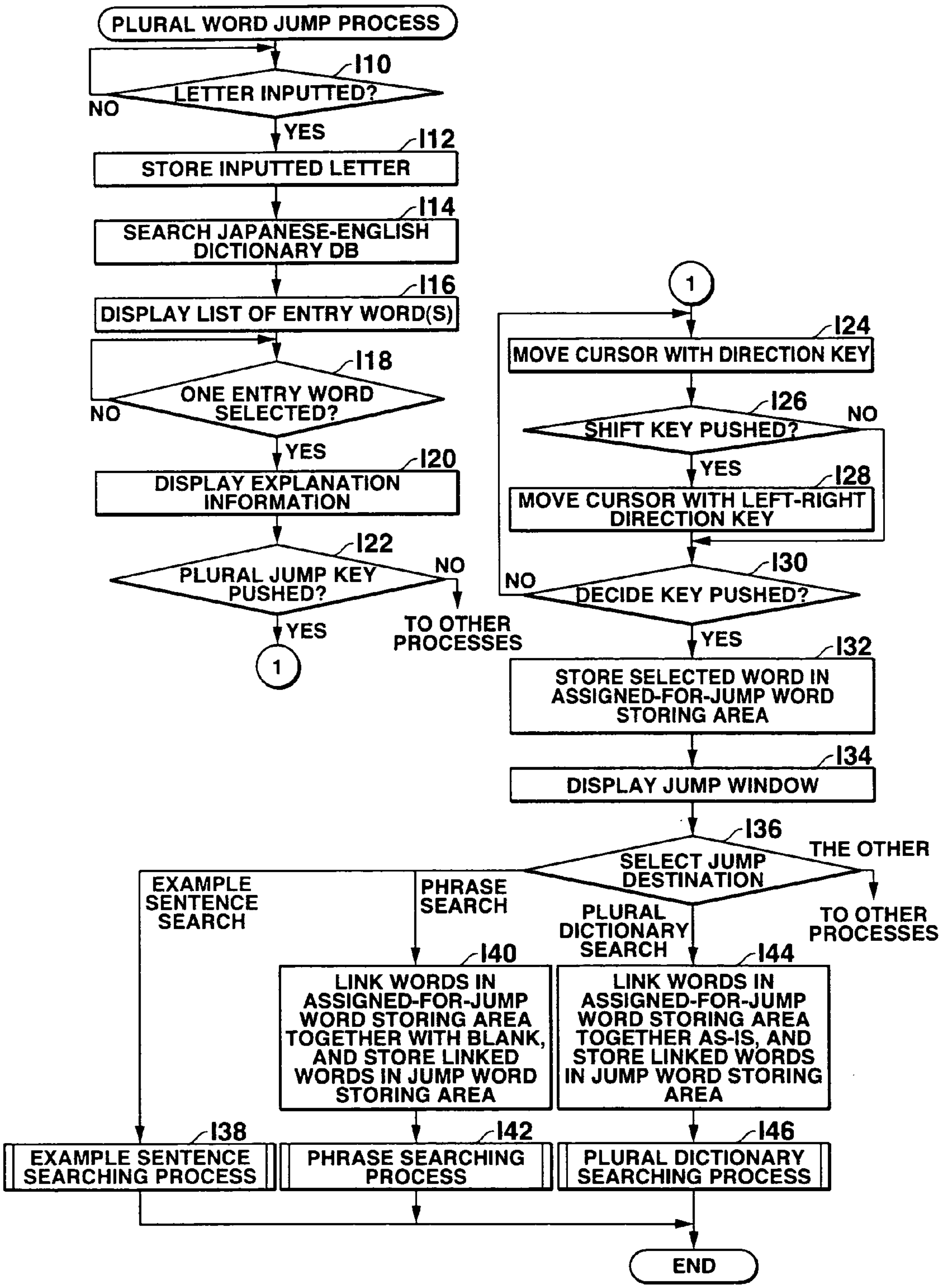
FIG. 36 is a flowchart illustrating a plural word jump process.

FIG. 36 is a flowchart for describing an operation of the electronic dictionary 1 according to the plural word jump process. The plural word jump process is a process implemented with the CPU 10 executing the plural word jump program 1220 in the ROM 20.

First, the CPU 10 displays an input screen on the displaying unit 50, the input screen prompting a user to input inputted letters. Then, when inputted letters are inputted (Step I10; Yes), the CPU 10 stores the inputted letters in the inputted letter storing area 302 (Step I12). Then, the CPU 10 searches an entry word conforming to the inputted letters stored in the inputted letter storing area 302, within the Japanese-English dictionary DB 1202.

Next, the CPU 10 displays a list of entry words conforming to the inputted letters (Step I16). Then, when one entry word is selected among the entry word candidates displayed as a list (Step I18; Yes), the CPU 10 loads explanation information corresponding to the selected entry word from the Japanese-English dictionary DB 1202, and displays it on the displaying unit 50 (Step I20).

Figure 38A:
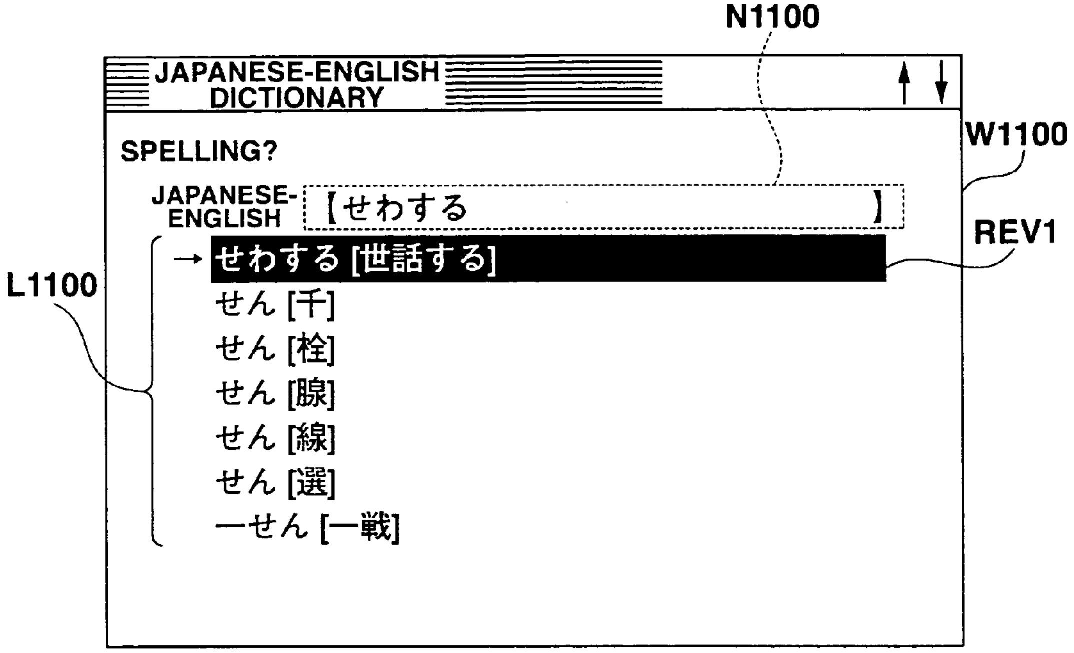
FIGS. 38A and 38B are views showing one example of transitions of a display screen in the example sentence searching process.
Figure 38B:
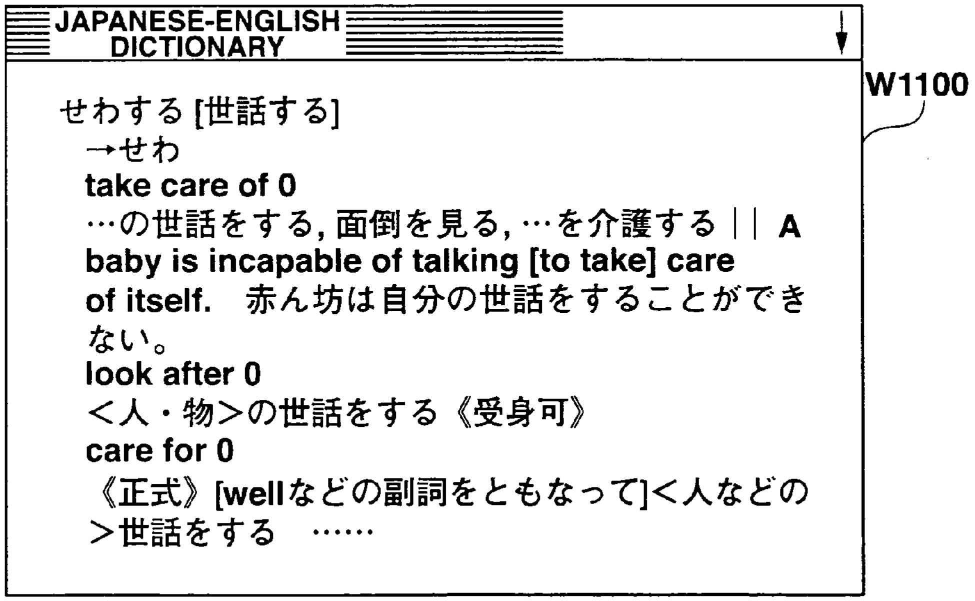

Concretely, the process will be described with reference to FIGS. 38A and 38B. FIGS. 38A and 38B are showing one example of a display screen W1100 in this step. FIG. 38A is a display screen example on which "せわする" as inputted letters is inputted in an area N1100 and entry word candidate list display L1100 is displayed. When "せわする せわする" is inputted as inputted letters (FIG. 361 Step I10), "せわする" is stored in the inputted letter storing area 1302 (Step I12). Next, the CPU 10 displays a list of entry word candidates conforming to the inputted letters "せわする", as entry words of the Japanese-English dictionary DB 1202 (entry word candidate list display L1100).

Here, an inversion display REV1 is applied on an entry word "せわする" conforming to the inputted letters " せわする". Then, the decide key 9 is pushed in this せわする step, and explanation information corresponding to the entry word "せわするせわする" is displayed. A display screen example which displays such a state is a display screen W1100 of FIG. 38B.

Next, when the plural word jump key 13*d* is pushed (Step I22; Yes), the CPU 10 displays a cursor on the displaying unit 50. Then, by pushing the up-down direction key 11*b* and the left-right direction key 11*a*, the cursor is moved in a direction of up-and-down and/or left-and-right in conjunction with the key. Then, in the state that the shift key is pushed (Step I26; Yes) and the left-right direction key 11*a* is continuously pushed, the CPU 10 also sets a word-corresponding to the direction key as a selected state (Step I28). Here, if the decide key 9 is pushed (Step I30; Yes), a word in the selected state is stored in the assigned-for-jump word storing area 1304. Concretely, the first word of the selected words is stored in a first word storing area of the assigned-for-jump word storing area 1304. Next, the second word of the selected words is stored in a second word storing area of the assigned-for-jump word storing area 1304. In this way, the selected words are stored in each storing area of the assigned-for-jump word storing area 1304, in the order starting from the top word of the selected words.

Further, if the decide key is not pushed (Step I30; No), the CPU 10 further prompts a user to input a word (Step I24).

Here, if, without the shift key pushed (Step I26; No), the decide key 9 is pushed (Step I30; Yes), a word which is currently selected is stored in the first word storing area of the assigned-for-jump word storing area 1304 (Step I32).

Figure 39A:
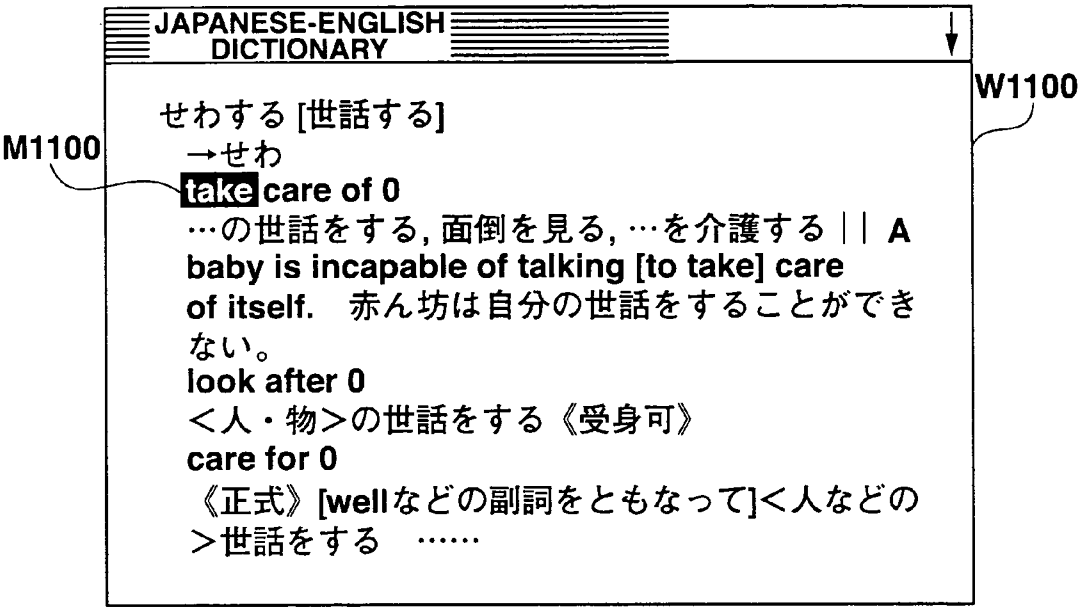
FIGS. 39A and 39B are views showing one example of transitions of a display screen in the example sentence searching process.
Figure 39B:
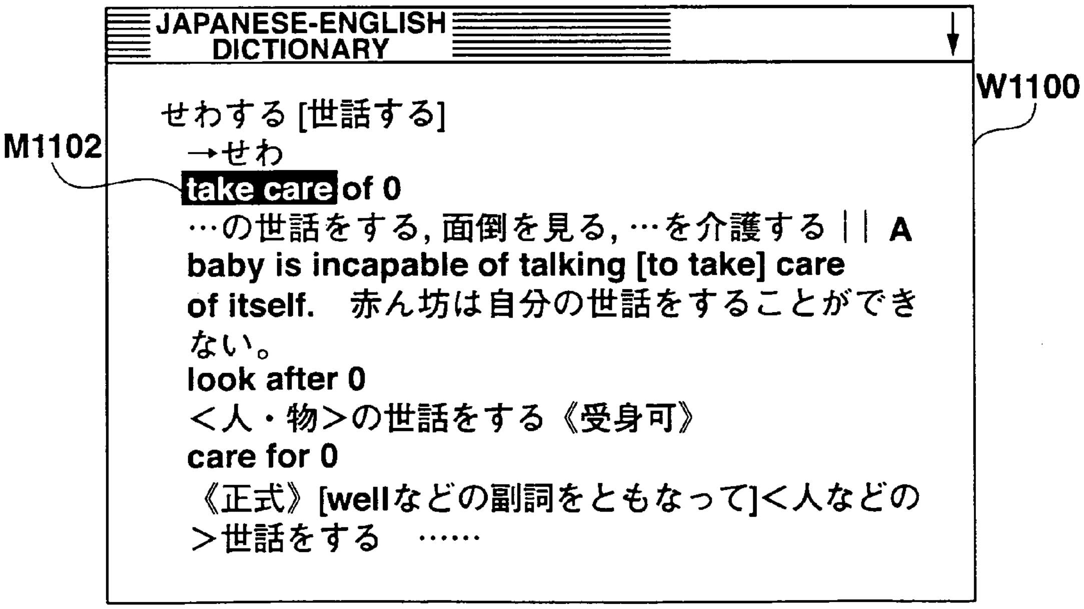

With reference to FIGS. 39A and 39B, the process will be described concretely. FIGS. 39A and 39B are showing one example of the display screen W1100 in this step.

First, by pushing the up-down direction key 11*b* and the left-right direction key 11*a*, a word in the selected state is moved. Here, as one example, a state where an inversion display M1100 is applied in order to show that "take" is in the selected state is FIG. 39A. In this state, when the shift key is pushed and then the left-right direction key 11*a* is pushed, a selected state of a word changes.

FIG. 39B is a view showing a state where the right direction key of the left-right direction key 11*a* is once pushed after the shift key 17 is pushed. By pushing the right direction key once, "care" which is displayed at the right side of "take" also becomes in the selected state, and therefore an inversion display M1102, which indicates the selected state, is applied on "take care". FIG. 39B shows such a state.

Here, in the present embodiment, a next word is selected by pushing the direction key. However, what is to be selected is not limited to a word, and it may be a unit of each letter. For example, in the state that "take" is selected, if the right direction key is pushed once, "c" is selected and all the selected letters will be "take c".

Further, in the present embodiment, described is the case that, after the shift key 15 is pushed, the left-right direction key 11*b* is pushed. However, the present invention is not limited to the case. For example, a plurality of words may be assigned by, after a word "take" is selected, re-pushing the decide key 9, a selection is made with the left-right direction key.

Here, if the decide key 9 is pushed (FIG. 36; Step I30; Yes), the selected "take care" is stored in the assigned-for-jump word storing area 1304 (FIG. 36; Step A32). Concretely, since the selected words are "take" and "care", "take" is stored in the first word storing area of the assigned-for-jump word storing area 1304, and "care" is stored in the second word storing area of the assigned-for-jump word storing area 1304.

Next, the CPU 10 displays a jump window on the displaying unit 50, the jump window displaying items of jump destinations (Step I34). When a jump destination is selected in the displayed jump window (Step I36), the CPU 10 executes a process which is appropriate to the selected jump destination (Step I38 to I46).

In this way, by executing the plural word jump process, it is possible to select a plurality of words and continuously execute a process selected in the jump window.

[2.2 Example Sentence Searching Process]

Next, the example sentence searching process will be described. In the plural word jump process, when the jump window is displayed and the example sentence search is selected (FIG. 36; Step I36; EXAMPLE SENTENCE SEARCH), the CPU 10 executes the example sentence searching process according to the example sentence searching program 1222 (Step I38).

Figure 37:
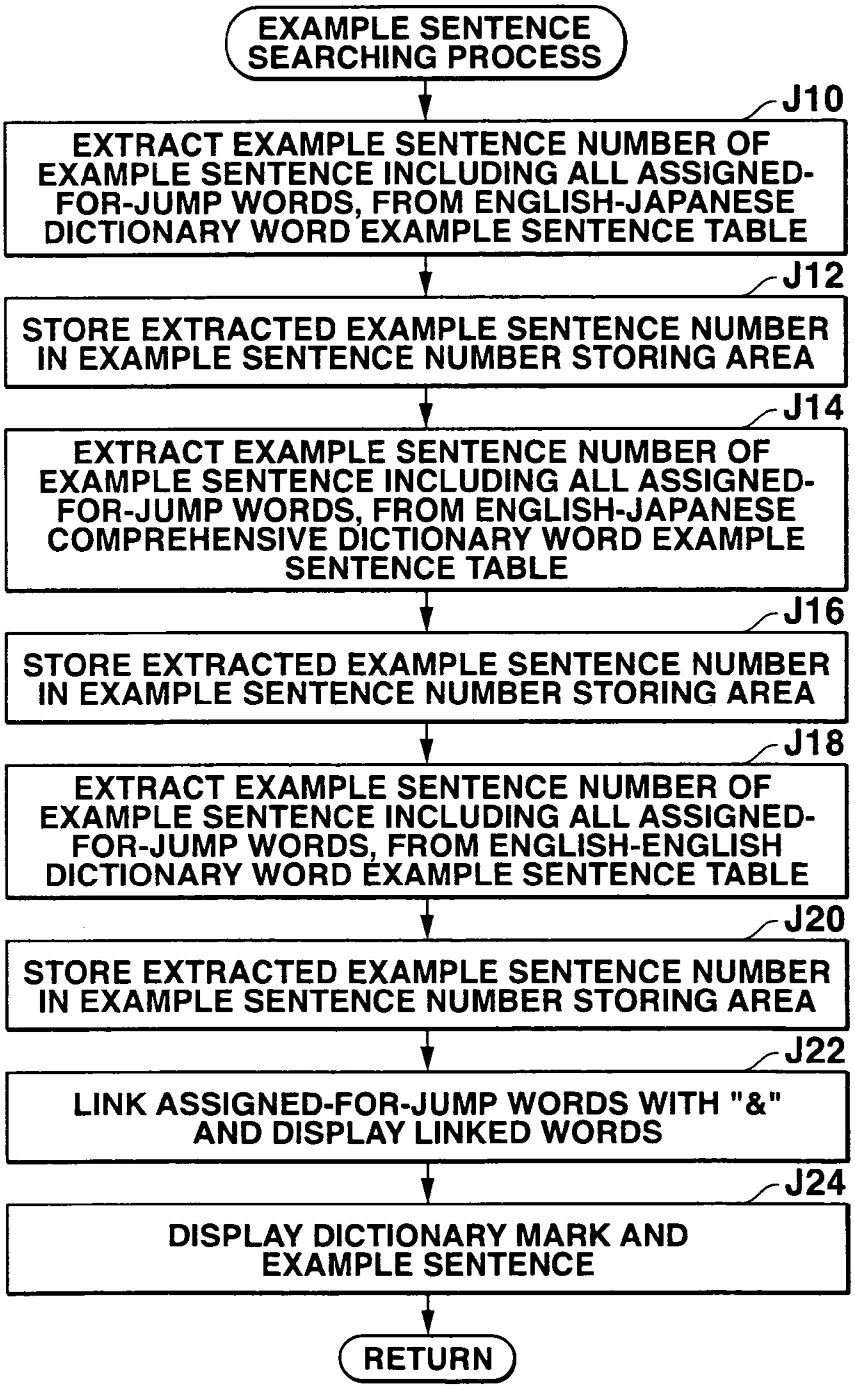
FIG. 37 is a flowchart illustrating an example sentence searching process.

FIG. 37 is a flowchart for describing an operation of the electronic dictionary 1 according to the example sentence searching process. The example sentence searching process is a process implemented with the CPU 10 executing the example sentence searching program 122 in the ROM 20.

First, the CPU 10 extracts an example sentence number of an example sentence including all the assigned-for-jump words stored in the assigned-for-jump word storing area 1304, from the English-Japanese dictionary word example sentence table 1204*c* (Step J10). Then, the CPU 10 stores the extracted example sentence number in the example sentence number storing area 1308. (Step J12).

For example, if "take" and "care" are stored in the assigned-for-jump word storing area 1304, the CPU 10 extracts an example sentence including "take" and "care" with the use of the English-Japanese dictionary word example sentence table 1204*c*. For example, with reference to one example of the English-Japanese dictionary word example sentence table 1204 of FIG. 32A, a common number "X128" between example sentence numbers "X48, X65, X128, X153" which are related to "take", and example sentence numbers "X54, X76, X128, X203" which are related to "care", is extracted and stored in the example sentence number storing area 1308.

Similarly, the CPU 10 extracts an example sentence including all the assigned-for-jump words stored in the assigned-for-jump word storing area 1304, from the English-Japanese comprehensive dictionary word example sentence table 1206*c*, and from the English-English dictionary word example sentence table 1208*c*. Then, the CPU 10 stores the extracted example sentence number in the example sentence number storing area 1308 (Step J14 to J20).

Here, FIG. 35B is a view indicating a state of the example sentence number storing area 1308. First, an example sentence number "X128" extracted in Step J10 is stored (FIG. 35B (1)). Next, in Step J14, example sentence numbers "Y125, Y126" extracted from the English-Japanese comprehensive dictionary word example sentence table 1206*c* are stored in the example sentence number storing area 1308 (FIG. 35B (2)). Then, In Step J18, an example sentence number "Z127" extracted from the English-English dictionary word example sentence table 1208*c* is further stored in the example sentence number storing area 1308 (FIG. 35B (3)). In this way, example sentence numbers are stored in the example sentence number storing area 1308 so as to accumulate the example sentence numbers.

Next, the CPU 10 unites assigned-for-jump words stored with "&" in the assigned-for-jump word storing area 1304, and displays the united words on the displaying unit 50 (Step J22). For example, if "take" and "care" are stored in the assigned-for-jump word storing area 1304, the CPU 10 displays "take&care", which is an united form of "take" and "care" with "&", on the displaying unit 50.

Then, the CPU 10 displays an example sentence corresponding to an example sentence number stored in the example sentence number storing area 1308, and a dictionary mark of a dictionary DB which is related to the displayed example sentence (Step J24). Here, the dictionary mark is a mark indicating a type of a dictionary DB, for example, a mark indicating the English-Japanese dictionary which is a letter "E-J" surrounded with square to be identified as the English-Japanese dictionary (for example, a dictionary mark M6 of FIG. 40B), a letter "E-J com" surrounded by square for identifying itself as the English-Japanese comprehensive dictionary (for example, a dictionary mark M2 of FIG. 40B), a letter "E-E" surrounded by square for identifying itself as the English-English dictionary (for example, a dictionary mark M4 of FIG. 40B) and the like. Here, a dictionary mark is not limited to such a form, and may be expressed with other mark, figure or the like.

Figure 40A:
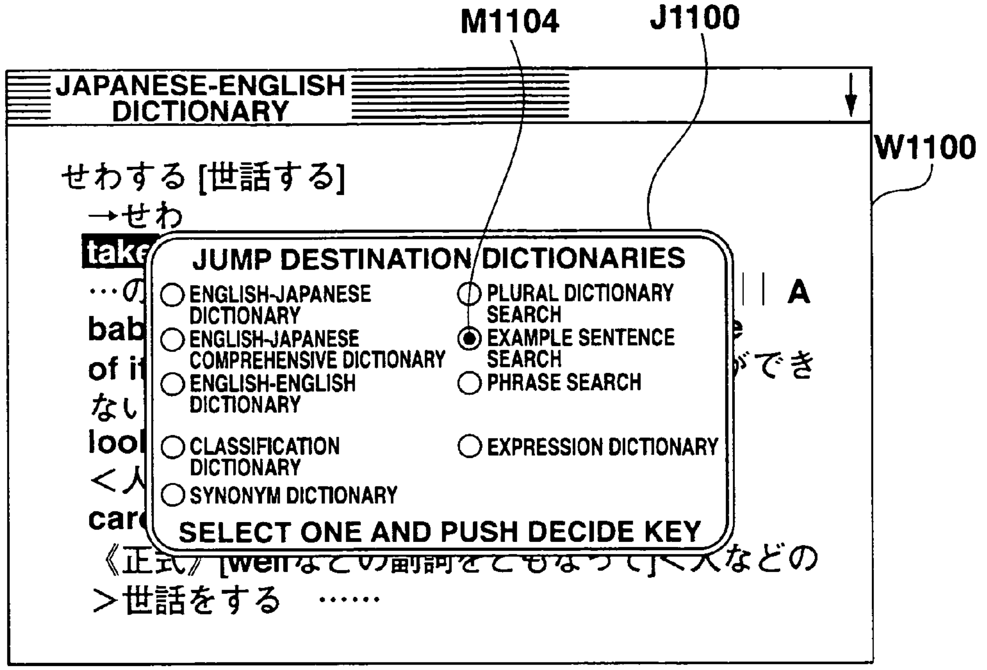
FIGS. 40A and 40B are views showing one example of transitions of a display screen in the example sentence searching process.
Figure 40B:
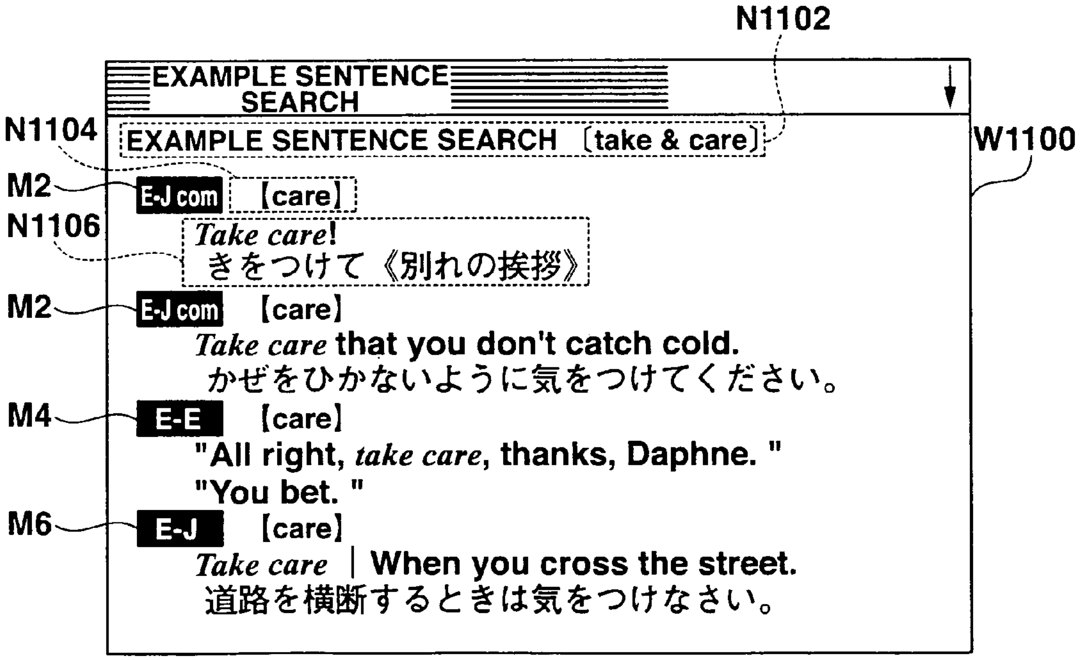

FIGS. 40A and 40B show one example of a display screen W1100 which is displayed on the displaying unit 50 when the CPU 10 executes the example sentence searching process.

FIG. 40A shows one example of the display screen W1100 on which the CPU 10 displays a jump window J1100 in the plural word jump process. On the jump window J1100, items of jump destinations are displayed. When a user is to decide a jump destination, the user has a radio button corresponding to the item in a selected state, and pushes the decide key 9.

Then, if the CPU 10 judges that the example sentence search is selected with the use of a radio button M1104 (Step I36; EXAMPLE SENTENCE SEARCH), the CPU 10 executes the example sentence searching program for performing the example sentence searching process.

FIG. 40B is a screen where example sentences are displayed on the display screen W1100 after the example sentence searching process is performed. The assigned-for-jump words stored in the assigned-for-jump word storing area 1305 are united with "&" and displayed on a display area N1102. Then, example sentences which are searched for in the example sentence searching process are displayed as a list. Further, dictionary marks indicating a type of dictionary DB to which an example sentence is related are displayed. For example, the dictionary mark M2 indicates that the displayed example is related to "English-Japanese comprehensive dictionary DB", and similarly, the dictionary mark M4 indicates that the example sentence is related to "English-English dictionary DB" and the dictionary mark M6 indicates that the example sentence is related to "English-Japanese dictionary DB". Then, on a display area N1104 beside the dictionary mark, a source entry word of the example sentence is displayed, and the example sentence is displayed on a display area N1106 below the display area N1104. For example, in the case of an example sentence displayed at the top of the screen, an source entry word "care" and an example sentence "Take care! 気をつけて《別れの挨拶》" are displayed.

In this way, according to the example sentence searching process, it is possible to search for an example sentence including a plurality of words selected in the plural word jump process. Further, it is possible to search for an example sentence related to a plurality of dictionary DBs, and to display a list of them. Further, by displaying a dictionary mark indicating which dictionary data each example sentence is related to, it is possible to improve convenience.

[2.3 Phrase Searching Process]

Next, the phrase searching process will be described. In the plural jump process, when the jump window is displayed and the phrase search is selected (FIG. 36; Step I36; PHRASE SEARCH), the CPU 10 unites words stored in the assigned-for-jump word storing area 1304 with blank, and stores the united words in the jump word storing area 1306 (Step I40). Then, the CPU 10 performs the phrase searching process according to the phrase searching program 1224.

For example, if "take" and "care" are stored in the assigned-for-jump word storing area 1304, the CPU 10 stores "take care" in the jump word storing area 1306.

Figure 41:
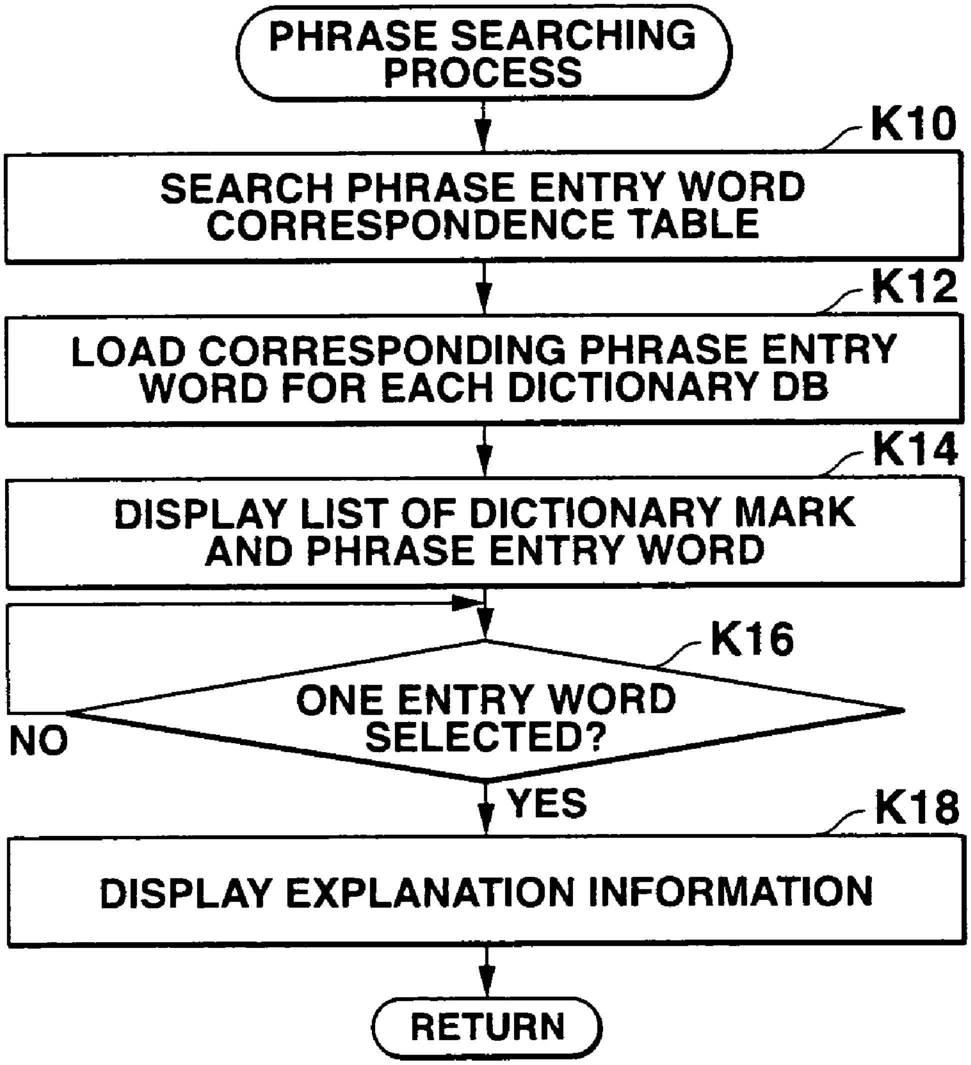
FIG. 41 is a flowchart illustrating a phrase searching process.

FIG. 41 is a flowchart for describing an operation of the electronic dictionary 1 according to the phrase searching process. The phrase searching process is a process implemented with the CPU 10 executing the phrase searching program 1224 in the ROM 20.

First, the CPU 10 searches for a common phrase entry word conforming to a jump word stored in the jump word storing area 1306, within the phrase entry word correspondence table 1212 (Step K10). Concretely, the CPU 10 searches for a common phrase entry word which corresponds to the jump word stored in the jump word storing area 1306 or which starts from the inputted letters, within the common phrase entry word of the phrase entry word correspondence table 1212. Then, based on the searched common phrase entry word and the entry word for each phrase DB registered in the phrase entry word correspondence table 1212, the CPU 10 loads a phrase entry word from each phrase dictionary DB (Step K12).

Next, the CPU displays dictionary marks indicating dictionary DBs in which phrase entry words are registered, and the phrase entry words, as a list (Step K14). Then, one phrase entry word is selected among the phrase entry words displayed as a list (Step K16; Yes), the CPU 10 loads explanation information corresponding to the selected phrase entry word, from the related dictionary DB, and displays the loaded explanation information on the displaying unit 50 (Step K18).

Figure 42A:
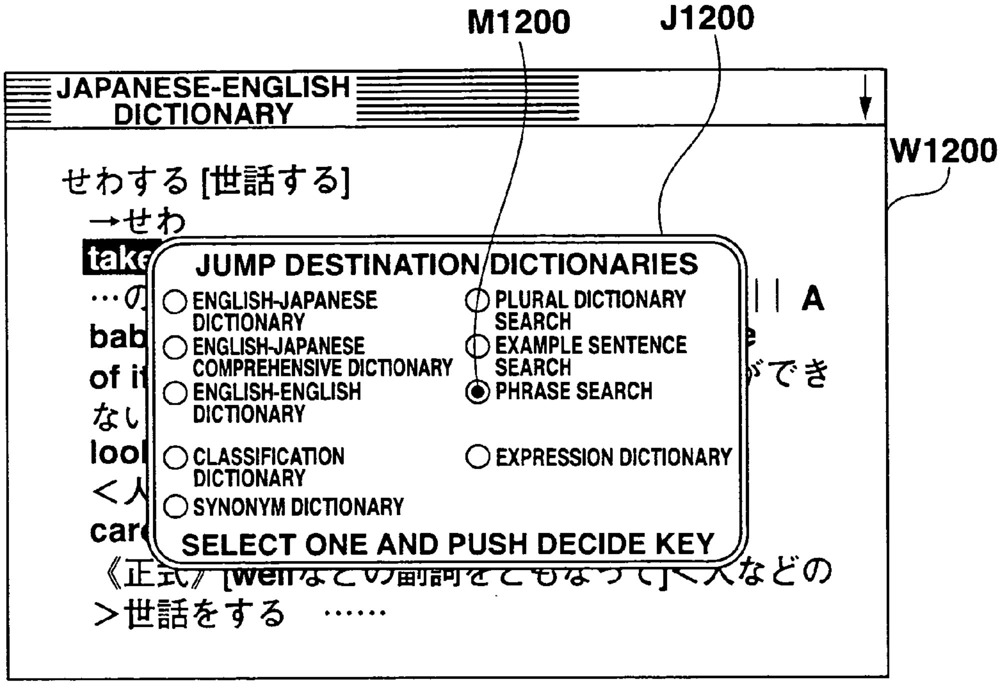
FIGS. 42A and 42B are views showing one example of transitions of a display screen in the phrase searching process.

FIG. 42A shows one example of a display screen W1200 on which a jump window J1200 is displayed. In the plural word jump process, after "take care" is selected, the decide key 9 is pushed and the jump window J1200 is displayed (FIG. 36; Step I34). FIG. 42A is a display screen in such a state. Here, the phrase search is selected with the use of the radio button M1200.

Figure 42B:
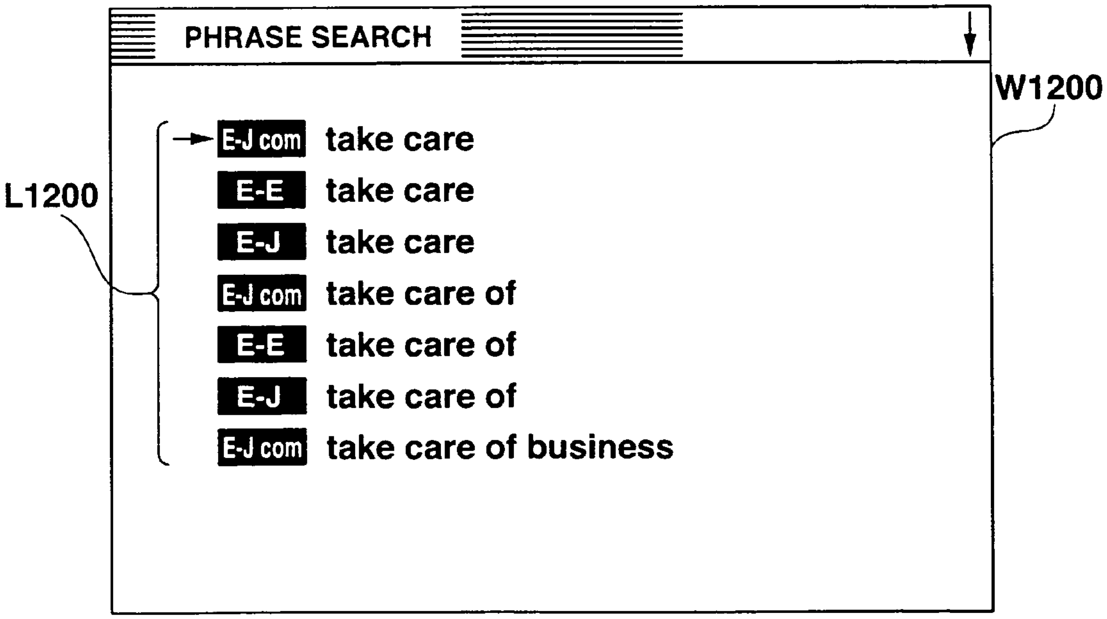

FIG. 42B shows one example of the display screen W1200 on which a list of phrase entry words are displayed. In FIG. 42A, if the phrase search is selected (FIG. 36; Step I36; PHRASE SEARCH), "take" and "care" which are stored in the assigned-for-jump word storing area 1304 are united with blank, and stored in the jump word storing area 1306 as "take care" (FIG. 36; Step I40). Then, the CPU 10 searches for a common phrase entry word conforming to "take care", which is stored in the jump word storing area 1306, within the phrase entry word correspondence table 1212. Then, based on the searched common phrase entry word "take care", the CPU 10 displays an entry word list display L1200, on which a list of corresponding data is displayed.

Figure 43:
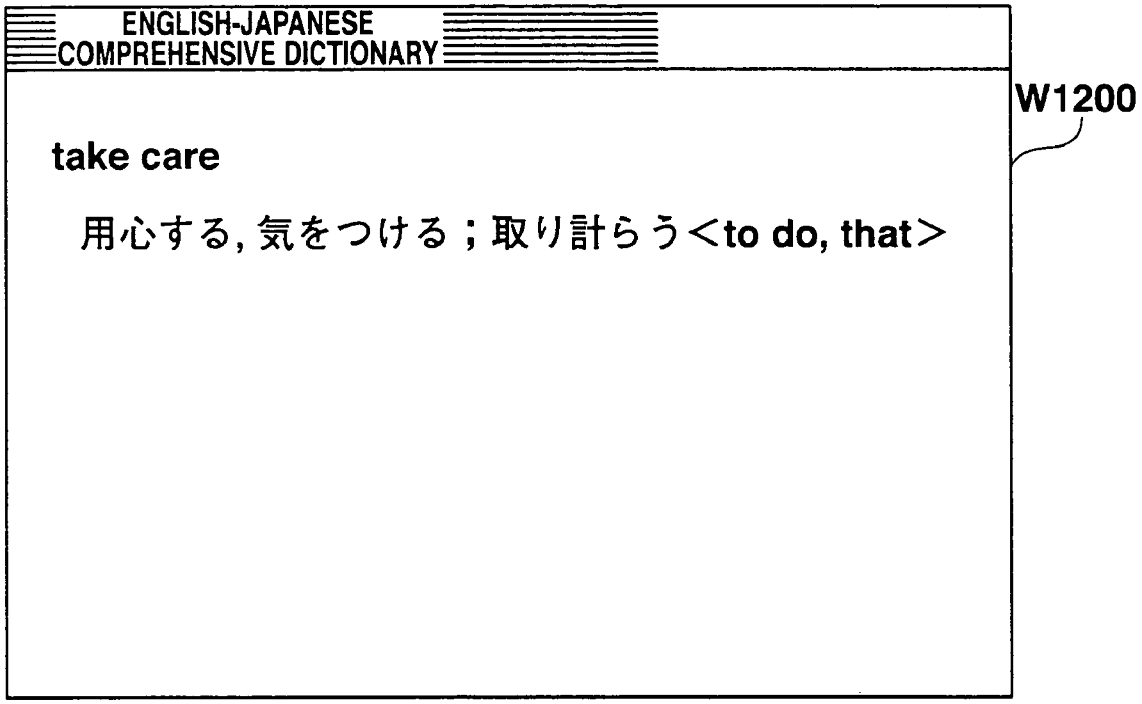
FIG. 43 is a view showing one example of transitions of a display screen in the phrase searching process.

FIG. 43 shows one example of the display screen W1200 on which explanation information corresponding to the selected phrase is displayed. If a phrase entry word "take care" which is related to the English-Japanese comprehensive-dictionary phrase DB 1206*d* is selected among the phrase entry words displayed as a list (FIG. 41; Step K16), explanation information corresponding to the selected phrase entry word "take care" is loaded from the English-Japanese comprehensive dictionary phrase DB 1206*d*, and displayed.

In this way, according to the phrase searching process, even in the case of performing the jump process with a plurality of words selected, it is possible to display explanation information of an appropriate phrase. Further, even if a jump origin is a plurality of words, it is possible to display information regarding an appropriate phrase entry word. Further, even if a notation of a phase entry word are different in each phrase dictionary DB, it is possible to display an entry word with the list-display.

[3.2 Application to Client/Server Model]

In the above-described embodiment, the description is made by regarding the electronic dictionary 1 as the so-called stand alone type, which operates by itself. However, an apparatus to which the present invention can be applied is not limited to the stand alone type. It is possible to realize an apparatus according to the present invention by incorporating a communicating device into the electronic dictionary or by structuring a communicating device connectable, for communicating with a server. With reference to figures, the description will be made.

Figure 44:
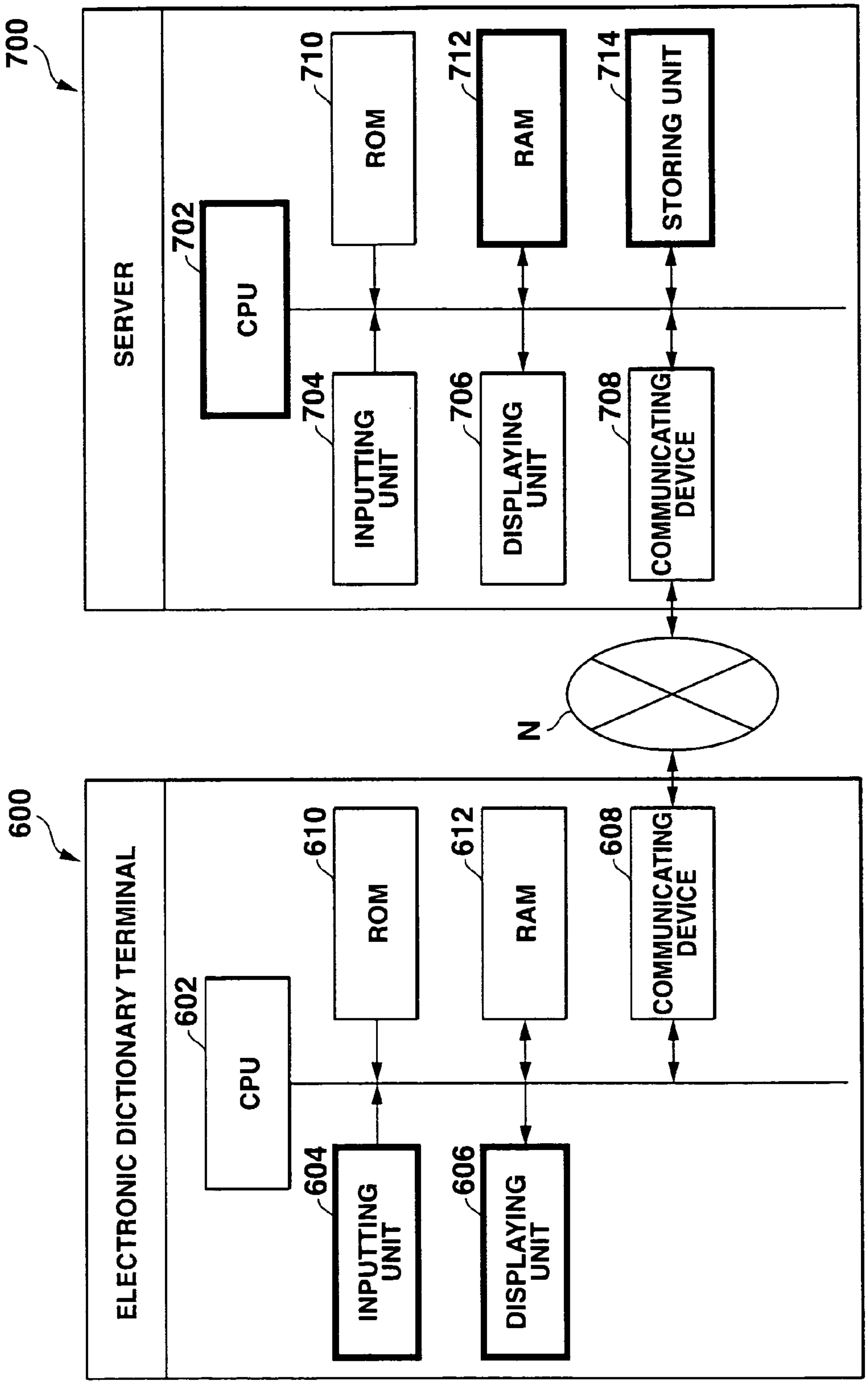
FIG. 44 is a view showing one example of a block diagram of an alternative example in the present embodiment.

FIG. 44 is a view showing an outline example of a system structure where an electronic dictionary terminal 600 incorporating therein a communicating device and a server 700 are connectable to each other through a communication line N. The server 700, for example, comprises a general-purpose workstation, a server-use computer or the like, and the electronic dictionary terminal 600 comprises a personal computer incorporating therein a communicating device, an electronic dictionary incorporating therein a communicating device or the like. The communication line N is wired/wireless telephone network, Internet network or the like.

In FIG. 44, thick line indicates function block having main function of the electronic dictionary 1 in the above-described embodiment. A CPU 702 of the server 700 performs the explanation information displaying process and the like, which are executed by the CPU of the electronic dictionary 1. Further, a storing unit 714 of the server 700, the storing unit 714 comprising a hard disk or the like, stores the English-Japanese dictionary DB, the plural word jump program and the like which are stored in the ROM 20 of the electronic dictionary 1. Further, a RAM 712 of the server 700 stores data regarding execution of the explanation information displaying process and the like.

On the contrary, the inputting unit 40 and the displaying unit 50 of the electronic dictionary 1 respectively correspond to an inputting unit 604 and a displaying unit 606 of the electronic dictionary terminal 600.

In other words, a host-terminal (alternatively, client-server) system where the server 700 corresponds to a host (alternatively, server) and the electronic dictionary terminal 600 corresponds to a terminal (alternatively, client) is formed. Then, letters or the like inputted from the inputting unit 604 of the electronic dictionary terminal 600 is transmitted to the server 700 through the communicating device 608, and the CPU 702 of the server 700 executes the dictionary searching process according to various types of data and various types of programs stored in the storing unit 714. Then, the CPU 702 transmits a process result to the electronic dictionary terminal 600 through the communicating device 608, and the electronic dictionary terminal 600 displays the process result on the displaying unit 606. In this way, it is possible to realize the present invention in a system comprising the server 700 and the electronic dictionary terminal 600. In this case, the electronic dictionary terminal 600 does not need to store the English-Japanese dictionary DB, the plural word jump program and the like, and also does not need to execute the explanation information displaying process and the like. Therefore, the electronic dictionary terminal 600 may comprise a CPU 602 which has competitively low data processing ability, and a ROM 610 having competitively small storage capacity or the like, such as a cellular phone.

The entire disclosure of Japanese Patent Applications No. Tokugan 2003-187361 filed on Jun. 30, 2003 and No. Tokugan 2004-107920 filed on Mar. 31, 2004 including specifications, claims, drawings and summaries are incorporated herein by reference in their entirety.

What is claimed is:

1. An information display control apparatus comprising:

an example sentence storing unit for storing a plurality of example sentences each of which includes a plurality of words;

a word inputting unit for inputting a word;

a list display control unit for controlling a search for at least one example sentence each of which includes the word inputted by the word inputting unit among the plurality of example sentences stored in the example sentence storing unit, and for controlling a display of a list of the searched at least one example sentence;

an addition word selecting unit for selecting an addition word among the plurality of words in the at least one example sentence in the list displayed by the list display control unit, in a state where the list of the at least one example sentence each of which includes the inputted word is displayed under control of the list display control unit;

an addition word inputting unit for inputting an addition word in a state where the list of the at least one example sentence each of which includes the inputted word is displayed under control of the list display control unit; and a list display update control unit for controlling a search for at least one example sentence each of which includes both: (i) the addition word which is either selected by the addition word selecting unit or inputted by the addition word inputting unit and (ii) the inputted word, among the plurality of example sentences stored in the example sentence storing unit, and for controlling an update of the display of the list.

2. The apparatus according to claim 1, further comprising an example sentence word distinction display control unit for controlling a distinctive display of the word selected by the word selecting unit and the addition word which is either selected by the addition word selecting unit or inputted by the addition word inputting unit, within each example sentence in the list displayed under the control of the list display update control unit.

3. The apparatus according to claim 1, wherein the addition word inputting unit comprises a positional relation assigning unit for assigning a positional relation between the inputted word and the addition word, and the example sentence list display update control unit comprises a positional relation example sentence update control unit for controlling the search for at least one example sentence each of which includes the inputted word and the addition word so as to satisfy the positional relation assigned by the positional relation assigning unit, among the plurality of example sentences stored in the example sentence storing unit, and to update the display of the list.

4. The apparatus according to claim 3, wherein the positional relation assigning unit comprises a before-after relation assigning unit for assigning the positional relation according to whether the addition word is located before or after the inputted word.

5. The apparatus according to claim 3, wherein the positional relation assigning unit comprises an adjacent positional relation assigning unit for assigning the positional relation according to whether the addition word is located adjacent to the inputted word or not.

6. An information display control apparatus comprising:

an example sentence storing unit for storing a plurality of example sentences each of which includes a plurality of words;

a storing unit for storing a plurality of entry words and a plurality of pieces of explanation information so as to relate each other;

an entry word selecting unit for selecting an entry word among the plurality of entry words stored in the storing unit;

an explanation information display control unit for controlling a loading of explanation information related to the entry word selected by the entry word selecting unit, from the storing unit, and for controlling a display of the loaded explanation information;

a word selecting unit for selecting a word in the explanation information of which display is under control of the explanation information display control unit;

a selected word example sentence display control unit for controlling a search for at least one example sentence each of which includes the word selected by the word selecting unit, and for controlling a display of a list of the searched at least one example sentence;

an addition word selecting unit for selecting an addition word among the plurality of words in the at least one example sentence in the list displayed by the selected word example sentence display control unit, in a state where the list of the at least one example sentence each of which includes the selected word is displayed under control of the selected word example sentence display control unit;

an addition word inputting unit for inputting an addition word in a state where the list of the at least one example sentence each of which includes the selected word is displayed under control of the selected word example sentence display control unit; and an example sentence display update control unit for controlling a search for at least one example sentence each of which includes both: the addition word which is either selected by the addition word selecting unit or inputted by the addition word inputting unit, and (ii) the inputted word, among the plurality of example sentences stored in the example sentence storing unit, and for controlling an update of the display of the list.

7. The apparatus according to claim 6, further comprising an example sentence word distinction display control unit for controlling a distinctive display of the word selected by the word selecting unit and the addition word which is either selected by the addition word selecting unit or inputted by the addition word inputting unit, within each example sentence in the list displayed under the control of the list display update control unit.

8. The apparatus according to claim 6, wherein:

the addition word inputting unit comprises a positional relation assigning unit for assigning a positional relation between the inputted word and the addition word, and the example sentence list display update control unit comprises a positional relation example sentence update control unit for controlling the search for at least one example sentence each of which includes the inputted word and the addition word so as to satisfy the positional relation assigned by the positional relation assigning unit, among the plurality of example sentences stored in the example sentence storing unit, and to update the display of the list.

9. The apparatus according to claim 8, wherein the positional relation assigning unit comprises a before-after relation assigning unit for assigning the positional relation according to whether the addition word is located before or after the inputted word.

10. The apparatus according to claim 8, wherein the positional relation assigning unit comprises an adjacent positional relation assigning unit for assigning the positional relation according to whether the addition word is located adjacent to the inputted word or not.

11. A server to which a user terminal is connected through a communication line, comprising:

an example sentence storing unit for storing a plurality of example sentences each of which includes a plurality of words;

a word receiving unit for receiving a word from the user terminal;

an example sentence transmitting unit for searching for at least one example sentence each of which includes the word received by the word receiving unit, among the plurality of example sentences stored in the example sentence storing unit, and for transmitting the searched at least one example sentence to the user terminal;

an addition word receiving unit for receiving an addition word which is either: (i) selected at the user terminal, among the plurality of words included in the at least one example sentence transmitted to the user terminal, or (ii) inputted at the user terminal where the list of the at least one example sentence each of which includes the inputted word is displayed on the user terminal; and an updated example sentence transmitting unit for searching for at least one example sentence each of which includes the addition word received by the addition word receiving unit and the word received by the word receiving unit, among the plurality of example sentences stored in the example sentence storing unit, and for transmitting the searched at least one example sentence to the user terminal.

12. A storage medium having stored thereon a program for controlling a computer to perform functions comprising:

storing a plurality of example sentences each of which includes a plurality of words;

receiving an input of a word;

controlling a search for at least one example sentence each of which includes the inputted word among the stored plurality of example sentences, and controlling a display of a list of the searched at least one example sentence;

receiving either: (i) a selection of an addition word among the plurality of words of the at least one example sentence in the displayed list, in a state where the list of the at least one example sentence each of which includes the inputted word is displayed, or (ii) an input of an addition word; and controlling a search for at least one example sentence each of which includes both the selected or inputted addition word and the inputted word among the stored plurality of example sentences, and controlling an update of the display of the list.

13. A storage medium having stored thereon a program for controlling a computer to perform functions comprising:

storing a plurality of example sentences each of which includes a plurality of words;

storing a plurality of entry words and a plurality of pieces of explanation information so as to relate each other;

receiving a selection of an entry word among the stored plurality of entry words;

controlling a loading of explanation information related to the selected entry word, and controlling a display of the loaded explanation information;

receiving a selection of a word in the explanation information of which display is controlled;

controlling a search for at least one example sentence each of which includes the selected word, and controlling a display of a list of the searched at least one example sentence;

receiving either: (i) a selection of an addition word among the plurality of words in the at least one example sentence in the displayed list, or (ii) an input of an addition word in a state where the list of the at least one example sentence including the selected word is displayed; and controlling a search for at least one example sentence each of which includes both the selected or inputted addition word and the inputted word among the stored plurality of example sentences, and controlling an update of the display of the list.

14. An information display control apparatus comprising:

a storing unit for storing assembled information assembling information in which an entry word and explanation information of the entry word are related to each other;

an example sentence storing unit for storing a plurality of example sentences each of which includes a plurality of words;

an explanation information display control unit for controlling a display of explanation information related to an entry word among the explanation information stored in the storing unit;

a selecting unit for selecting a plurality of words in the explanation information displayed by the explanation information display control unit;

an example sentence searching unit for searching for at least one example sentence each of which includes the plurality of words selected by the selecting unit, among the plurality of example sentences stored in the example sentence storing unit; and an example sentence display control unit for controlling a display of the at least one example sentence searched for by the example sentence searching unit.

15. The apparatus according to claim 14, wherein the storing unit comprises an each-type classification storing unit for storing the assembled information so as to classify the assembled information into a plurality of types, the example sentence storing unit comprises an each-type classification example sentence storing unit for storing the plurality of example sentences so as to classify the plurality of example sentences into each of the plurality of types of the assembled information, and the example sentence display control unit comprises an identifier display unit for displaying an identifier in regard to each example sentence searched for by the example sentence searching unit so as to relate the identifier to the each example sentence, the identifier indicating a type of the assembled information into which the each example sentence is classified.

16. The apparatus according to claim 14, wherein the selecting unit comprises an operation selecting unit for selecting the plurality of words by an input of an operation to assign a predetermined range.

17. A server to which a user terminal is connected through a communication line, comprising;

a storing unit for storing assembled information assembling information in which an entry word and explanation information of the entry word are related to each other;

an example sentence storing unit for storing a plurality of example sentences each of which includes a plurality of words;

an explanation information display transmitting unit for transmitting explanation information related to any one entry word among the explanation information stored in the storing unit;

a receiving unit for receiving a plurality of words in the explanation information transmitted from the explanation information transmitting unit, from the user terminal;

an example sentence searching unit for searching for at least one example sentence each of which includes the plurality of words received by the receiving unit, among the plurality of example sentences stored in the example sentence storing unit; and an example sentence transmitting unit for transmitting the at least one example sentence searched for by the example sentence searching unit, to the user terminal.

18. A storage medium having stored thereon a program for controlling a computer to perform functions comprising:

storing assembled information assembling information in which an entry word and explanation information of the entry word are related to each other;

storing a plurality of example sentences each of which includes a plurality of words;

controlling a display of the explanation information;

receiving a selection of a plurality of words in the displayed explanation information;

searching for at least one example sentence each of which includes the selected plurality of words, among the stored plurality of example sentences; and controlling a display of the searched at least one example sentence.

* * * * *